US005583701A

United States Patent [19]
Yamanashi

[11] Patent Number: 5,583,701
[45] Date of Patent: Dec. 10, 1996

[54] ZOOM LENS SYSTEM

[75] Inventor: Takanori Yamanashi, Kokubunji, Japan

[73] Assignee: Olympus Optical Co., Ltd., Tokyo, Japan

[21] Appl. No.: 217,655

[22] Filed: Mar. 25, 1994

[30]  Foreign Application Priority Data

Mar. 26, 1993 [JP] Japan .................................. 5-068005

[51] Int. Cl.$^6$ .................................................. G02B 15/14
[52] U.S. Cl. ........................ 359/695; 359/683; 359/676
[58] Field of Search ............................ 359/676, 686, 359/695, 687, 683

[56]  References Cited

U.S. PATENT DOCUMENTS 4,501,475  2/1985  Fujita et al. .

FOREIGN PATENT DOCUMENTS

| 57-195213 | 11/1982 | Japan . |
|---|---|---|
| 58-32684 | 7/1983 | Japan . |
| 58-129404 | 8/1983 | Japan . |
| 61-258217 | 11/1986 | Japan . |
| 61-275809 | 12/1986 | Japan . |
| 62-186216 | 8/1987 | Japan . |
| 62-209508 | 9/1987 | Japan . |
| 63-241511 | 10/1988 | Japan . |
| 2158708 | 6/1990 | Japan . |
| 3177806 | 8/1991 | Japan . |

Primary Examiner—David C. Nelms
Assistant Examiner—F. Niranjan
Attorney, Agent, or Firm—Cushman Darby & Cushman

[57]  ABSTRACT

A compact, wide-angle, fast zoom lens system of high optical performance which enables photography in the range of from the wide-angle region to the telephoto region. The zoom lens system has a 1-st lens unit (G1) of positive refractive power, a 2-nd lens unit (G2) of negative refractive power, a 3-rd lens unit (G3) of positive refractive power, a 4-th lens unit (G4) of positive refractive power, and a 5-th lens unit (G5) of positive refractive power. When zooming from the wide end toward the tele end is effected, the 1-st lens unit (G1), the 2-nd lens unit (G2), the 3-rd lens unit (G3) and the 4-th lens unit (G4) are movable, while the 5-th lens unit (G5) is fixed. The zoom lens system satisfies a condition that regulates the refractive powers of the 1-st lens unit (G1) and the 3-rd lens unit (G3), a condition that regulates the refractive power of the 2-nd lens unit (G2), a condition that regulates the relationship between the refractive powers of the 3-rd lens unit (G3) and the 4-th lens unit (G4), and conditions that regulate the amount of movement of the lens units during zooming.

12 Claims, 36 Drawing Sheets

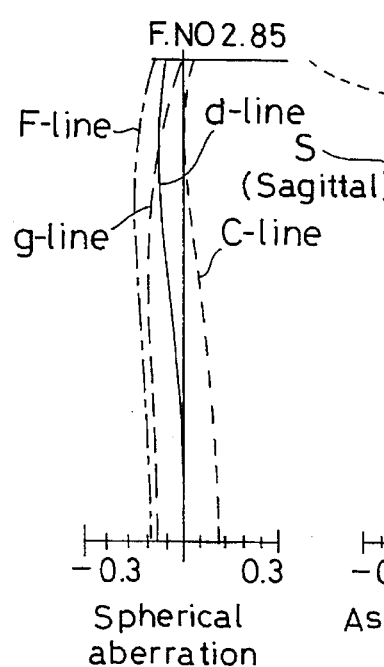
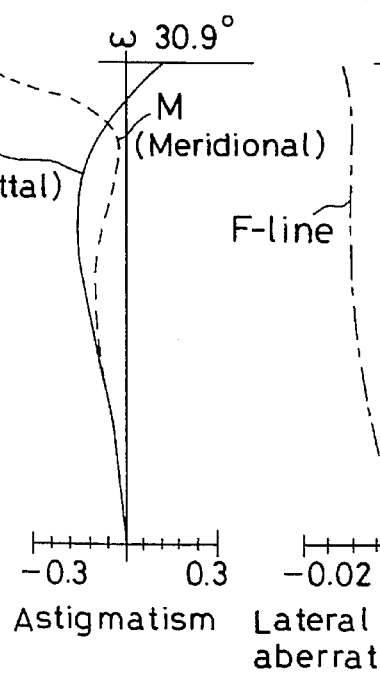
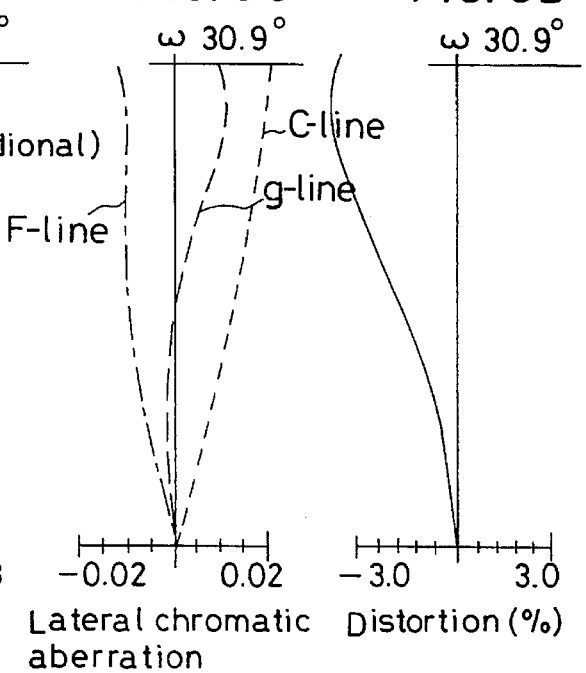
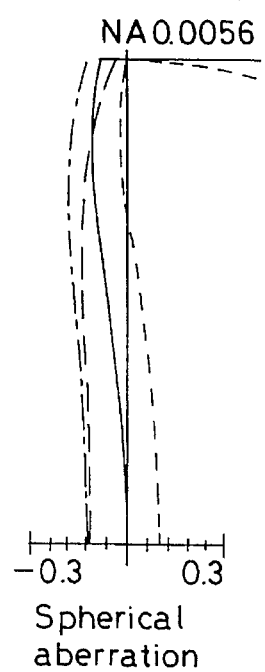
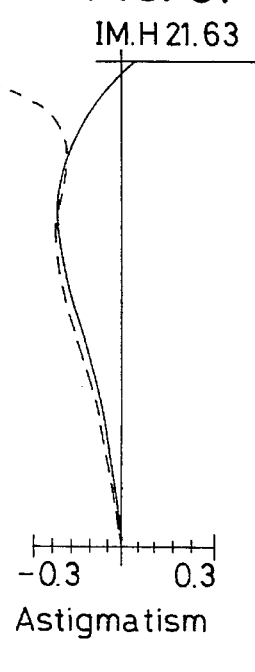
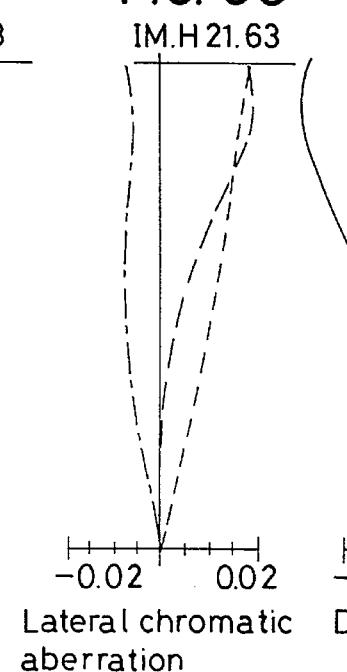
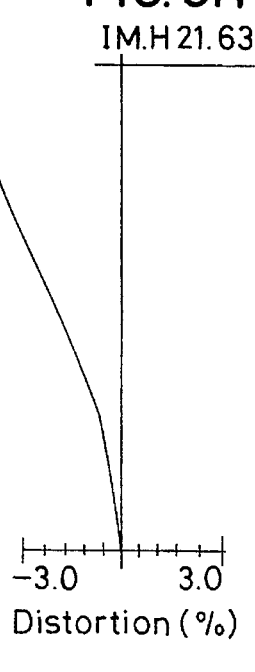

F.NO 2.85
-0.3  0.3
Spherical aberration

ω 21.8°
-0.3  0.3
Astigmatism

ω 21.8°
-0.02  0.02
Lateral chromatic aberration

ω 21.8°
-3.0  3.0
Distortion (%)

NA 0.0083
-0.3  0.3
Spherical aberration

IM.H 21.63
-0.3  0.3
Astigmatism

IM.H 21.63
-0.02  0.02
Lateral chromatic aberration

IM.H 21.63
-3.0  3.0
Distortion (%)

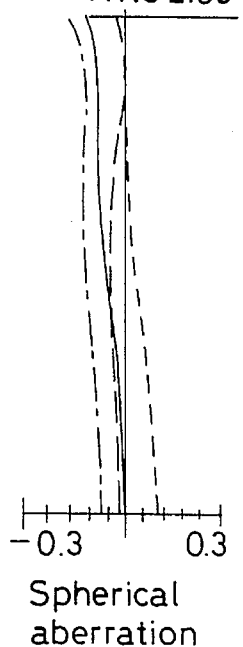
FIG. IIA
F.NO 2.85
-0.3  0.3
Spherical aberration
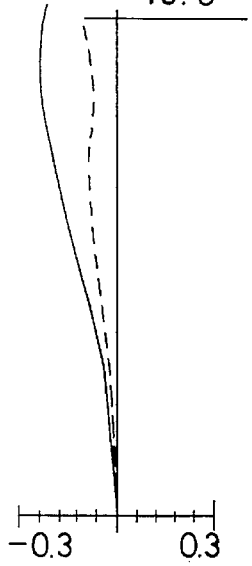
FIG. IIB
ω 15.8°
-0.3  0.3
Astigmatism
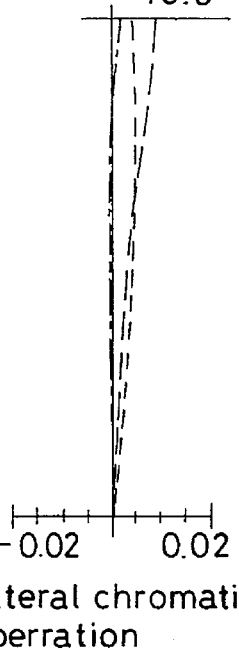
FIG. IIC
ω 15.8°
-0.02  0.02
Lateral chromatic aberration
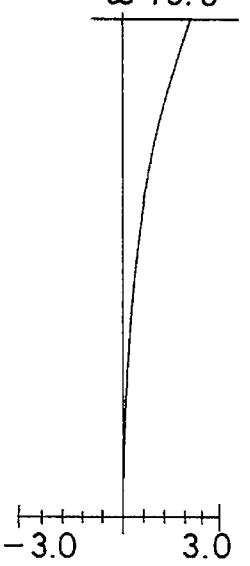
FIG. IID
ω 15.8°
-3.0  3.0
Distortion (%)
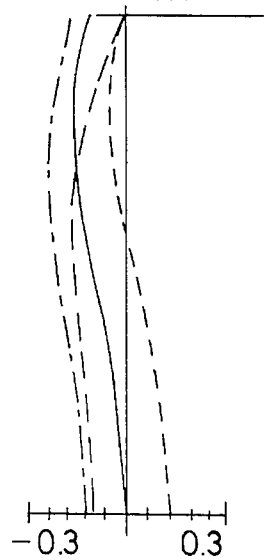
FIG. IIE
NA 0.0120
-0.3  0.3
Spherical aberration
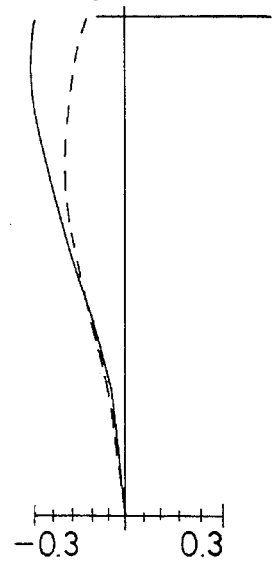
FIG. IIF
IM.H 21.63
-0.3  0.3
Astigmatism
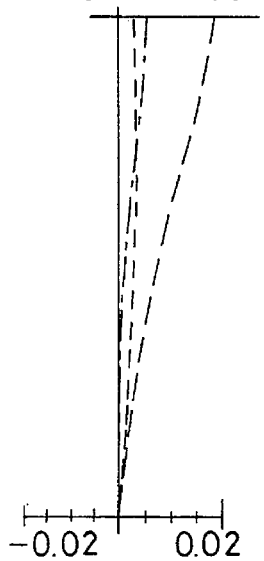
FIG. IIG
IM.H 21.63
-0.02  0.02
Lateral chromatic aberration
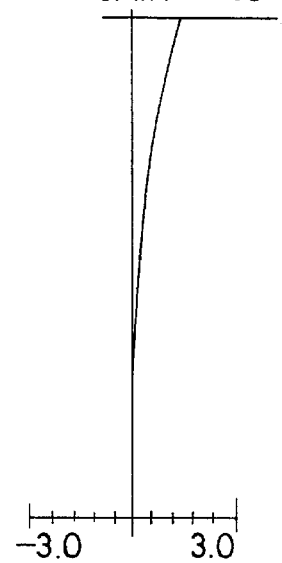
FIG. IIH
IM.H 21.63
-3.0  3.0
Distortion (%)

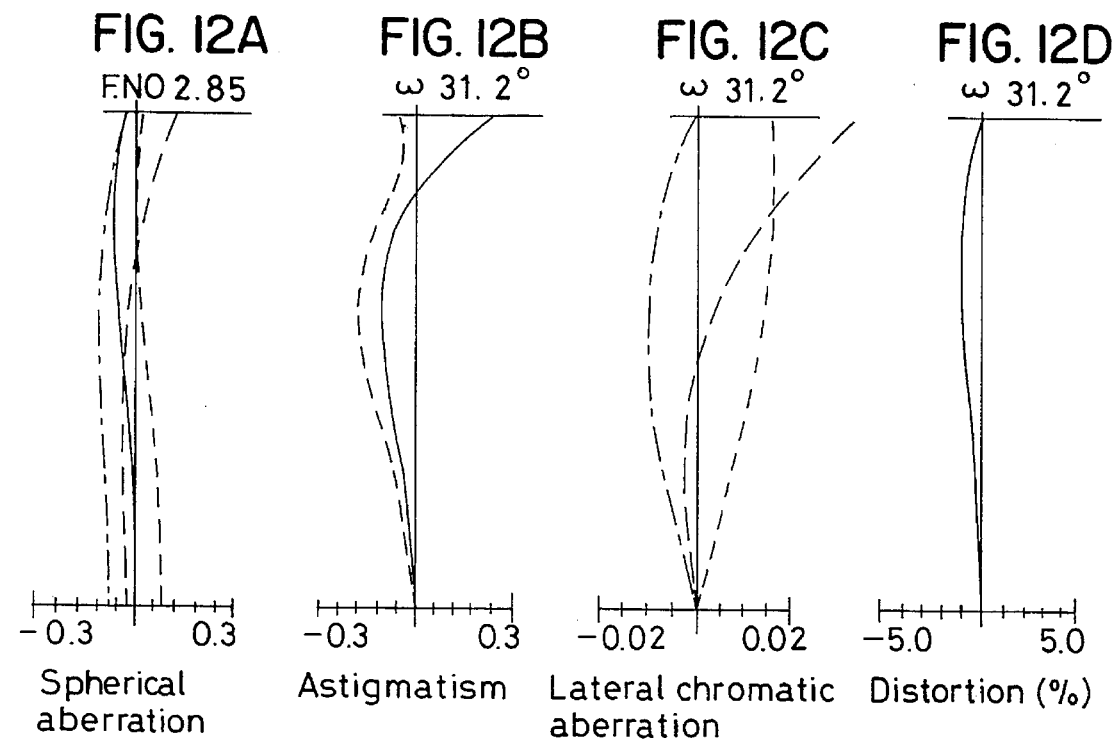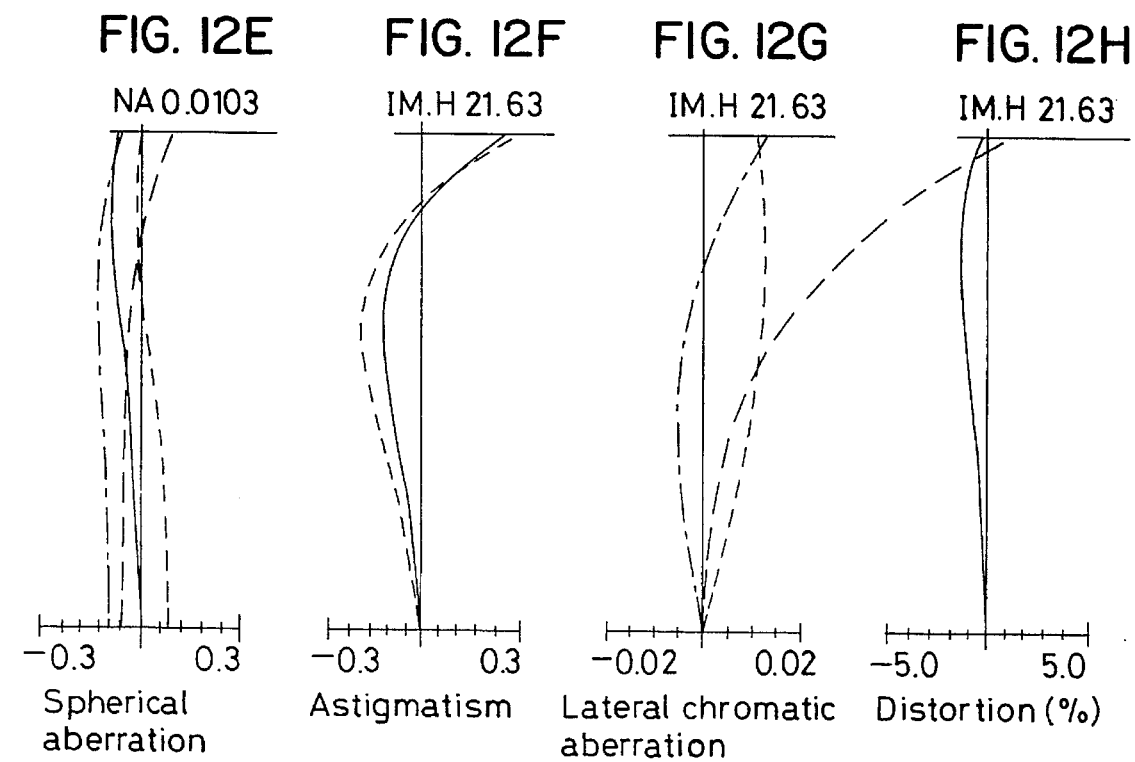

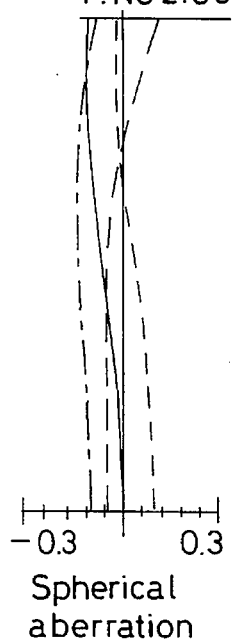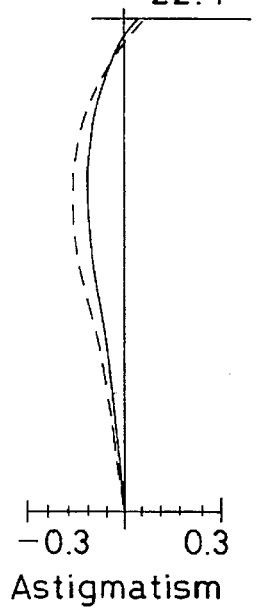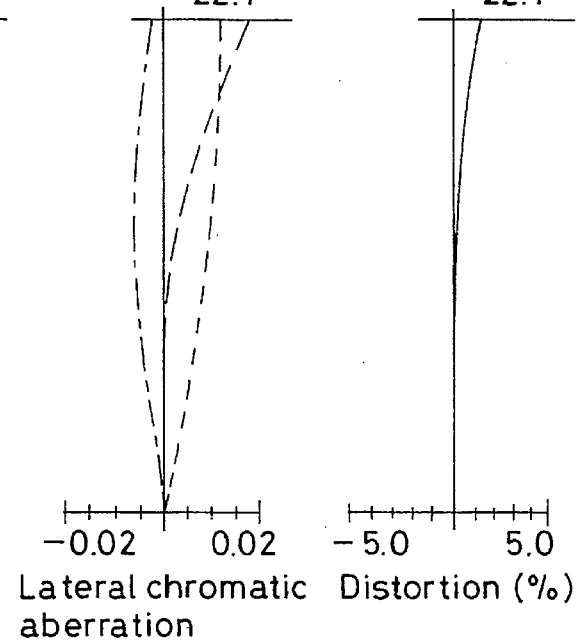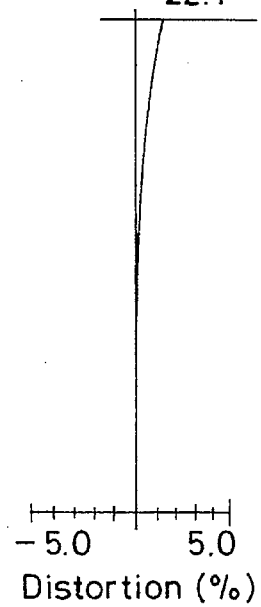
FIG. 13A  F.NO 2.85  Spherical aberration
FIG. 13B  ω 22.1°  Astigmatism
FIG. 13C  ω 22.1°  Lateral chromatic aberration
FIG. 13D  ω 22.1°  Distortion (%)
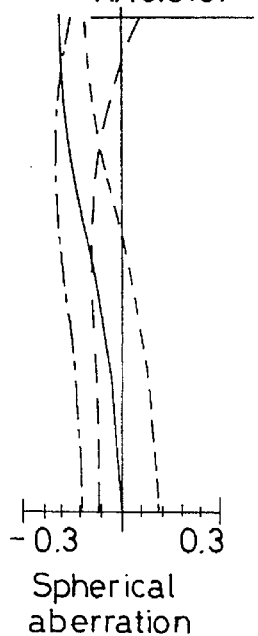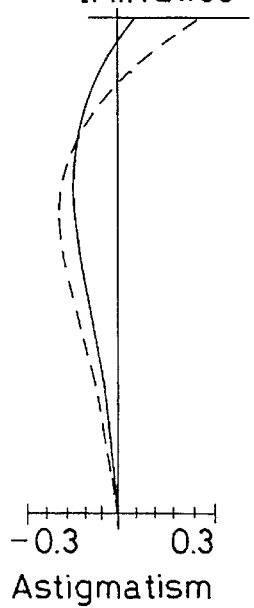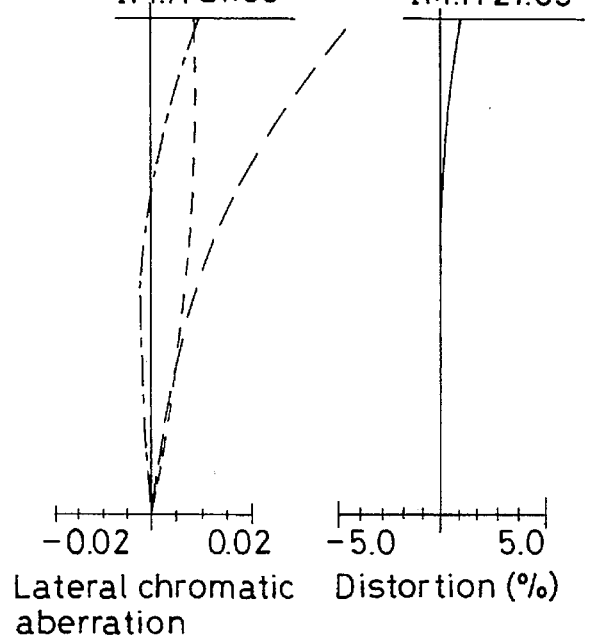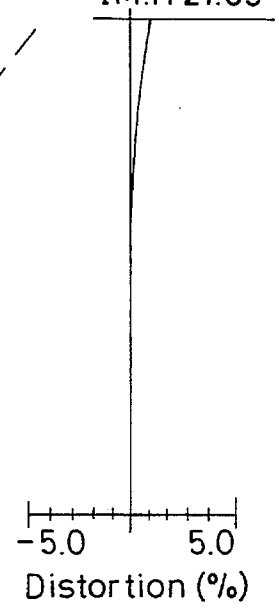
FIG. 13E  NA 0.0137  Spherical aberration
FIG. 13F  IM.H 21.63  Astigmatism
FIG. 13G  IM.H 21.63  Lateral chromatic aberration
FIG. 13H  IM.H 21.63  Distortion (%)

F.NO 2.85
-0.3  0.3
Spherical aberration

ω 16.2°
-0.3  0.3
Astigmatism

ω 16.2°
-0.02  0.02
Lateral chromatic aberration

ω 16.2°
-5.0  5.0
Distortion (%)

NA 0.0185
-0.3  0.3
Spherical aberration

IM.H 21.63
-0.3  0.3
Astigmatism

IM.H 21.63
-0.02  0.02
Lateral chromatic aberration

IM.H 21.63
-5.0  5.0
Distortion (%)

F. NO 2.83
-0.3  0.3
Spherical aberration

ω 31.3°
-0.3  0.3
Astigmatism

ω 31.3°
-0.02  0.02
Lateral chromatic aberration

ω 31.3°
-5.0  5.0
Distortion (%)

NA 0.0102
-0.3  0.3
Spherical aberration

IM.H 21.63
-0.3  0.3
Astigmatism

IM.H 21.63
-0.02  0.02
Lateral chromatic aberration

IM.H 21.63
-5.0  5.0
Distortion (%)

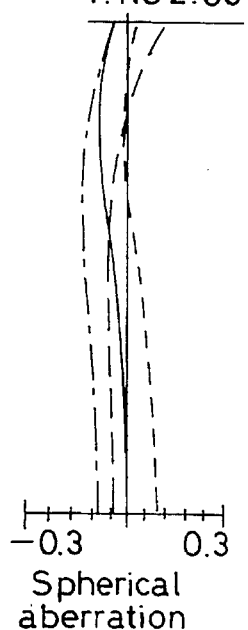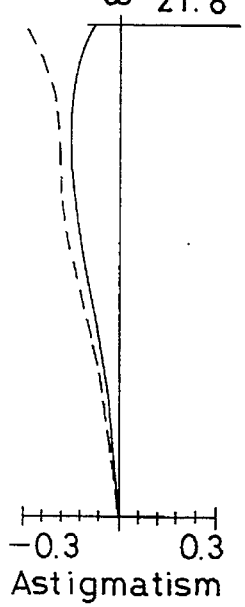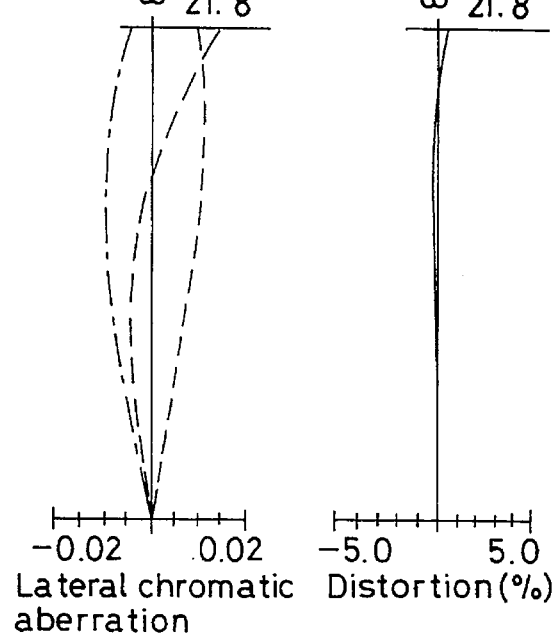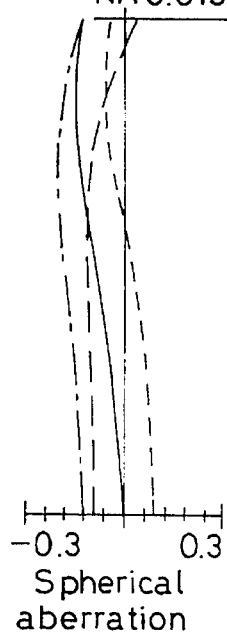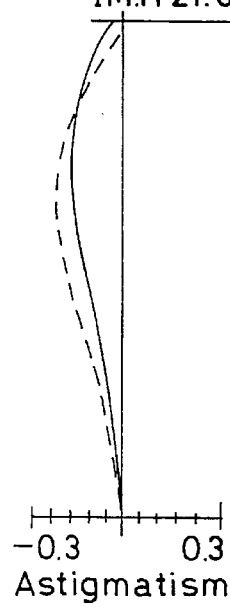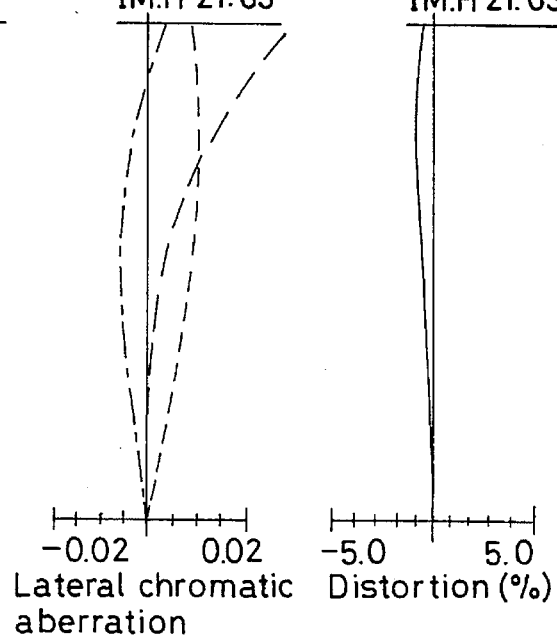

FIG. 17A
F.NO 2.83
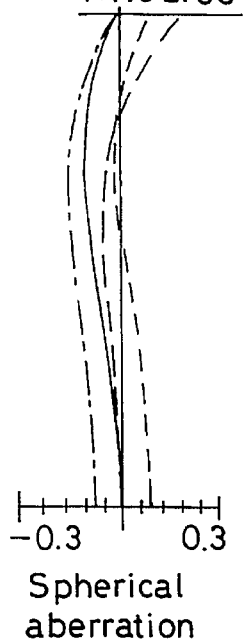
-0.3  0.3
Spherical aberration
FIG. 17B
ω 15.3°
-0.3  0.3
Astigmatism
FIG. 17C
ω 15.3°
-0.02  0.02
Lateral chromatic aberration
FIG. 17D
ω 15.3°
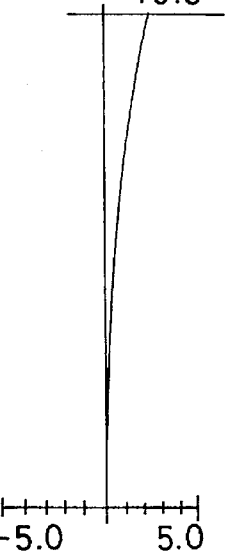
-5.0  5.0
Distortion (%)
FIG. 17E
NA 0.0212
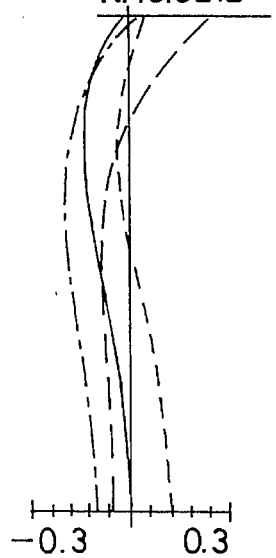
-0.3  0.3
Spherical aberration
FIG. 17F
IM.H 21.63
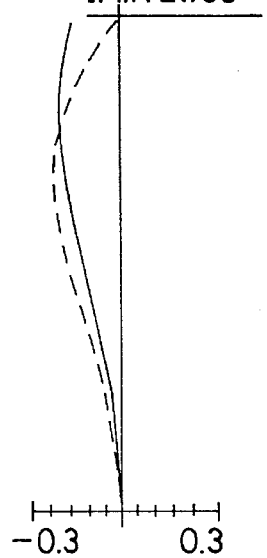
-0.3  0.3
Astigmatism
FIG. 17G
IM.H 21.63
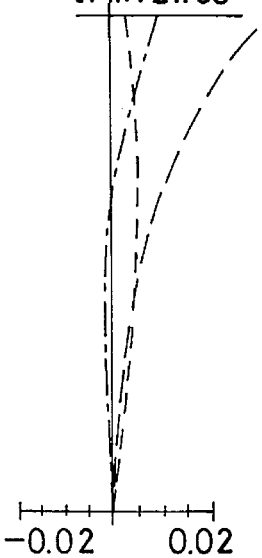
-0.02  0.02
Lateral chromatic aberration
FIG. 17H
IM.H 21.63
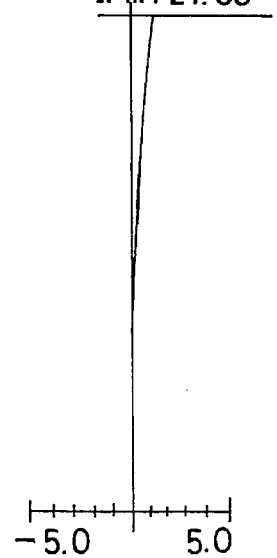
-5.0  5.0
Distortion (%)

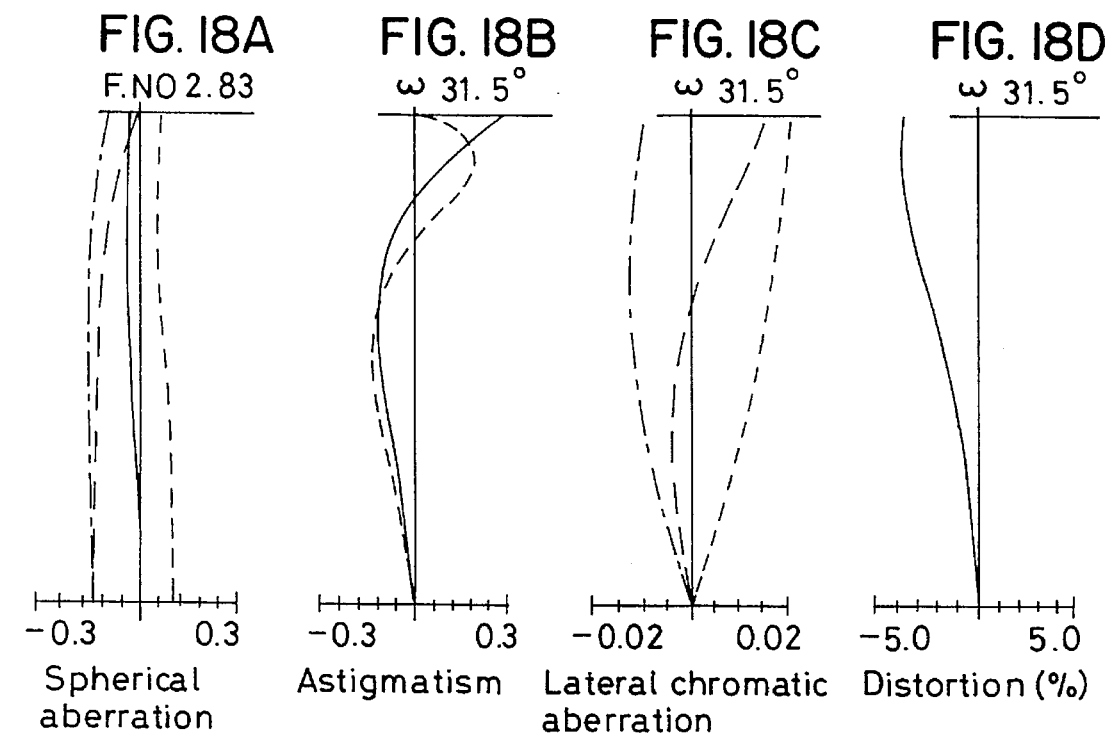
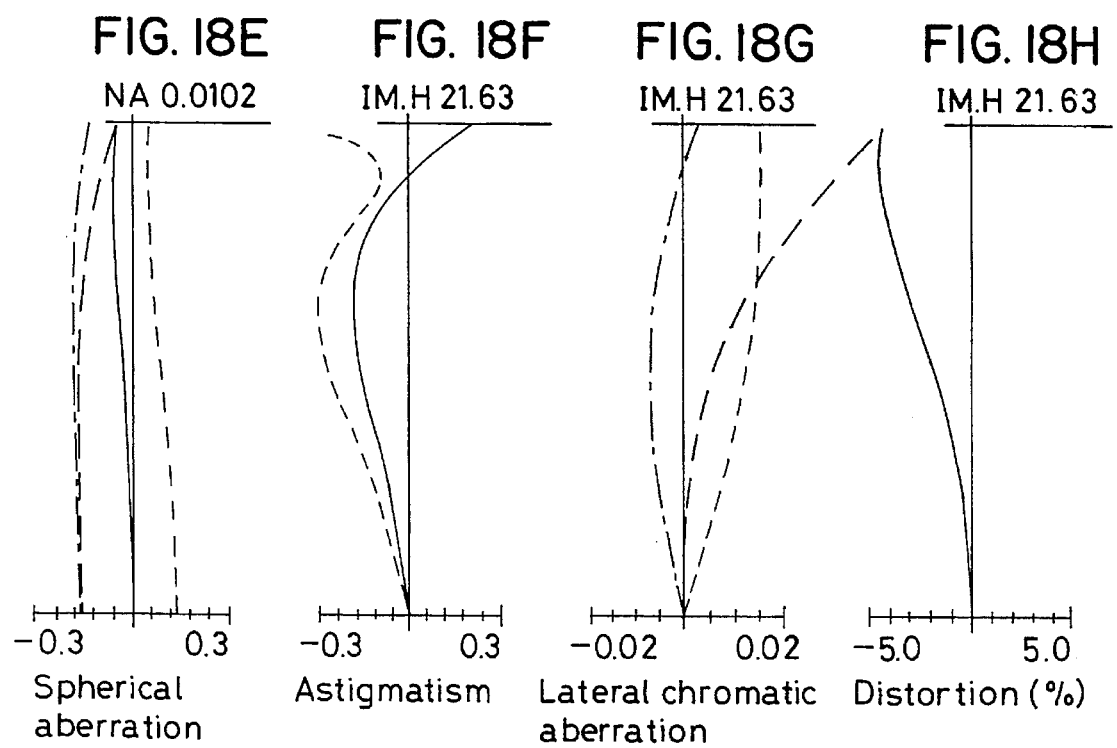

F.NO 2.83

-0.3  0.3
Spherical
aberration

ω 21.8°

-0.3  0.3
Astigmatism

ω 21.8°

-0.02  0.02
Lateral chromatic
aberration

ω 21.8°

-5.0  5.0
Distortion (%)

NA 0.0151

-0.3  0.3
Spherical
aberration

IM.H 21.63

-0.3  0.3
Astigmatism

IM.H 21.63

-0.02  0.02
Lateral chromatic
aberration

IM.H 21.63

-5.0  5.0
Distortion (%)

FIG. 20A
F.NO 2.83
FIG. 20B
ω 15.14°
FIG. 20C
ω 15.14°
FIG. 20D
ω 15.14°
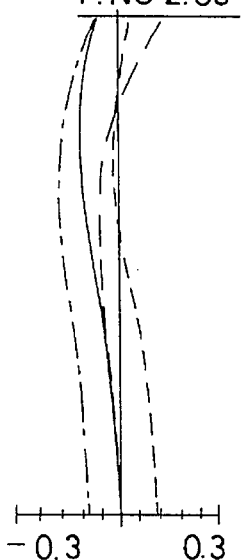
-0.3    0.3
Spherical aberration
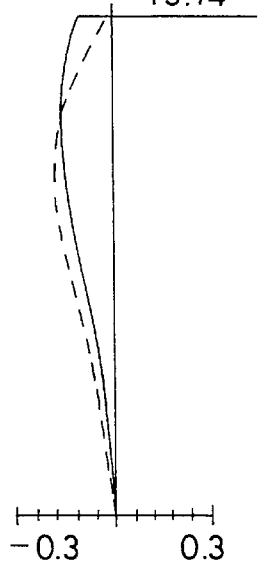
-0.3    0.3
Astigmatism
-0.02   0.02
Lateral chromatic aberration
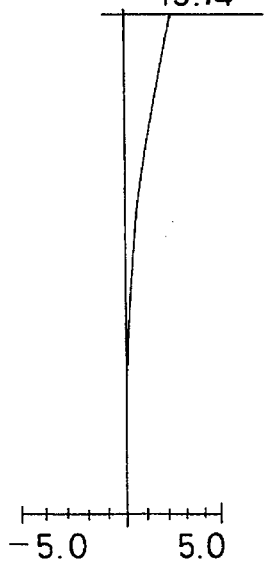
-5.0    5.0
Distortion (%)
FIG. 20E
NA 0.0212
FIG. 20F
IM.H 21.63
FIG. 20G
IM.H 21.63
FIG. 20H
IM.H 21.63
-0.3    0.3
Spherical aberration
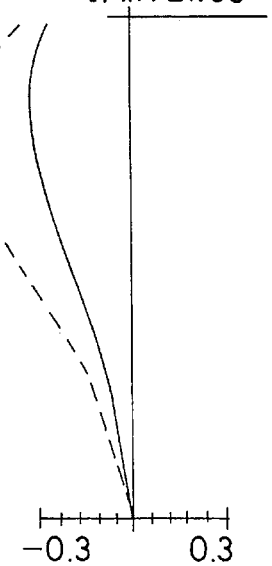
-0.3    0.3
Astigmatism
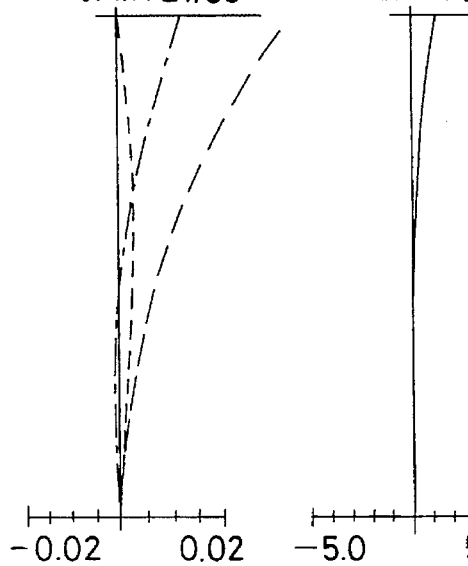
-0.02   0.02
Lateral chromatic aberration
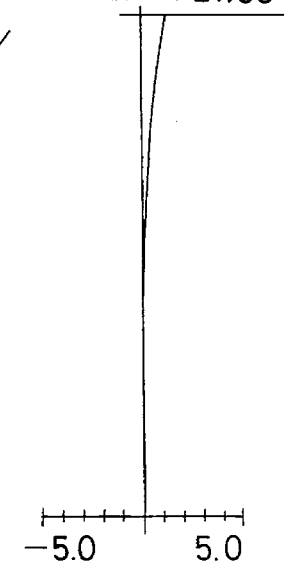
-5.0    5.0
Distortion (%)

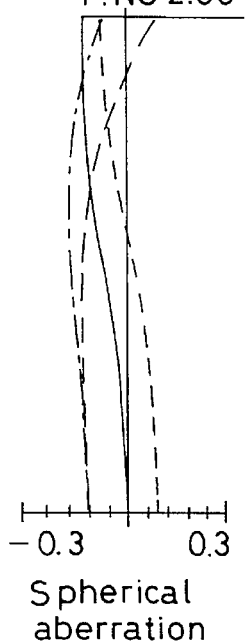
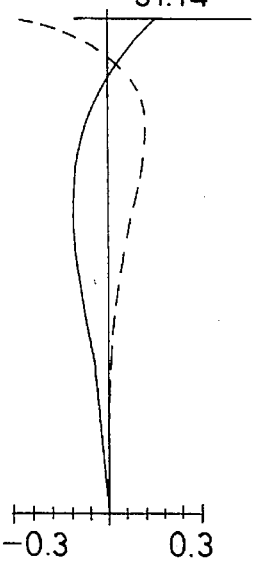
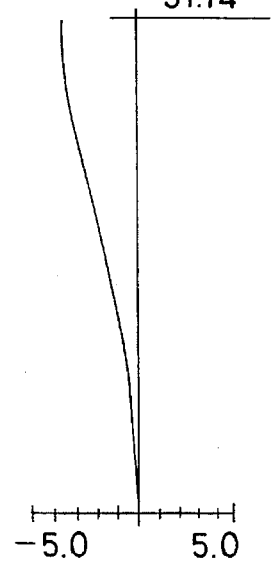
FIG. 21A F.NO 2.00 — Spherical aberration
FIG. 21B ω 31.14° — Astigmatism
FIG. 21C ω 31.14° — Lateral chromatic aberration
FIG. 21D ω 31.14° — Distortion (%)
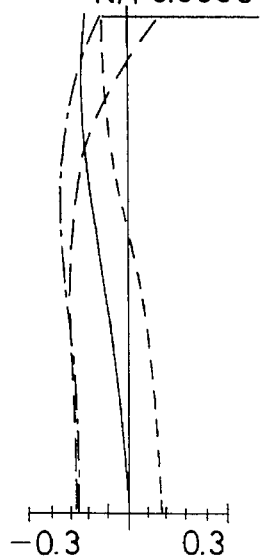
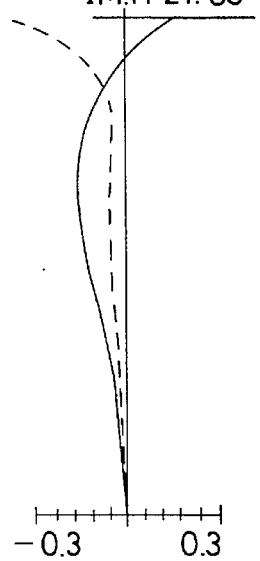
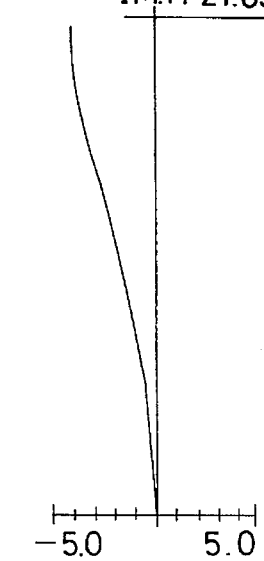
FIG. 21E NA 0.0098 — Spherical aberration
FIG. 21F IM.H 21.83 — Astigmatism
FIG. 21G IM.H 21.83 — Lateral chromatic aberration
FIG. 21H IM.H 21.83 — Distortion (%)

F.NO 2.00

−0.3   0.3
Spherical aberration

ω 23.29°

−0.3   0.3
Astigmatism

ω 23.29°

−0.02   0.02
Lateral chromatic aberration

ω 23.29°

−5.0   5.0
Distortion (%)

NA 0.0138

−0.3   0.3
Spherical aberration

IM.H 21.83

−0.3   0.3
Astigmatism

IM.H 21.83

−0.02   0.02
Lateral chromatic aberration

IM.H 21.83

−5.0   5.0
Distortion (%)

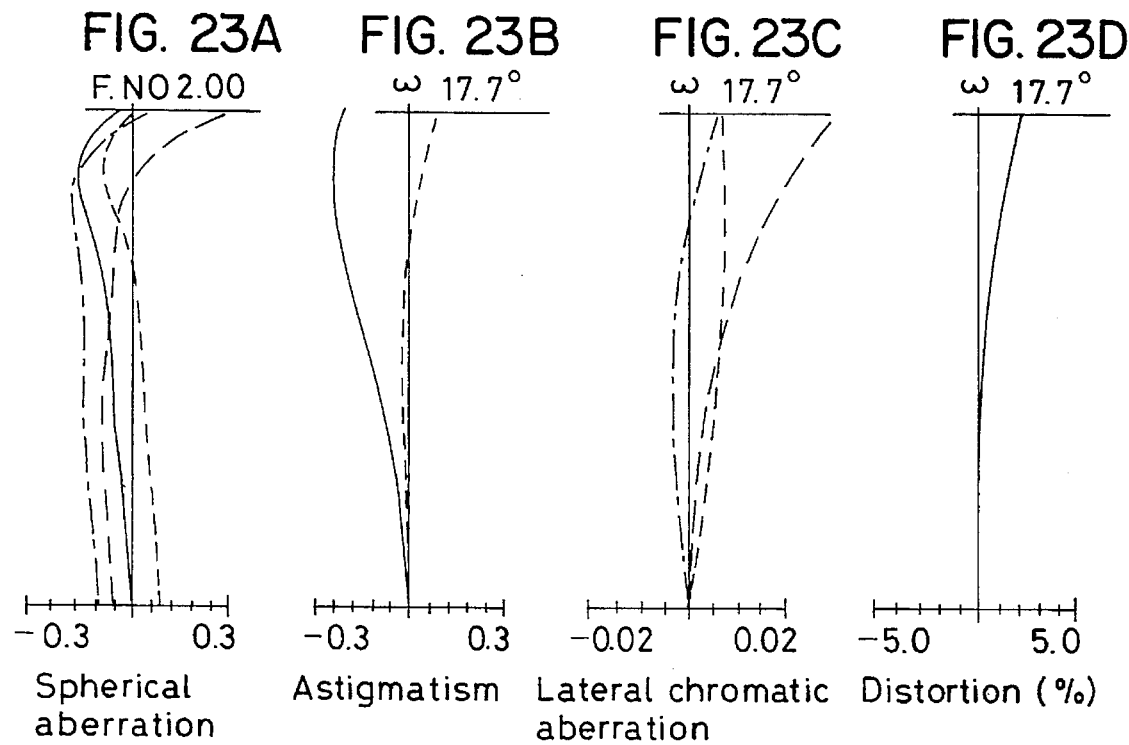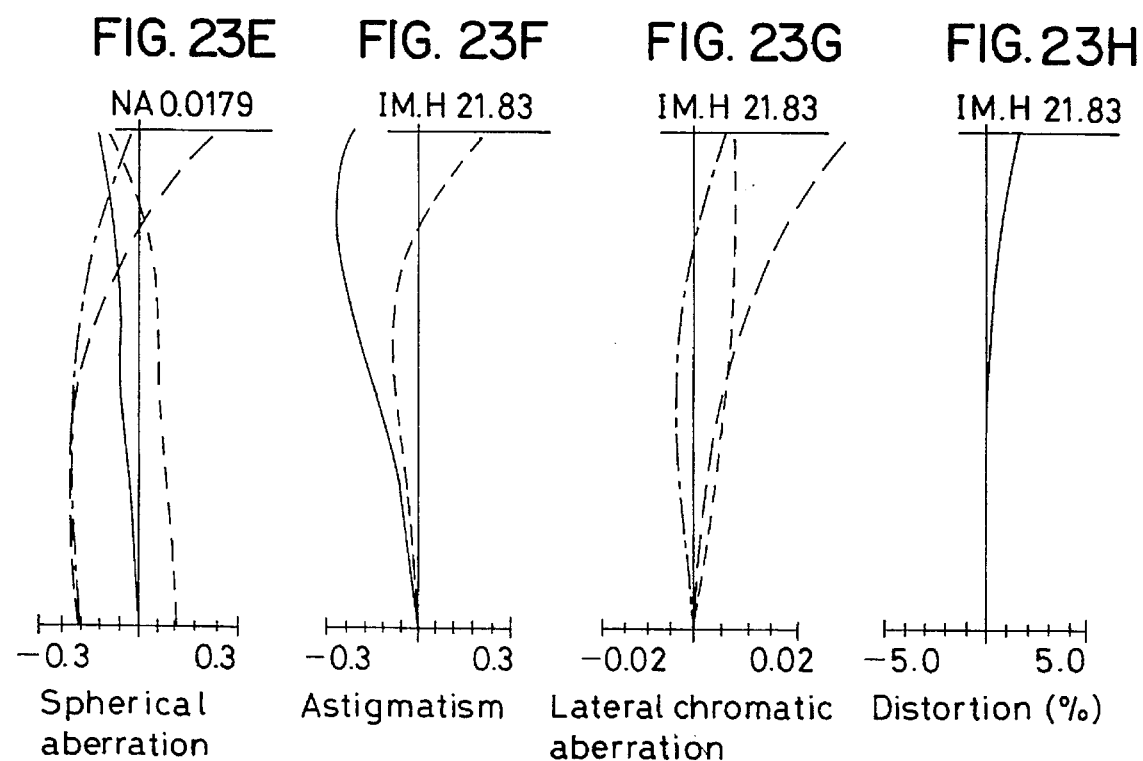

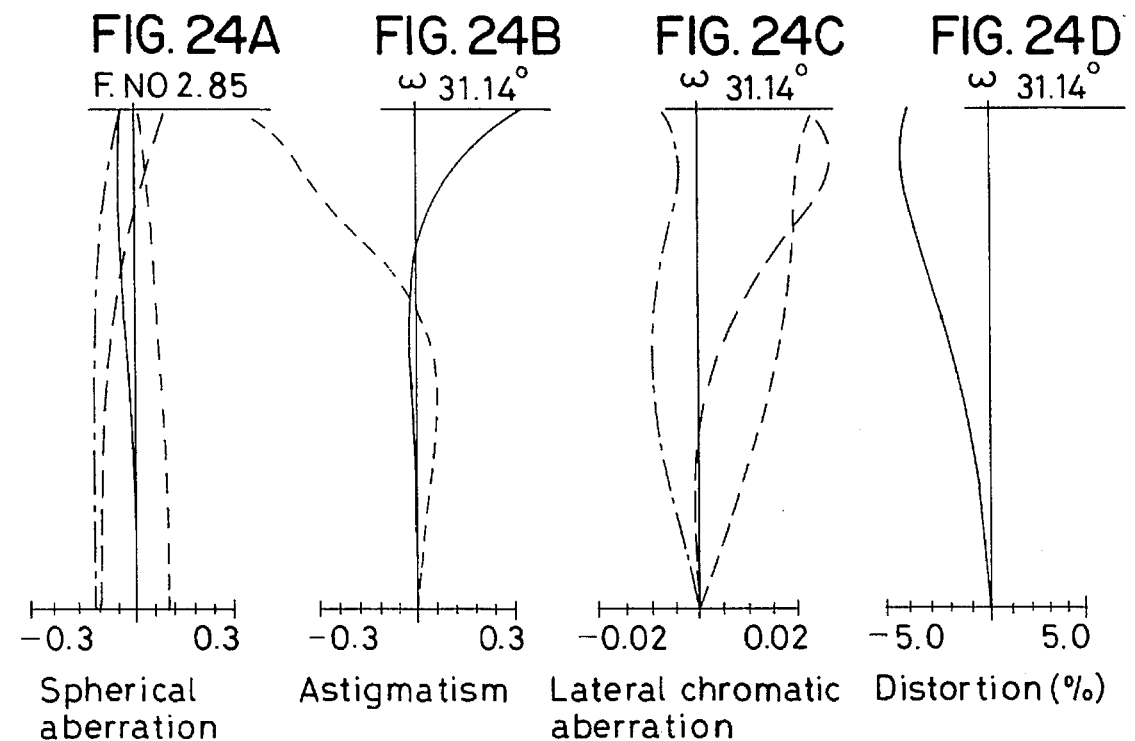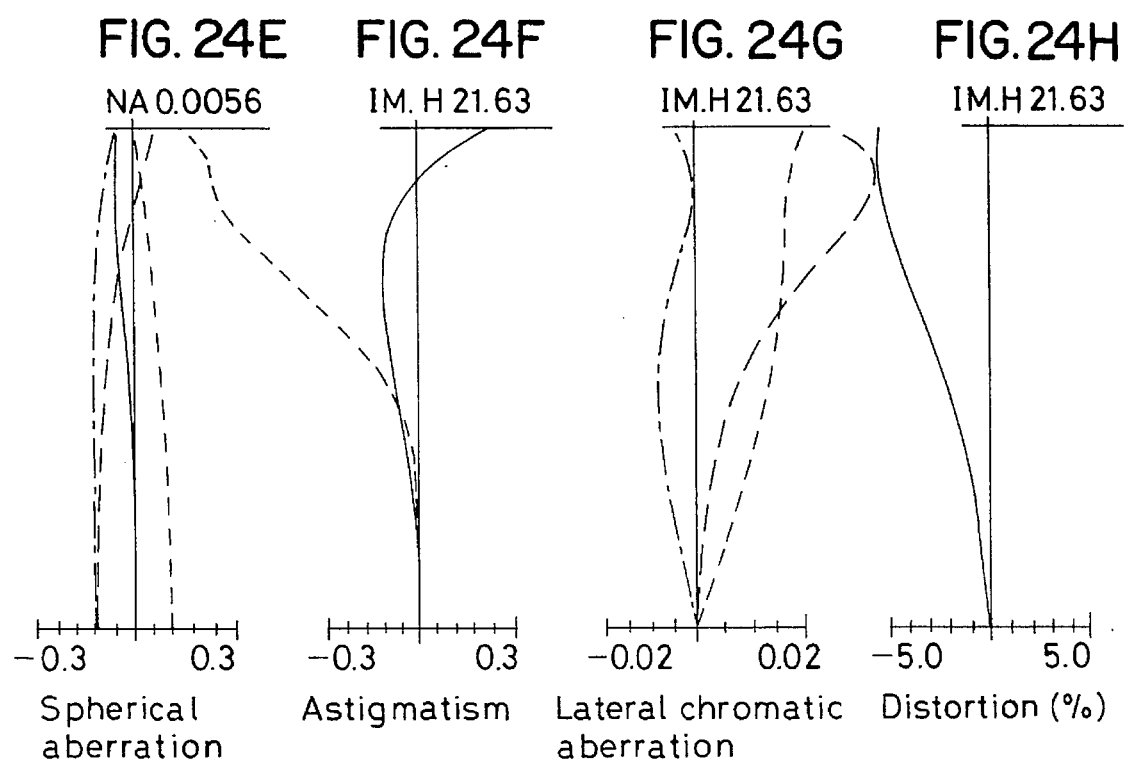

F.NO 2.85

-0.3  0.3
Spherical aberration

ω 19.63°

-0.3  0.3
Astigmatism

ω 19.63°

-0.02  0.02
Lateral chromatic aberration

ω 19.63°

-5.0  5.0
Distortion (%)

NA 0.0098

-0.3  0.3
Spherical aberration

IM.H 21.63

-0.3  0.3
Astigmatism

IM.H 21.63

-0.02  0.02
Lateral chromatic aberration

IM.H 21.63

-5.0  5.0
Distortion (%)

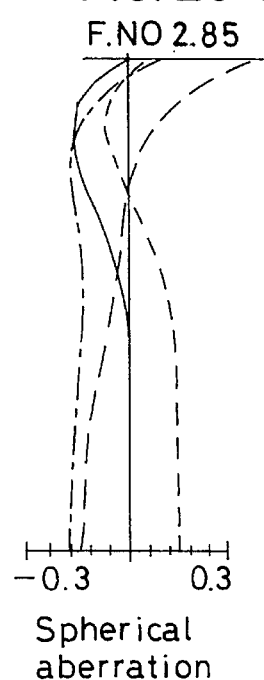
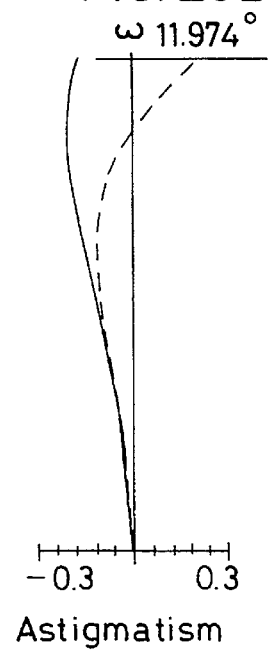
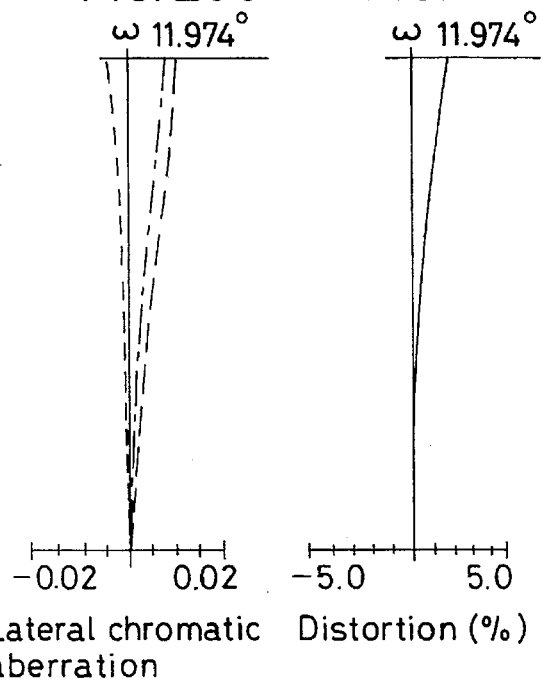
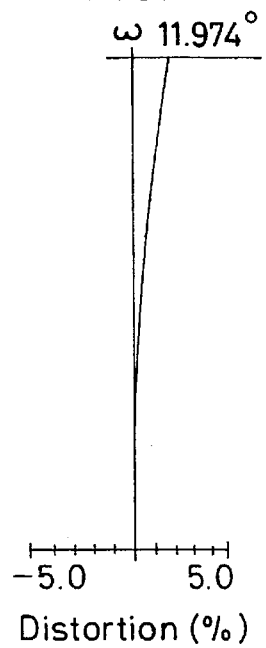
FIG. 26A  FIG. 26B  FIG. 26C  FIG. 26D
F.NO 2.85  ω 11.974°  ω 11.974°  ω 11.974°
Spherical aberration | Astigmatism | Lateral chromatic aberration | Distortion (%)
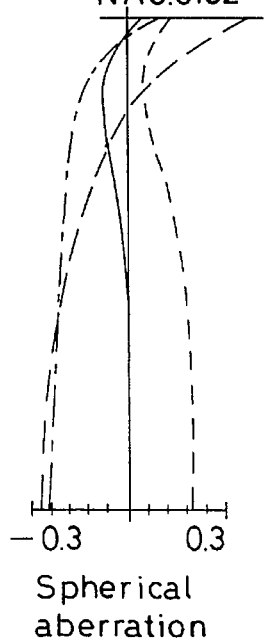
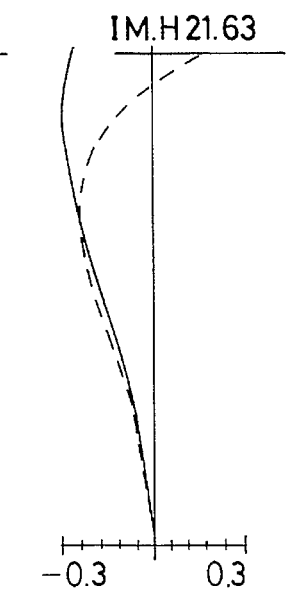
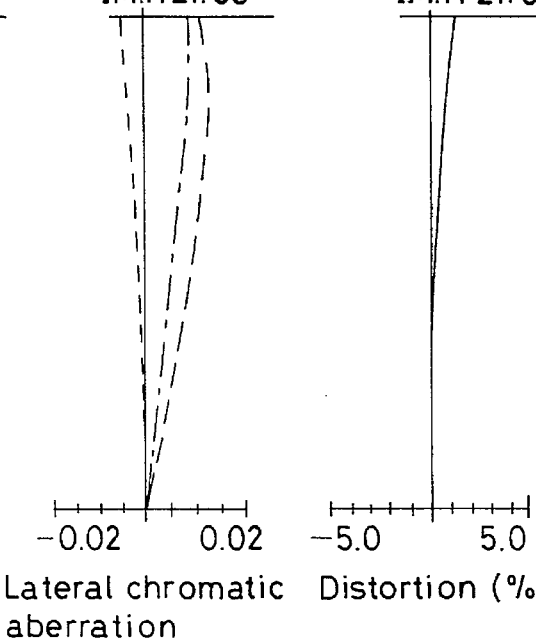
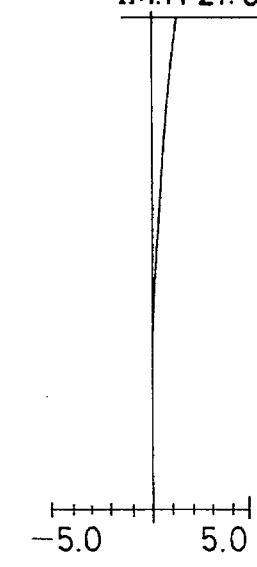
FIG. 26E  FIG. 26F  FIG. 26G  FIG. 26H
NA 0.0162  IM.H 21.63  IM.H 21.63  IM.H 21.63
Spherical aberration | Astigmatism | Lateral chromatic aberration | Distortion (%)

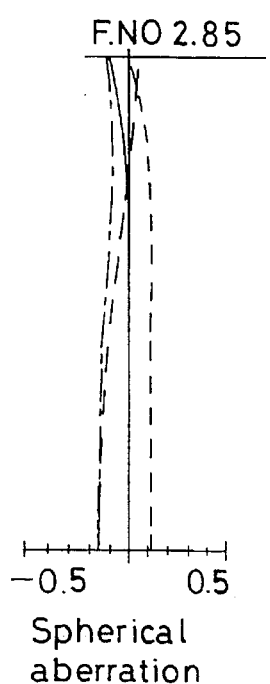
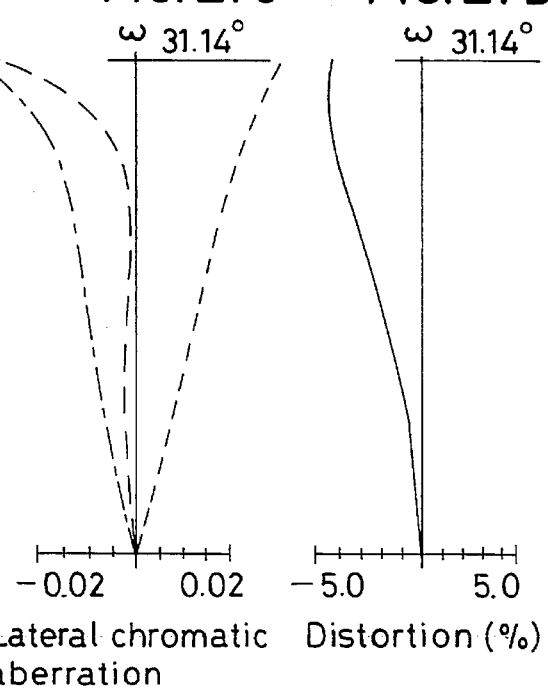
FIG. 27A F.NO 2.85 — Spherical aberration (−0.5 to 0.5)
FIG. 27B ω 31.14° — Astigmatism (−0.5 to 0.5)
FIG. 27C ω 31.14° — Lateral chromatic aberration (−0.02 to 0.02)
FIG. 27D ω 31.14° — Distortion (%) (−5.0 to 5.0)
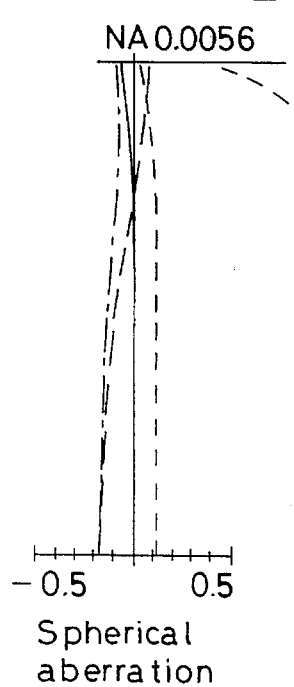
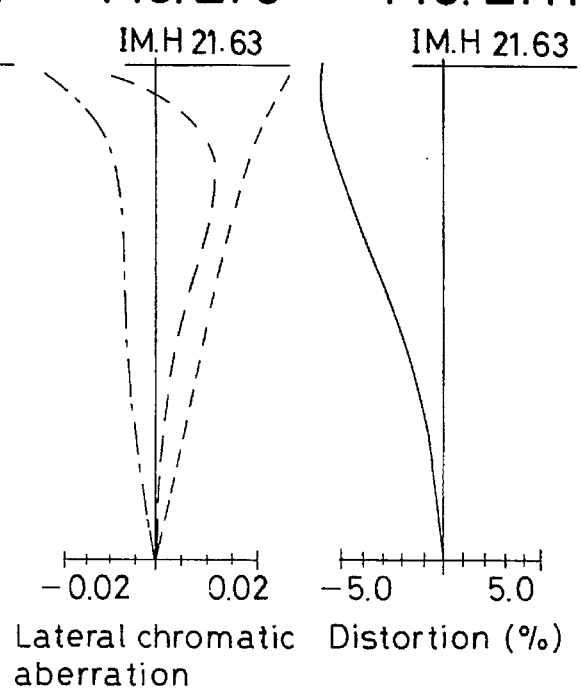
FIG. 27E NA 0.0056 — Spherical aberration (−0.5 to 0.5)
FIG. 27F IM.H 21.63 — Astigmatism (−0.5 to 0.5)
FIG. 27G IM.H 21.63 — Lateral chromatic aberration (−0.02 to 0.02)
FIG. 27H IM.H 21.63 — Distortion (%) (−5.0 to 5.0)

F.NO 3.20

-0.5  0.5
Spherical aberration

ω 17.42°

-0.5  0.5
Astigmatism

ω 17.42°

-0.02  0.02
Lateral chromatic aberration

ω 17.42°

-5.0  5.0
Distortion (%)

NA 0.0097

-0.5  0.5
Spherical aberration

IM.H 21.63

-0.5  0.5
Astigmatism

IM.H 21.63

-0.02  0.02
Lateral chromatic aberration

IM.H 21.63

-5.0  5.0
Distortion (%)

FIG. 29A
F.NO 3.65
−0.5  0.5
Spherical aberration
FIG. 29B
ω 9.342°
−0.5  0.5
Astigmatism
FIG. 29C
ω 9.342°
−0.02  0.02
Lateral chromatic aberration
FIG. 29D
ω 9.342°
−5.0  5.0
Distortion (%)
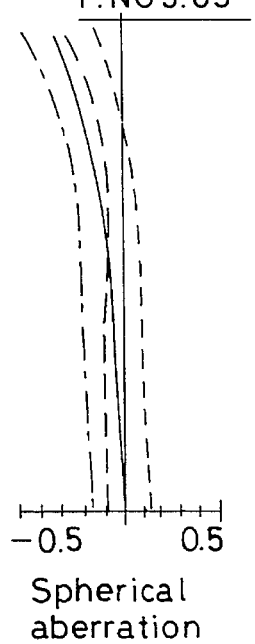
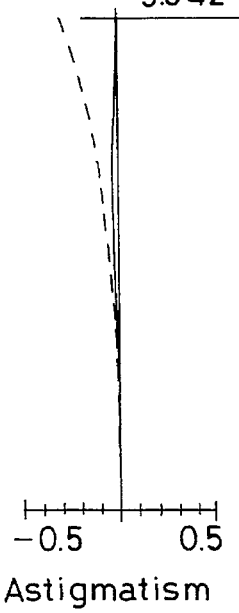
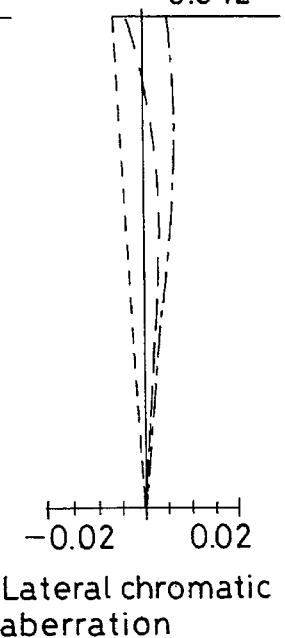
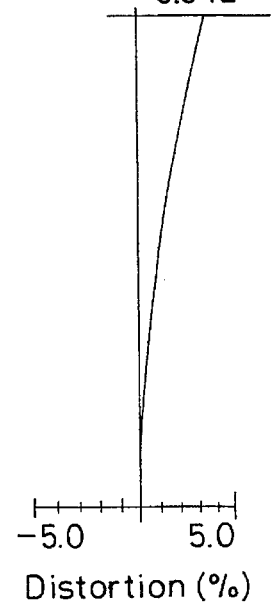
FIG. 29E
NA 0.0146
−0.5  0.5
Spherical aberration
FIG. 29F
IM.H 21.63
−0.5  0.5
Astigmatism
FIG. 29G
IM.H 21.63
−0.02  0.02
Lateral chromatic aberration
FIG. 29H
IM.H 21.63
−5.0  5.0
Distortion (%)
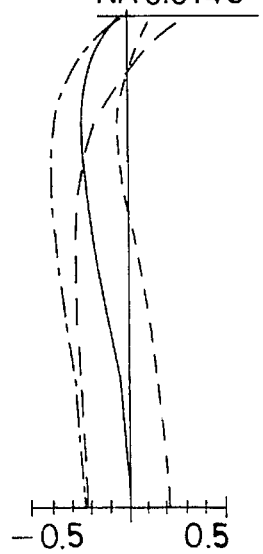
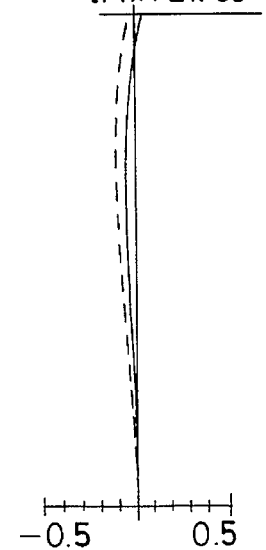
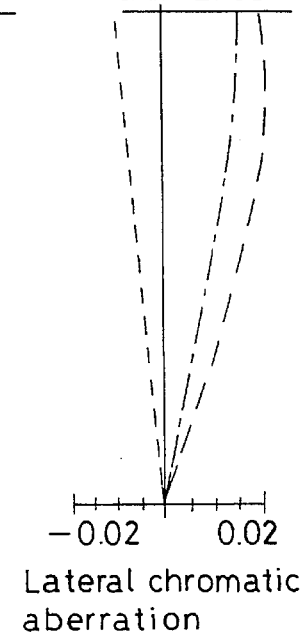
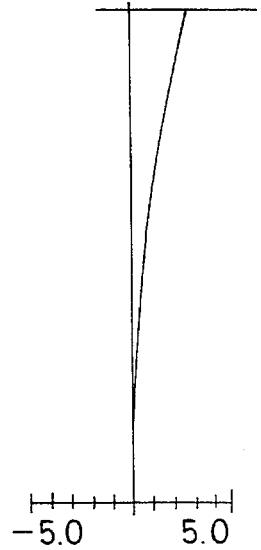

F.NO 3.60

-0.5  0.5
Spherical aberration

ω 31.1°

-0.5  0.5
Astigmatism

ω 31.1°

-0.02  0.02
Lateral chromatic aberration

ω 31.1°

-5.0  5.0
Distortion (‰)

NA 0.0081

-0.5  0.5
Spherical aberration

IM.H 21.63

-0.5  0.5
Astigmatism

IM.H 21.63

-0.02  0.02
Lateral chromatic aberration

IM.H 21.63

-5.0  5.0
Distortion (‰)

F. NO 3.60

-0.5  0.5
Spherical
aberration

ω 21.882°

-0.5  0.5
Astigmatism

ω 21.882°

-0.02  0.02
Lateral chromatic
aberration

ω 21.882°

-5.0  5.0
Distortion (%)

NA 0.0119

-0.5  0.5
Spherical
aberration

IM.H 21.63

-0.5  0.5
Astigmatism

IM.H 21.63

-0.02  0.02
Lateral chromatic
aberration

IM.H 21.63

-5.0  5.0
Distortion (%)

F.NO 3.60

−0.5　0.5
Spherical aberration

ω 14.45°

−0.5　0.5
Astigmatism

ω 14.45°

−0.02　0.02
Lateral chromatic aberration

ω 14.45°

−5.0　5.0
Distortion (%)

NA 0.0175

−0.5　0.5
Spherical aberration

IM.H 21.63

−0.5　0.5
Astigmatism

IM.H 21.63

−0.02　0.02
Lateral chromatic aberration

IM.H 21.63

−5.0　5.0
Distortion (%)

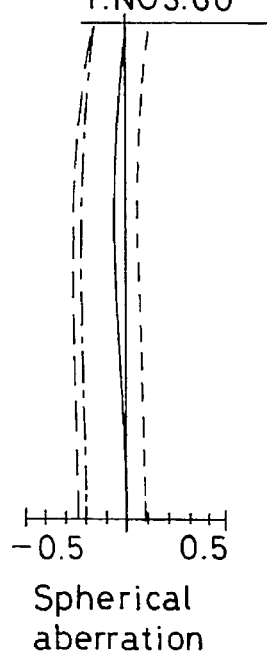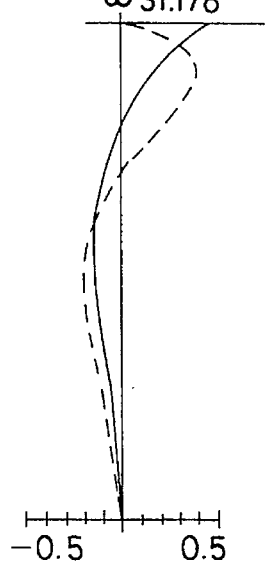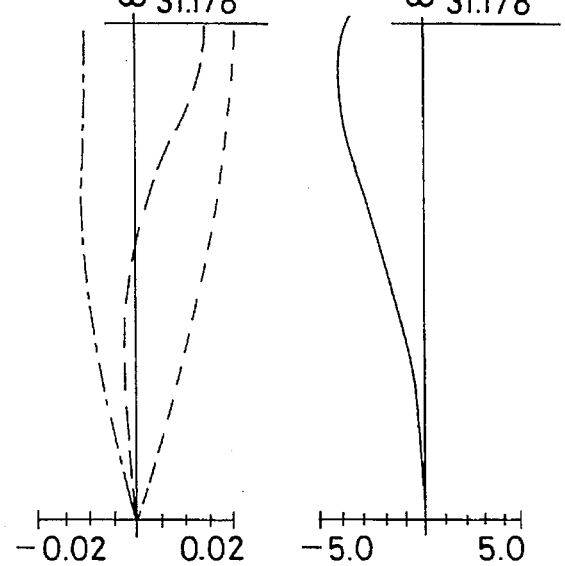
FIG. 33A F.NO 3.60 — Spherical aberration
FIG. 33B ω 31.178° — Astigmatism
FIG. 33C ω 31.178° — Lateral chromatic aberration
FIG. 33D ω 31.178° — Distortion (%)
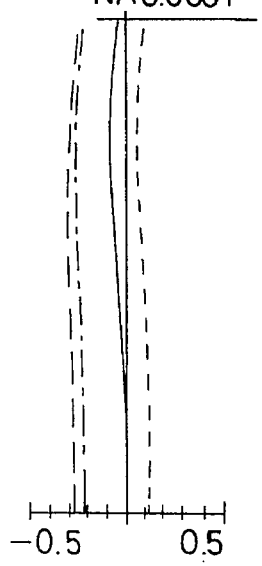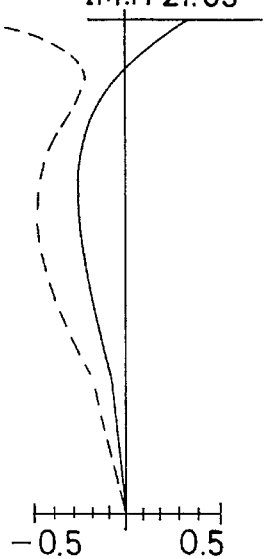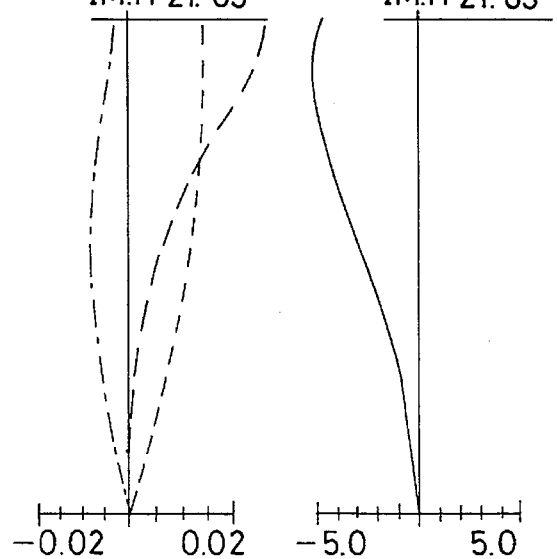
FIG. 33E NA 0.0081 — Spherical aberration
FIG. 33F IM.H 21.63 — Astigmatism
FIG. 33G IM.H 21.63 — Lateral chromatic aberration
FIG. 33H IM.H 21.63 — Distortion (%)

FIG. 34A  FIG. 34B  FIG. 34C  FIG. 34D
F.NO 3.60   ω 20.27°   ω 20.27°   ω 20.27°
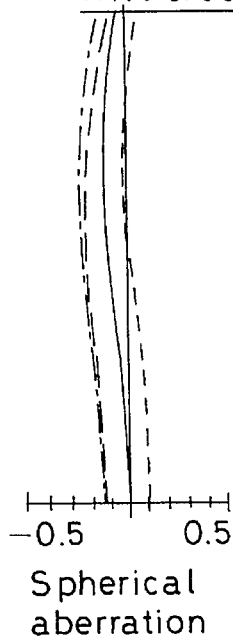
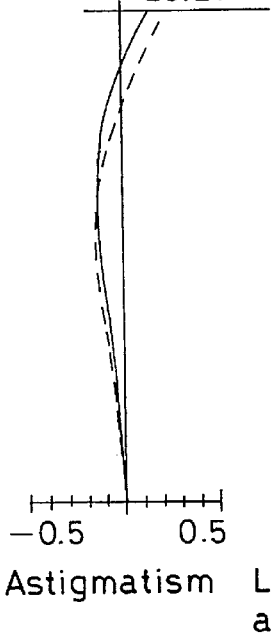
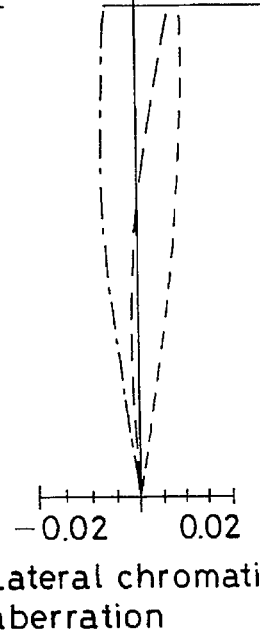
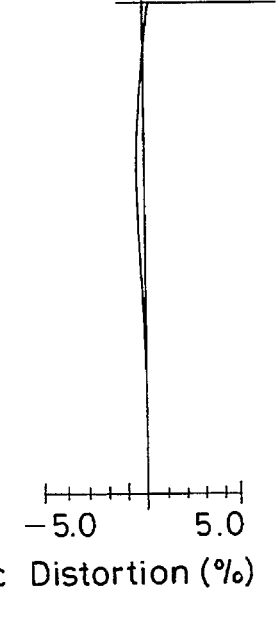
−0.5　　0.5　　−0.5　　0.5　　−0.02　　0.02　　−5.0　　5.0
Spherical aberration　　Astigmatism　　Lateral chromatic aberration　　Distortion (%)
FIG. 34E  FIG. 34F  FIG. 34G  FIG. 34H
NA 0.0129   IM.H 21.63   IM.H 21.63   IM.H 21.63
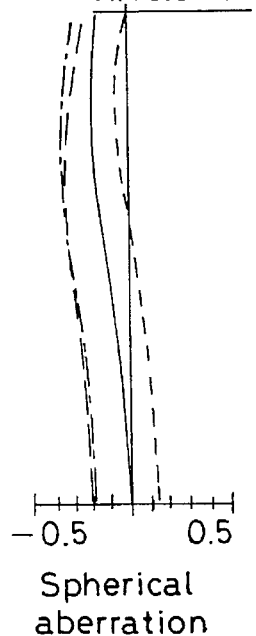
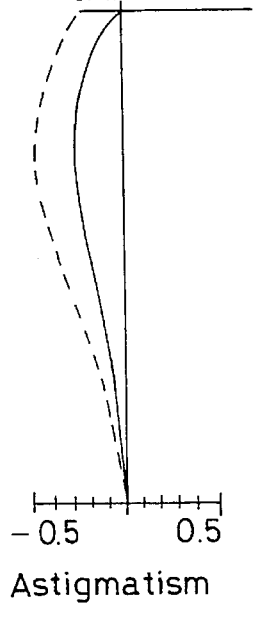
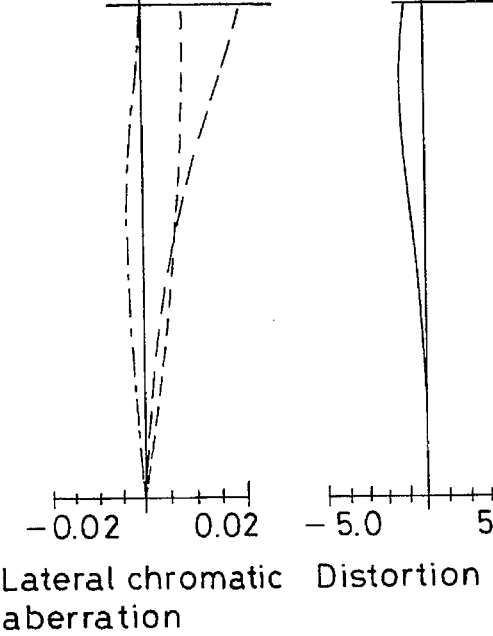
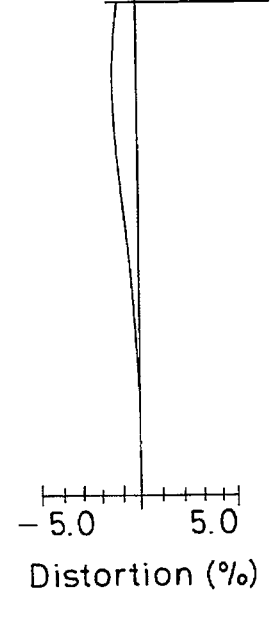
−0.5　　0.5　　−0.5　　0.5　　−0.02　　0.02　　−5.0　　5.0
Spherical aberration　　Astigmatism　　Lateral chromatic aberration　　Distortion (%)

F.NO 3.60

-0.5  0.5
Spherical aberration

ω 12.04°

-0.5  0.5
Astigmatism

ω 12.04°

-0.02  0.02
Lateral chromatic aberration

ω 12.04°

-5.0  5.0
Distortion (%)

NA 0.0205

-0.5  0.5
Spherical aberration

IM.H 21.63

-0.5  0.5
Astigmatism

IM.H 21.63

-0.02  0.02
Lateral chromatic aberration

IM.H 21.63

-5.0  5.0
Distortion (%)

ZOOM LENS SYSTEM

BACKGROUND OF THE INVENTION

The present invention relates to a wide-angle, fast zoom lens system which is compact and has high optical performance.

A great variety of zoom lens systems which enable photography in the range of from the wide-angle region to the semi-telephoto region have heretofore been proposed. In recent years, zoom lenses raised in the aperture ratio have also actively been developed. These conventional fast zoom lens systems are of the type in which a negative lens unit is used as a front lens unit, as represented by Japanese Patent Application Laid-Open (KOKAI) Nos. 63-241511 (1988) and 02-158708 (1990). Zoom lens systems having a raised aperture ratio and an extended wide-angle region include those disclosed in Japanese Patent Application Laid-Open (KOKAI) Nos. 61-275809 (1986).

Most of the fast, wide-angle zoom lens systems which have heretofore been proposed are of the type in which the 1-st lens unit has a negative refractive power and characterized in that the 1-st lens unit performs non-linear movement during zooming. This type of zoom lens system generally has an advantageous in that the diameter of the front lens can be reduced. It suffers, however, from the disadvantage that the zoom ratio cannot be raised to a very high level even if a rear lens unit is divided into sub-lens units so that a multiplicity of lens units are moved to effect zooming. The conventional zoom lens systems are also disadvantageous in that as the aperture ratio becomes higher, it becomes difficult to make effective aberration correction in the telephoto region. The reason for this is as follows: Since the 1-st lens unit has a negative refractive power, the bundle of rays incident on the 2-nd lens unit is divergent. Therefore, the aperture ratio considerably increases at the 2-nd lens unit, so that it becomes difficult to effect aberration correction satisfactorily. In addition, it has heretofore been a common practice to effect focusing by moving the 1-st lens unit, and therefore the conventional zoom lens systems have a disadvantage in that aberration variation becomes remarkable during focusing from infinity to a finite object point in the telephoto region. On the other hand, the conventional zoom lens systems use aspherical surfaces for attaining the required optical performance and have a large overall size.

To solve the above-described problems of the conventional wide-angle, fast zoom lens systems, the present invention provides a wide-angle, fast zoom lens system which is compact and has high optical performance by conducting:

(1) reexamination of the types of zoom lens;

(2) examination of the refractive power distribution;

(3) reexamination of the thick lens arrangement; and (4) examination of the focusing method.

SUMMARY OF THE INVENTION

It is an object of the present invention to provide a compact, wide-angle, fast zoom lens system of high optical performance which enables photography in the range of from the wide-angle region to the telephoto region.

To attain the above-described object, the present invention first provides a zoom lens system having, in order from the object side, a 1-st lens unit of positive power, a 2-nd lens unit of negative power, a 3-rd lens unit of positive power, a 4-th lens unit of positive power, and a 5-th lens unit of positive power, wherein when zooming from the wide end toward the tele end is effected, the 1-st, 2-nd, 3-rd and 4-th lens units are moved toward the object side independently of each other, while the 5-th lens unit is fixed.

Secondly, the present invention provides a zoom lens system having, in order from the object side, a 1-st lens unit of positive power, a 2-nd lens unit of negative power, a 3-rd lens unit of positive power, a 4-th lens unit of positive power, and a 5-th lens unit of positive power, wherein when zooming from the wide end toward the tele end is effected, the 1-st, 2-nd, 3-rd and 4-th lens units are moved toward the object side independently of each other such that the spacing between the 1-st and 2-nd lens units increases, while the spacing between the 2-nd and 3-rd lens units decreases, and the spacing between the 3-rd and 4-th lens units decreases, while the 5-th lens unit is fixed during the zooming.

Thirdly, the present invention provides a zoom lens system having, in order from the object side, a 1-st lens unit of positive power, a 2-nd lens unit of negative power, a 3-rd lens unit of positive power, a 4-th lens unit of positive power, and a 5-th lens unit of positive power, wherein when zooming from the wide end toward the tele end is effected, the 1-st, 2-nd, 3-rd and 4-th lens units move along an optical axis, while the 5-th lens unit is fixed, and wherein the 1-st lens unit has at least a doublet of one negative lens component and one positive lens component, and the 2-nd lens unit includes, in order from the object side, a negative meniscus lens having a convex surface directed toward the object side, a doublet of a negative lens component and a positive lens component, a negative lens whose object-side surface has stronger power than that of the image-side surface thereof, and a positive lens whose object-side surface has stronger power than that of the image-side surface thereof.

Fourthly, the present invention provides a zoom lens system having, in order from the object side, a 1-st lens unit of positive power, a 2-nd lens unit of negative power, a 3-rd lens unit of positive power, a 4-th lens unit of positive power, and a 5-th lens unit of positive power, wherein when zooming from the wide end toward the tele end is effected, the 1-st, 2-nd, 3-rd and 4-th lens units move along an optical axis, while the 5-th lens unit is fixed, and wherein the 3-rd lens unit has at least a doublet of one positive lens component and one negative lens component, and the 4-th lens unit has at least a doublet of one negative lens component and one positive lens component and further has an aspherical surface.

Fifthly, the present invention provides a zoom lens system having, in order from the object side, a 1-st lens unit of positive power, a 2-nd lens unit of negative power, a 3-rd lens unit of positive power, a 4-th lens unit of positive power, and a 5-th lens unit of positive power, wherein when zooming from the wide end toward the tele end is effected, the 1-st, 2-nd, 3-rd and 4-th lens units move along an optical axis, while the 5-th lens unit is fixed, and wherein the 5-th lens unit has one positive lens and one negative lens.

Sixthly, the present invention provides a zoom lens system having, in order from the object side, a 1-st lens unit of positive refractive power, a 2-nd lens unit of negative refractive power, a 3-rd lens unit of positive refractive power, a 4-th lens unit of positive refractive power, and a 5-th lens unit of positive refractive power, wherein when zooming from the wide end toward the tele end is effected, the 1-st, 2-nd, 3-rd and 4-th lens units are movable, while the 5-th lens unit is fixed, and the following conditions (1) to (5) are satisfied:

$$0.6 < f_1/f_3 < 2.0 \tag{1}$$

$$0.25 < -f_{12W}/f_3 < 0.9 \tag{2}$$

$$0.4 < f_3/f_4 < 2.5 \quad (3)$$

$$0.2 < \gamma \cdot X_2/X_3 < 1.8 \quad (4)$$

$$0.5 < \gamma \cdot X_4/X_3 < 7.0 \quad (5)$$

where $f_1$: the focal length of the 1-st lens unit;

$f_{12W}$: the composite focal length of the 1-st and 2-nd lens units at the wide end;

$f_3$: the focal length of the 3-rd lens unit;

$f_4$: the focal length of the 4-th lens unit;

$\gamma$: the zoom ratio (=the focal length at the tele end divided by the focal length at the wide end)

$X_2$: the amount of movement of the 2-nd lens unit when zooming is effected from the wide end (taken here as a standard position) to the tele end;

$X_3$: the amount of movement of the 3-rd lens unit when zooming is effected from the wide end (taken here as a standard position) to the tele end; and $X_4$: the amount of movement of the 4-th lens unit when zooming is effected from the wide end (taken here as a standard position) to the tele end.

In the first to sixth zoom lens systems, it is preferable to satisfy the following condition:

$$|\beta_{2T}| < 1$$

where $\beta_{2T}$: the lateral magnification of the 2-nd lens unit at the tele end.

In the first to sixth zoom lens systems, it is also preferable to satisfy the following condition:

$$\beta_5 < 1$$

where $\beta_5$: the lateral magnification of the 5-th lens unit.

Seventhly, the present invention provides a zoom lens system used in a photographic objective optical system which is provided independently of a finder objective optical system. The zoom lens system has, in order from the object side, a 1-st lens unit of positive power, a 2-nd lens unit of negative power which is provided on the image side of the 1-st lens unit with a spacing therebetween, a 3-rd lens unit of positive power which is provided on the image side of the 2-nd lens unit with a stop interposed therebetween, a 4-th lens unit provided on the image side of the 3-rd lens unit with a spacing therebetween, and a 5-th lens unit provided on the image side of the 4-th lens unit with a spacing therebetween, wherein when zooming from the wide end toward the tele end is effected, the 1-st to 4-th lens units move on an optical axis with the spacing between each pair of adjacent lens units varied, while the 5-th lens unit is fixed during the zooming.

In the first to fifth and seventh zoom lens systems, it is preferable to satisfy the following condition (1):

$$0.6 < f_1/f_3 < 2.0 \quad (1)$$

where $f_1$: the focal length of the 1-st lens unit; and $f_3$: the focal length of the 3-rd lens unit.

In the first to fifth and seventh zoom lens systems, it is also preferable to satisfy the following condition (2):

$$0.25 < f_{12W}/f_3 < 0.9 \quad (2)$$

where $f_{12W}$: the composite focal length of the 1-st and 2-nd lens units at the wide end; and $f_3$: the focal length of the 3-rd lens unit.

Further, in the first to fifth and seventh zoom lens systems, it is preferable to satisfy the following condition (3):

$$0.4 < f_3/f_4 < 2.5 \quad (3)$$

where $f_3$: the focal length of the 3-rd lens unit; and $f_4$: the focal length of the 4-th lens unit.

Further, in the first to fifth and seventh zoom lens systems, it is preferable to satisfy the following condition (4):

$$0.2 < \gamma \cdot X_2/X_3 < 1.8 \quad (4)$$

where $\gamma$: the zoom ratio (=the focal length at the tele end divided by the focal length at the wide end);

$X_2$: the amount of movement of the 2-nd lens unit when zooming is effected from the wide end (taken here as a standard position) to the tele end; and $X_3$: the amount of movement of the 3-rd lens unit when zooming is effected from the wide end (taken here as a standard position) to the tele end.

Further, in the first to fifth and seventh zoom lens systems, it is preferable to satisfy the following condition (5):

$$0.5 < \gamma \cdot X_4/X_3 < 7.0 \quad (5)$$

where $\gamma$: the zoom ratio (=the focal length at the tele end divided by the focal length at the wide end);

$X_3$: the amount of movement of the 3-rd lens unit when zooming is effected from the wide end (taken here as a standard position) to the tele end; and $X_4$: the amount of movement of the 4-th lens unit when zooming is effected from the wide end (taken here as a standard position) to the tele end.

The reason for adopting the above-described arrangements and the functions thereof will be explained below.

The present applicant has heretofore proposed wide-angle, high-magnification zoom lens systems in, for example, Japanese Patent Application Laid-Open (KOKAI) Nos. 62-209508 (1987) and 03-177806 (1991). The proposed zoom lens systems have five lens units, that is, a 1-st lens unit of positive power, a 2-nd lens unit of negative power, a 3-rd lens unit of positive power, a 4-th lens unit of positive power, and a 5-th lens unit of negative power, which are disposed in the mentioned order from the object side. In these zoom lens systems, the 5-th lens unit is formed from a lens unit of negative refractive power which is stationary at a fixed position during zooming, thereby achieving a reduction in the overall size of the lens system. The present applicant has also proposed a method whereby the optical performance in focusing from infinity to a finite object point can be stabilized by optimizing the focusing system.

Japanese Patent Application Laid-Open (KOKAI) No. 58-129404 (1983) and Japanese Patent Application Post-Exam Publication No. 61-51297 (1986) disclose zoom lens systems having five lens units, that is, a 1-st lens unit of positive power, a 2-nd lens unit of negative power, a 3-rd lens unit of positive power, a 4-th lens unit of positive power, and a 5-th lens unit of positive power, which are disposed in the mentioned order from the object side. One of the features of the former zoom lens system resides in that the 5-th lens unit of positive refractive power is used as a focusing lens unit. One of the features of the latter zoom lens system resides in that the 5-th lens unit of positive refractive power moves during zooming.

Japanese Patent Application Post-Exam Publication No. 58-32684 (1983) proposes a four-unit zoom lens system having, in order from the object side, a 1-st lens unit of positive power, a 2-nd lens unit of negative power, a 3-rd lens unit of positive power, and a 4-th fixed lens unit of positive power. The proposed zoom lens system is based on an idea common to the above-described conventional zoom lens systems in that a single positive lens is used as the final lens unit. These proposed zoom lens systems provide a relatively high zoom ratio but have a low aperture ratio in common.

The present invention provides a wide-angle, fast zoom lens system capable of stably exhibiting high optical performance by adopting the zoom lens type that has a 1-st lens unit of positive refractive power on the object side thereof.

Considering the behavior of rays caused by a raise in the aperture ratio, since the height of rays incident on each lens surface increases, it becomes difficult to correct spherical and comatic aberrations and also difficult to suppress chromatic aberration. Considering the image surface illuminance, it is also necessary to increase the off-axis luminous flux. Therefore, the lens system inevitably increases in size in order to attain the given optical performance. It is also necessary to pay attention to the shift of the best image surface that occurs when the stop is diaphragmed from the open aperture position. At the tele end, where the beam diameter of the marginal rays increases, special attention must also be given to the aberration variation during focusing.

To realize a fast zoom lens system that exhibits favorable optical performance and has an appropriate lens system size, various conditions must be satisfied.

That is, to minimize the variation of various aberrations during zooming in a fast zoom lens system covering the photography range of from the wide-angle region to the telephoto region, it is necessary that constituent lens units should have appropriate refractive power, and that the amount of aberration produced in thick lens elements as a result of the movement of the lens units during zooming should also be appropriate.

In this regard, the zoom lens system of Japanese Patent Application Laid-Open (KOKAI) No. 62-209508 (1987), proposed by the present applicant, is disadvantageous. That is, when the 5-th lens unit, which is fixed during zooming, has a negative refractive power and hence an enlarging magnifying power, as the aperture ratio increases, it becomes difficult to correct aberrations satisfactorily. Thus, the proposed zoom lens system is limited in its capability of aberration correction, although this type of zoom lens system is suitable for reducing the overall size of the lens system.

That is, in a fast zoom lens system, the actual aperture ratio of the main lens unit, which is composed of the 1-st to 4-th lens units, becomes higher, and it is necessary to reduce aberrations even more from the theoretical point of view. Thus, there is a limit to the aberration correction.

Accordingly, the present invention proposes satisfying the following requirements:

The present invention provides a zoom lens system having, in order from the object side, a 1-st lens unit of positive refractive power, a 2-nd lens unit of negative refractive power, a 3-rd lens unit of positive refractive power, a 4-th lens unit of positive refractive power, and a 5-th lens unit of positive refractive power, wherein when zooming from the wide end toward the tele end is effected, the 1-st, 2-nd, 3-rd and 4-th lens units are movable, while the 5-th lens unit is fixed, and the following conditions (1) to (5) are satisfied:

$$0.6 < f_1/f_3 < 2.0 \tag{1}$$

$$0.25 < -f_{12W}/f_3 < 0.9 \tag{2}$$

$$0.4 < f_3/f_4 < 2.5 \tag{3}$$

$$0.2 < \gamma \cdot X_2/X_3 < 1.8 \tag{4}$$

$$0.5 < \gamma \cdot X_4/X_3 < 7.0 \tag{5}$$

where $f_1$: the focal length of the 1-st lens unit;

$f_{12W}$: the composite focal length of the 1-st and 2-nd lens units at the wide end;

$f_3$: the focal length of the 3-rd lens unit;

$f_4$: the focal length of the 4-th lens unit;

$\gamma$: the zoom ratio (=the focal length at the tele end divided by the focal length at the wide end)

$X_2$: the amount of movement of the 2-nd lens unit when zooming is effected from the wide end (taken here as a standard position) to the tele end;

$X_3$: the amount of movement of the 3-rd lens unit when zooming is effected from the wide end (taken here as a standard position) to the tele end; and $X_4$: the amount of movement of the 4-th lens unit when zooming is effected from the wide end (taken here as a standard position) to the tele end.

The object of the present invention is to propose a fast zoom lens system which enables photography in the range of from the wide-angle region to the telephoto region, as has been stated above. The above-described lens arrangement is excellent as a zoom lens system for the reason described below. If the lens arrangement that is comprised of the 1-st to 4-th lens units is regarded as a main lens system, the product of the amount of aberration left uncorrected in these lens units and the longitudinal magnification of the 5-th lens unit may be considered to be the amount of longitudinal aberration. Therefore, it is important in a fast zoom lens system to appropriately determine aberration correction conditions in the above-described main lens system, the refractive power distribution and the magnification of the 5-th lens unit. This is one of the important points in attaining favorable optical performance without increasing the refractive power of each lens unit in the main lens system more than is needed even if the zoom lens system has a large aperture.

The condition (1) regulates the refractive powers of 1-st and 3-rd lens units. If the lower limit of the condition (1) is not reached, i.e., if $f_1/f_3$ is not larger than 0.6, it becomes difficult to correct aberrations, mainly spherical and comatic aberrations in the telephoto region, and favorable optical performance cannot be obtained as a whole. If the upper limit of the condition (1) is exceeded, i.e., if $f_1/f_3$ is not smaller than 2.0, there will be an increase in the amount of movement of the 1-st lens unit during zooming, and when the 1-st lens unit is used as a focusing lens unit, there will be an increase in the amount of lens movement for focusing. Thus, the lens arrangement becomes ill-balanced as a whole and increases in the overall size. Accordingly, no favorable results can be obtained.

The condition (2) regulates the refractive power of the 2-nd lens unit in relation to the condition (1). If the lower limit of the condition (2) is not reached, i.e., if $-f_{12W}/f_3$ is not larger than 0.25, the Petzval's sum of the entire system tends to decrease, and the field curvature tends to be over-corrected. Thus, it becomes difficult to correct various aberrations, including coma and astigmatism. If the upper limit of the condition (2) is exceeded, i.e., if $-f_{12W}/f_3$ is not smaller than 0.9, the Petzval's sum tends to increase, which is advantageous for the correction of aberrations in the entire system. However, the constituent elements tend to increase in size, including the diameter of the front lens.

The condition (3) regulates the refractive power relationship between the 3-rd and 4-th lens units. When the aperture ratio is raised, the correction of spherical aberration first becomes a problem. Thus, it is important to determine an appropriate refractive power for the 3-rd lens unit. To obtain stable optical characteristics of the off-axis image surface on the basis of the refractive power of the 3-rd lens unit, it is extremely important to appropriately distribute a refractive power to the 4-th lens unit. If the lower limit of the condition (3) is not reached, i.e, if $f_3/f_4$ is not larger than 0.4, it becomes difficult to correct various aberrations, including spherical aberration. In addition, the sensitivity to decentration becomes undesirably high, which gives rise to a serious problem. If the upper limit of the condition (3) is exceeded, i.e., if $f_3/f_4$ is not smaller than 2.5, unfavorable results are produced, such as an increase in the amount of lens movement during zooming, an increase in the magnification of the 5-th lens unit, or a problem that the locus of movement of the remaining lens units during zooming becomes non-linear.

The conditions (4) and (5) regulate the amount of movement of lens units during zooming. The condition (4) regulates the ratio of the amount of movement of the 2-nd lens unit to the amount of movement of the 3-rd lens unit. The condition (4) also takes into account the relationship between the zoom ratio and the amount of lens movement. That is, the condition (4) implies that as the zoom ratio increases, the load of lateral magnification imposed on the lens units also increases. If the lower limit of the condition (4) is not reached, i.e., if $\gamma \cdot X_2/X_3$ is not larger than 0.2, the amount of movement of the 2-nd lens unit becomes exceedingly small, resulting in a reduction of the intended effect. Therefore, the resulting effect is rather similar to that obtained with an arrangement where the 2-nd lens unit is fixed during zooming. If the upper limit of the condition (4) is exceeded, i.e., if $\gamma \cdot X_2/X_3$ is not smaller than 1.8, the amount of movement of 2-nd lens unit increases. Accordingly, it is desired to lower the height of rays incident on the 2-nd lens unit in order to obtain favorable performance despite the high aperture ratio at the telephoto side. As a result, the amount of movement of the 1-st lens unit during zooming increases, causing an increase in the overall size of the lens system, unfavorably.

The condition (5) regulates the ratio of the amount of movement of the 4-th lens unit to the amount of movement of the 3-rd lens unit. The reason why the 3-rd and 4-th lens units in the optical system need to move independently of each other is that the main purpose is to correct field curvature, which is off-axis aberration. Accordingly, the relationship between the appropriate refractive power distribution to the 3-rd and 4-th lens units and the amount of lens movement during zooming is extremely important from the viewpoint of obtaining favorable performance over the entire zoom range. The magnification relationship between the 3-rd and 4-th lens units during zooming is such that the product of the respective lateral magnifications multiplies, and when the 2-nd lens unit independently moves from the wide end toward the tele end for zooming, the magnification multiplies. When the lower limit of the condition (5) is not reached, i.e., when $\gamma \cdot X_4/X_3$ is not larger than 0.5, it means that the amount of movement of the 3-rd lens unit exceeds the amount of movement of the 4-th lens unit.

One of the features of the zoom lens system according to the present invention resides in that the refractive power is distributed to the lens units as described above, and that the 2-nd lens unit moves toward the object side during zooming from the wide end toward the tele end. In this regard, it is preferable to satisfy the following condition:

$$|\beta_{2T}|<1$$

where $\beta_{2T}$: the lateral magnification of the 2-nd lens unit at the tele end.

If $|\beta_{2T}|$ is not smaller than 1, even if a zoom lens system having a high zoom ratio is actually attained, there is a need for a lens unit that non-linearly moves relative to the other lens units, which is unfavorable from the viewpoint of the mechanical arrangement and of maintaining the required accuracy.

A significant feature of the present invention resides in that the optical system has an enlarged aperture. Thus, for the correction of spherical aberration, appropriate distribution of refractive power to the 2-nd lens unit is important; for the correction of off-axis aberration, appropriate distribution of refractive power to the 4-th lens unit is important. In the meantime, the main aberration left uncorrected in the main lens system, i.e., the 1-st to 4-th lens units, is field curvature, and the 5-th lens unit serves to correct the field curvature and reduce it to a reasonable value. The 5-th lens unit has a positive refractive power for the purpose of facilitating the aberration correction made in the main lens system. It is preferable to satisfy the following condition:

$$\beta_5<1$$

where $\beta_5$: the lateral magnification of the 5-th lens unit.

With this condition, the focal length $f_M$ and F-number $F_{NOM}$ of the main lens system are expressed by the following relationship, which is advantageous for optical design:

$$f_M=f/\beta_5$$

$$F_{NO}=F_{NOM}/\beta_5$$

where f: the focal length of the entire system; and $F_{NO}$: the F-number of the entire system.

However, it is impossible with only the 5-th lens unit to satisfactorily suppress the aberration variation during zooming or focusing. Therefore, this role depends on the main lens system. That is, delicate correction of the image surface in the zoom range is realized by moving the lens units independently of each other on the basis of the condition (5). With regard to the aberration variation during focusing, lens units, for example, the 1-st and 2-nd lens units, are moved in combination with each other, thereby minimizing the amount of lens movement for focusing and also the aberration variation during focusing.

To use the zoom lens system in the telephoto region, an anomalous partial dispersion glass material should be used for the 1-st lens unit. For the correction of off-axis comatic aberration, attention should be paid to the thick lens arrangement of the 2-nd lens unit.

Next, the arrangement of each lens unit will be explained.

As has been described above, since the 5-th lens unit, which is fixed during zooming, has a reduction magnification, the 1-st to 4-th lens units, which may be considered to be a main lens unit, have a length longer than the focal length of the entire system and also have an aperture ratio smaller than that of the entire system. Accordingly, the lens arrangement is not necessarily advantageous from the viewpoint of reducing the overall length. However, the arrangement does not necessitate increasing the refractive power of each lens unit more than is needed. Therefore, it is useful for attaining favorable optical performance. The arrangement is extremely useful for realizing a zoom lens system having a high aperture ratio in particular.

It is possible to overcome the difficulties in correcting aberrations and solve the problem of mechanical interference which is concerned with the amount of movement of each lens unit by satisfying the above-described conditions and optimizing the arrangement of the lens system.

The 1-st lens unit has at least a doublet component which is composed of one negative lens and one positive lens. The 2-nd lens unit is basically composed, in order from the object side, of a negative meniscus lens having a convex surface toward the object side, a doublet of a negative lens component and a positive lens component, a negative lens whose object-side surface has a relatively high curvature, and a positive lens component. It is a matter of course that the arrangement of the 2-nd lens unit is not necessarily limited to the above, and that other arrangement may also be adopted to realize the desired lens system. The 3-rd lens unit is basically composed of at least a doublet of one positive lens and one negative lens. The 4-th lens unit is basically composed of at least a doublet of one negative lens and one positive lens. It is even more preferable to use an aspherical surface for the 4-th lens unit. Accordingly, it is preferable to use a triplet to constitute the 4-th lens unit because a high-order aberration producing aspherical surface can be provided.

The 5-th lens unit, which also serves to correct the image surface, can be basically composed of a single positive lens. However, to obtain even more favorable optical performance, it is preferable to constitute the 5-th lens unit of one positive lens and one negative lens.

The effective aperture of the 1-st lens unit is determined by the axial bundle of rays at the tele end, or by the most off-axis bundle of rays, which has a large beam diameter, because of the high aperture ratio. The 1-st lens unit produces under-corrected spherical aberration and astigmatism and over-corrected comatic aberration on the one hand, and it produces positive distortion on the other. In view of the entire system, the amount of high-order aberration produced therein is not so large.

On the other hand, the 2-nd lens unit, which is the sole negative lens unit, serves to make correction of the image surface, including the over-corrected astigmatism. The 2-nd lens unit also serves to produce negative distortion to thereby correct the positive distortion produced by the 1-st lens unit. To obtain an image surface of excellent flatness in particular, the refractive power and lens arrangement of the 2-nd lens unit are important. Special attention must be paid to this point in the case of a zoom lens system designed to enable photography in the range of from the wide-angle region to the telephoto region. The 2-nd lens unit should be arranged so that various aberrations, including spherical aberration, astigmatism and coma, are canceled by the action of air lenses disposed in the 2-nd lens unit.

The 3-rd lens unit arranged as described above is characterized by producing over-corrected spherical aberration.

Moreover, it produces under-corrected comatic aberration. Particularly, by providing air lenses, high-order spherical aberration is produced. Thus, the aberration producing surfaces cancel each other's aberrations, and well-balanced central performance can be obtained.

The 4-th lens unit serves to produce under-corrected spherical aberration and over-corrected comatic aberration.

The 5-th lens unit over-corrects astigmatism and serves to raise the image surface. It also serves to obtain balance of comatic aberration in the entire system.

Next, it is necessary to take into consideration focusing to a finite object point in addition to the balance of optical performance over the entire zoom range. This is extremely important from the viewpoint of clarifying the relationship between the size of the optical system and the optical performance.

That is, selection of a focusing lens unit defines the focal length of the focusing lens unit. Accordingly, it is possible to ascertain the amount of lens movement for focusing, the aberration variation and the change of the point where a bundle of rays passes in the optical system, which are variable according to the object distance. For example, in the case of a conventional focusing system in which the 1-st lens unit is moved for focusing, since the refractive power of this lens unit is relatively small, the amount of lens movement for focusing tends to increase. In contrast, when the 1-st and 2-nd lens units are moved for focusing, the amount of lens movement is relatively small, as shown in Examples, and it is also possible to suppress the aberration variation. Similar advantageous effect can be obtained by moving the 3-rd to 5-th lens units to effect focusing as long as limitations on the manufacturing sensitivity by the brightness of the edge of image field, back focus and longitudinal magnification are allowable. It is also possible to effect focusing by moving the 2-nd lens unit, provided that sufficient focusing spacings can be ensured and the aberration variation can be reduced to a satisfactorily low level.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1a–1d is a sectional view showing a zoom lens system of Example 1 of the present invention at the wide end (a) and also at the tele end (b).

FIG. 9(a)–9(h) graphically show spherical aberration, astigmatism, lateral chromatic aberration and distortion at the wide end with respect to the infinite object distance (a) and an object distance of 1.2 m (b) in Example 1.

FIG. 11(a)–11(h) graphically show various aberrations at the tele end in Example 1 in a similar manner to FIG. 9.

FIG. 12(a)–12(h) graphically show spherical aberration, astigmatism, lateral chromatic aberration and distortion at the wide end with respect to the infinite object distance (a) and an object distance of 0.7 m (b) in Example 2.

FIG. 13(a)–(h) graphically show various aberrations at the middle focal length position in Example 2 in a similar manner to FIG. 12.

FIG. 16(a)–(h) graphically show various aberrations at the middle focal length position in Example 3 in a similar manner to FIG. 12.

FIG. 17(a)–(h) graphically show various aberrations at the tele end in Example 3 in a similar manner to FIG. 12.

FIG. 18(a)–(h) graphically show various aberrations at the wide end in Example 4 in a similar manner to FIG. 12.

FIG. 20(a) & (b) graphically show various aberrations at the tele end in Example 4 in a similar manner to FIG. 12.

FIG. 21(a)–(h) graphically show spherical aberration, astigmatism, lateral chromatic aberration and distortion at the wide end with respect to the infinite object distance (a) and an object distance of 1.0 m (b) in Example 5.

FIG. 23(a)–23(h) graphically show various aberrations at the tele end in Example 5 in a similar manner to FIG. 21.

FIG. 24(a)–24(h) graphically show various aberrations at the wide end in Example 6 in a similar manner to FIG. 9.

FIG. 26(a)–26(h) graphically show various aberrations at the tele end in Example 6 in a similar manner to FIG. 9.

FIG. 27(a)–27(h) graphically show various aberrations at the wide end in Example 7 in a similar manner to FIG. 9.

FIG. 29(a)–29(h) graphically show various aberrations at the tele end in Example 7 in a similar manner to FIG. 9.

FIG. 33(a)–33(h) graphically show various aberrations at the wide end in Example 9 in a similar manner to FIG. 12.

FIG. 34(a)–34(h) graphically show various aberrations at the middle focal length position in Example 9 in a similar manner to FIG. 12.

DESCRIPTION OF THE PREFERRED EMBODIMENTS

Examples 1 to 9 of the zoom lens system according to the present invention will be described below.

Figure 1A:
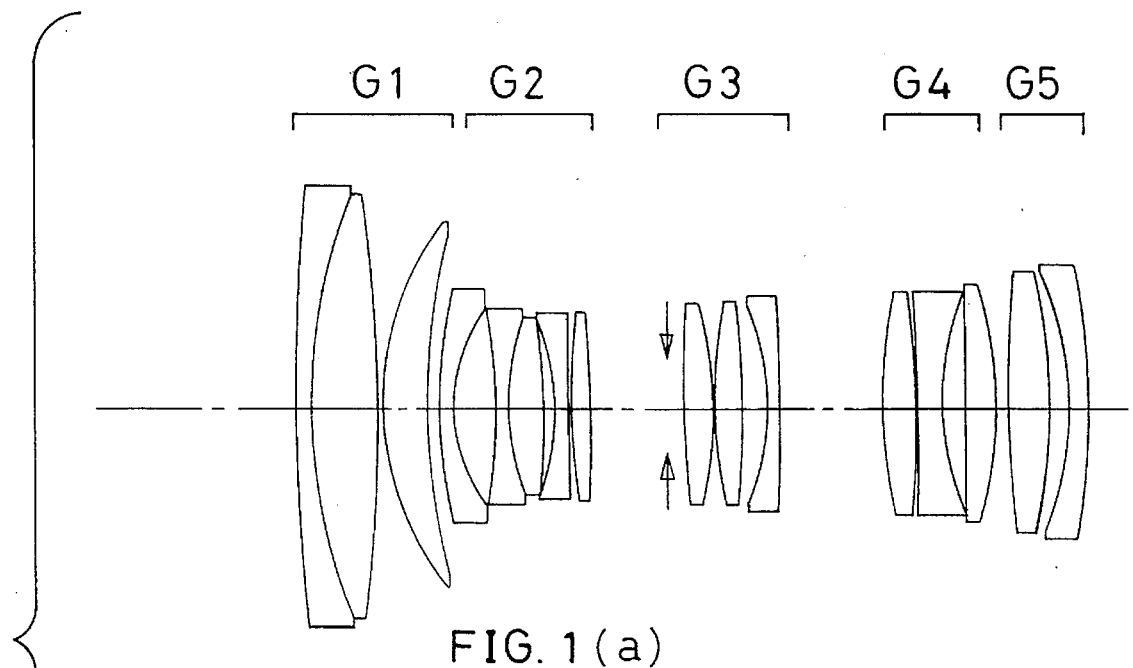
Figure 1B:
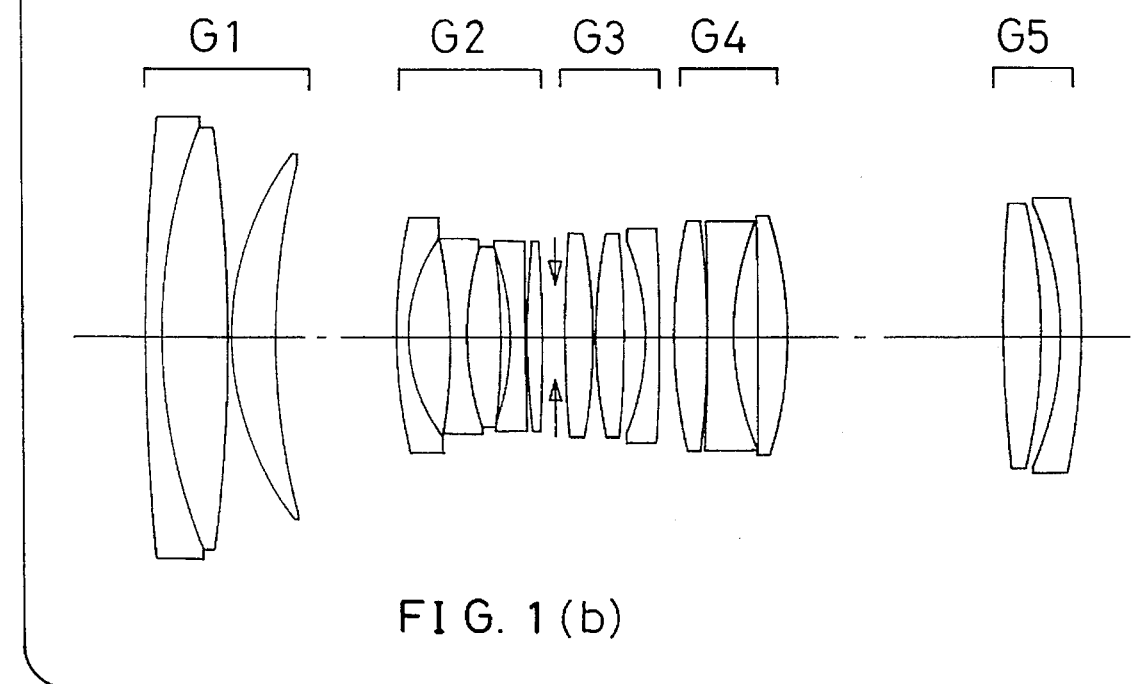

Example 1 is a zoom lens system having a focal length ranging from 36.15 mm to 76.4 mm and an aperture ratio of 1:2.85 (24×36 mm format film). FIG. 1 is a sectional view showing the zoom lens system at the wide end (a) and also at the tele end (b). In this zoom lens system, the 1-st and 2-nd lens units G1 and G2 are moved together as one unit for focusing. Example 1 is characterized in that an anomalous partial dispersion glass material is employed for a lens element in the 1-st lens unit G1, and that two air lenses are provided in the 2-nd lens unit G2. Another feature resides in that air lenses are provided in the 3-rd lens unit, and the 4-th lens unit is arranged in the form of a triplet, thereby achieving a reduction in the size, which is a feature common to all Examples. In this Example, the 5-th lens unit G5 is composed of two lens elements, that is, a positive lens and a negative lens. With regard to the refractive power distribution, the 1-st lens unit G1, the 2-nd lens unit G2 and the 3-rd lens unit G3, which constitute an approximately a focal or diverging lens system, have a relatively large refractive power.

FIGS. 9A to 11H graphically show spherical aberration, astigmatism, lateral chromatic aberration and distortion at the wide end (FIG. 9), the middle focal length position (FIG. 10), and the tele end (FIG. 11) with respect to the infinite object distance (a) and an object distance of 1.2 m (b) in Example 1. Focusing is effected by moving the 1-st and 2-nd lens units G1 and G2. As will be understood from the graphs, the aberration variation is small. In all Examples except for Example 6 (described later), focusing is basically effected by moving the 1-st and 2-nd lens units G1 and G2 together as one unit.

Example 2 is a zoom lens system having a focal length ranging from 35.72 mm to 74.47 mm and an aperture ratio of 1:2.85. The lens arrangement of Example 2 is approximately the same as that shown in FIG. 1. With regard to the refractive power distribution, the refractive powers of the 1-st lens unit G1 to the 3-rd lens unit G3 are slightly smaller than those in Example 1. The amounts of movement of 1-st and 3-rd lens units G1 and G3 during zooming are relatively large. Focusing is realized by moving the 1-st and 2-nd lens units G1 and G2. FIGS. 12A to 14H graphically show spherical aberration, astigmatism, lateral chromatic aberration and distortion at the wide end (FIG. 12), the middle focal length position (FIG. 13), and the tele end (FIG. 14) with respect to the infinite object distance (a) and an object distance of 0.7 m (b) in this Example.

Figures 2A, 2B:
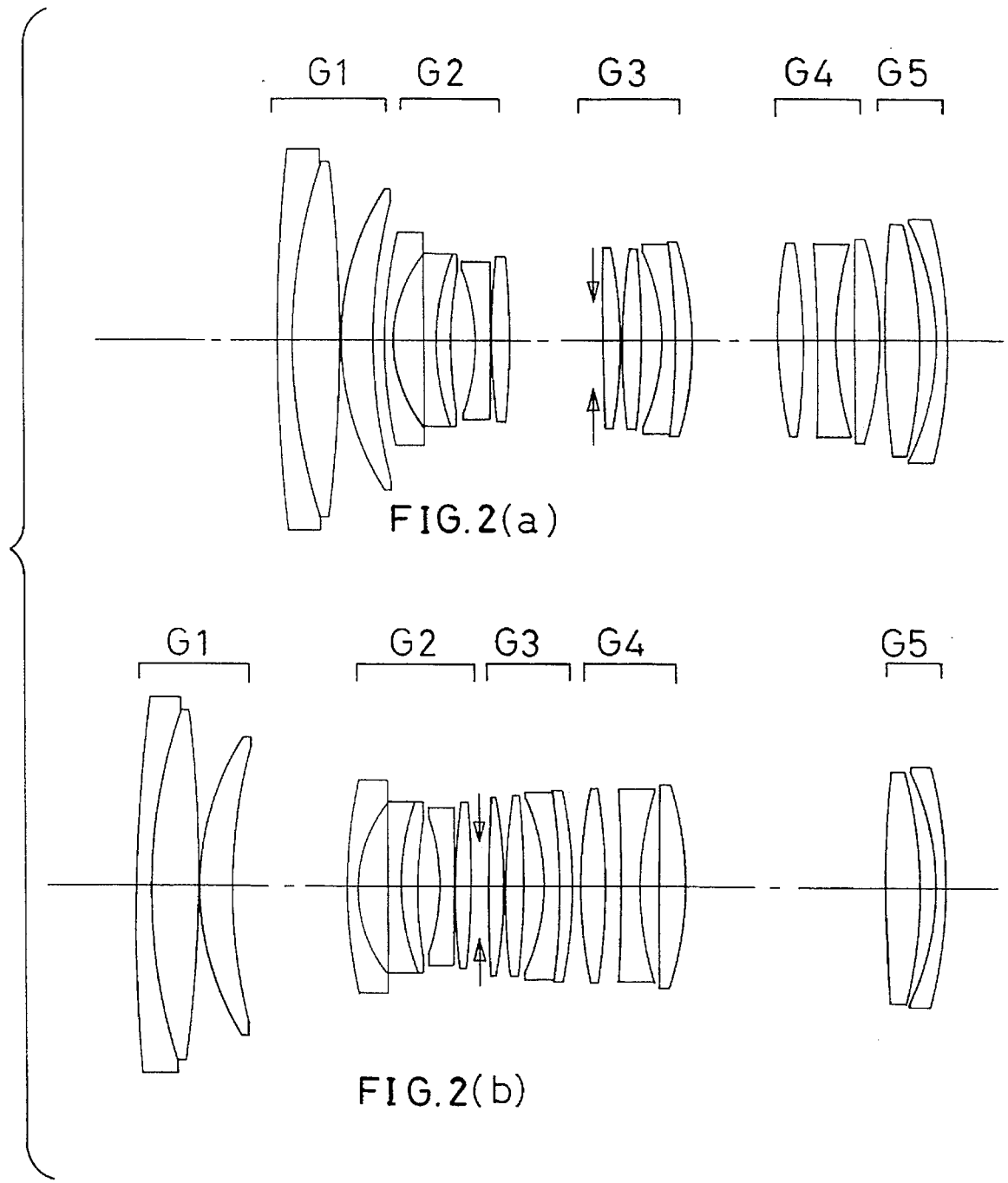
FIG. 2(a) & 2(b) is a sectional view showing a zoom lens system of Example 3 in a similar manner to FIG. 1.

Example 3 is a zoom lens system having a focal length ranging from 35.6 mm to 79.05 mm and an aperture ratio of 1:2.835. FIG. 2 is a sectional view showing the lens arrangement of Example 3 in a similar manner to FIG. 1. In this Example, the 3-rd lens unit G3 is composed of four lens elements in view of the sensitivity to decentration. FIGS. 15A to 17H graphically show various aberrations in this Example in a similar manner to Example 2.

Figure 3A:
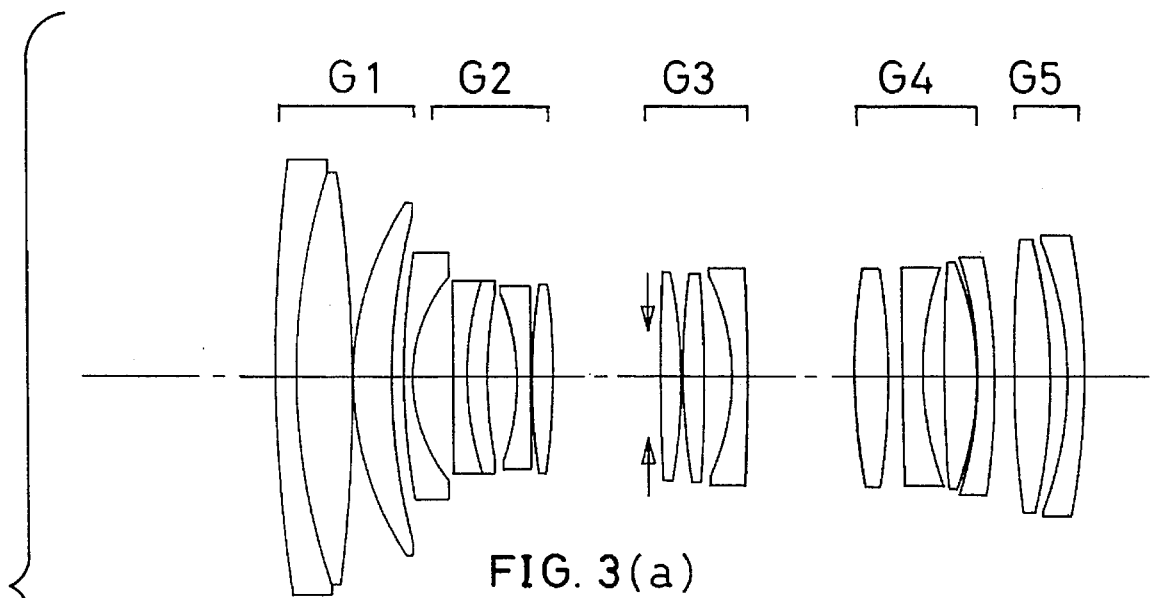
FIG. 3(a) & 3(b) is a sectional view showing a zoom lens system of Example 4 in a similar manner to FIG. 1.
Figure 3B:
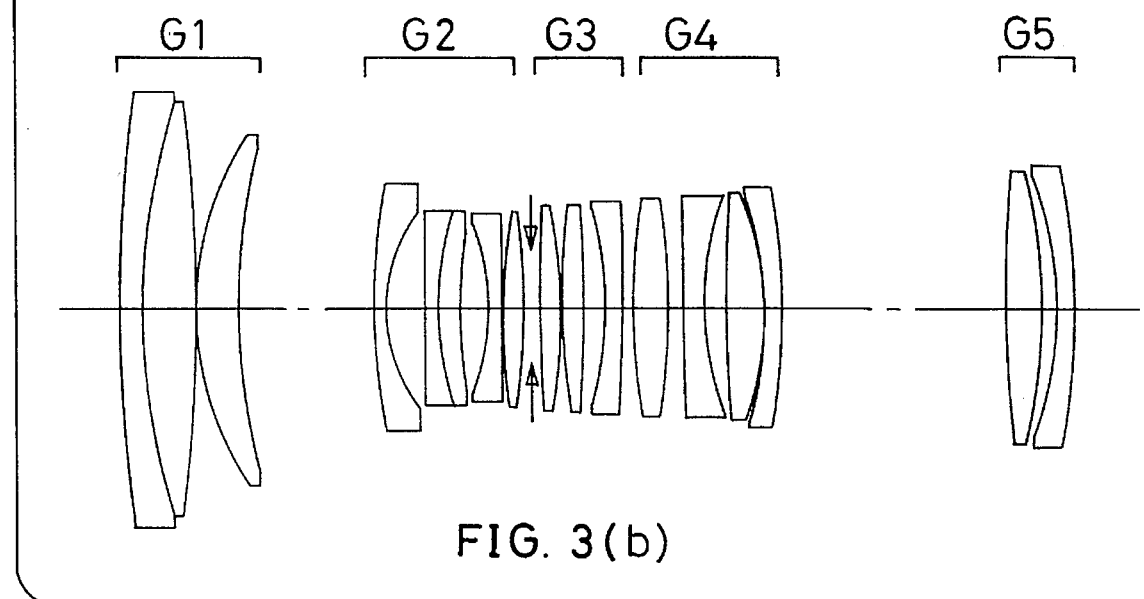

Example 4 is a zoom lens system having a focal length ranging from 35.3 mm to 79.95 mm and an aperture ratio of 1:2.828. FIG. 3 is a sectional view showing the lens arrangement of Example 4 in a similar manner to FIG. 1. In this Example, the 4-th lens unit G4 is composed of four lens elements. FIGS. 18A to 20H graphically show various aberrations in this Example in a similar manner to Example 2.

Figure 4A:
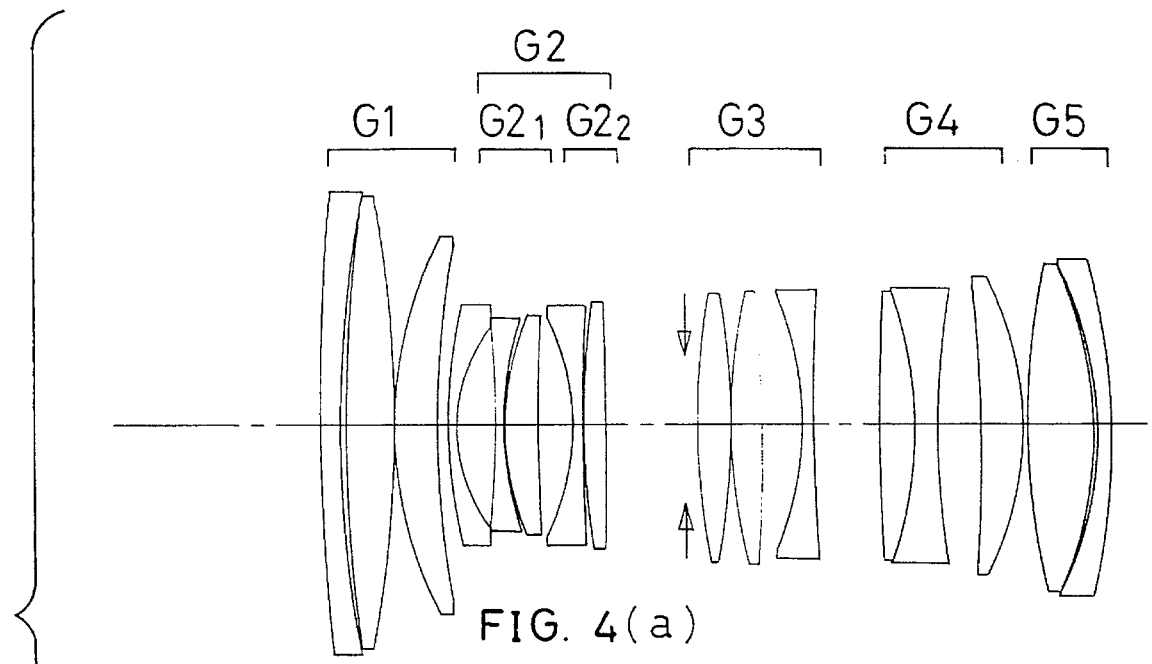
FIG. 4(a) & 4(b) is a sectional view showing a zoom lens system of Example 5 in a similar manner to FIG. 1.
Figure 4B:
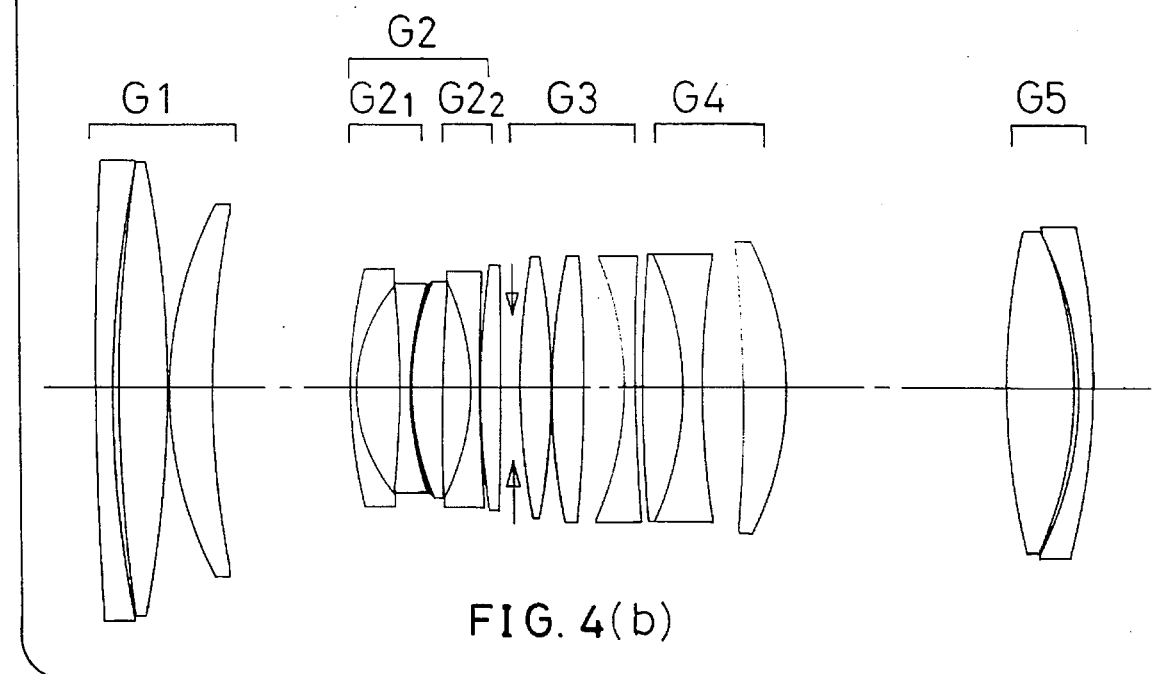

Example 5 is a zoom lens system intended to have a higher aperture ratio. The zoom lens system has a focal length ranging from 35.8 mm to 67.8 mm and an aperture ratio of 1:2.0. FIG. 4 is a sectional view showing the lens arrangement of Example 5 in a similar manner to FIG. 1. For this purpose, in this Example, the 2-nd lens unit G2 is divided into two sub-lens units $G2_1$ and $G2_2$, and the spacing therebetween is slightly varied as zooming is performed. In addition, aspherical surfaces are used for lens elements in the 2-nd and 3-rd lens units G2 and G3. FIGS. 21A to 23H graphically show spherical aberration, astigmatism, lateral chromatic aberration and distortion at the wide end (FIG. 21), the middle focal length position (FIG. 22), and the tele end (FIG. 23) with respect to the infinite object distance (a) and an object distance of 1.0 m (b) in this Example. The central performance is good. However, since the quantity of light increases, some problems still remain unsolved with regard to the correction of off-axis aberration.

Figure 5A:
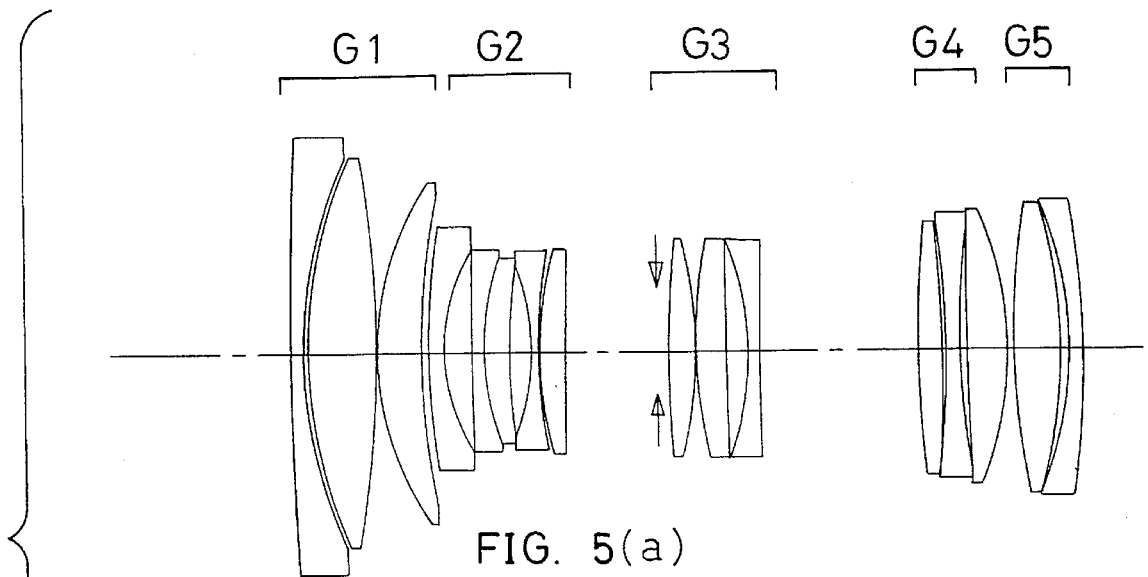
FIG. 5(a) & 5(b) a sectional view showing a zoom lens system of Example 6 in a similar manner to FIG. 1.
Figure 5B:
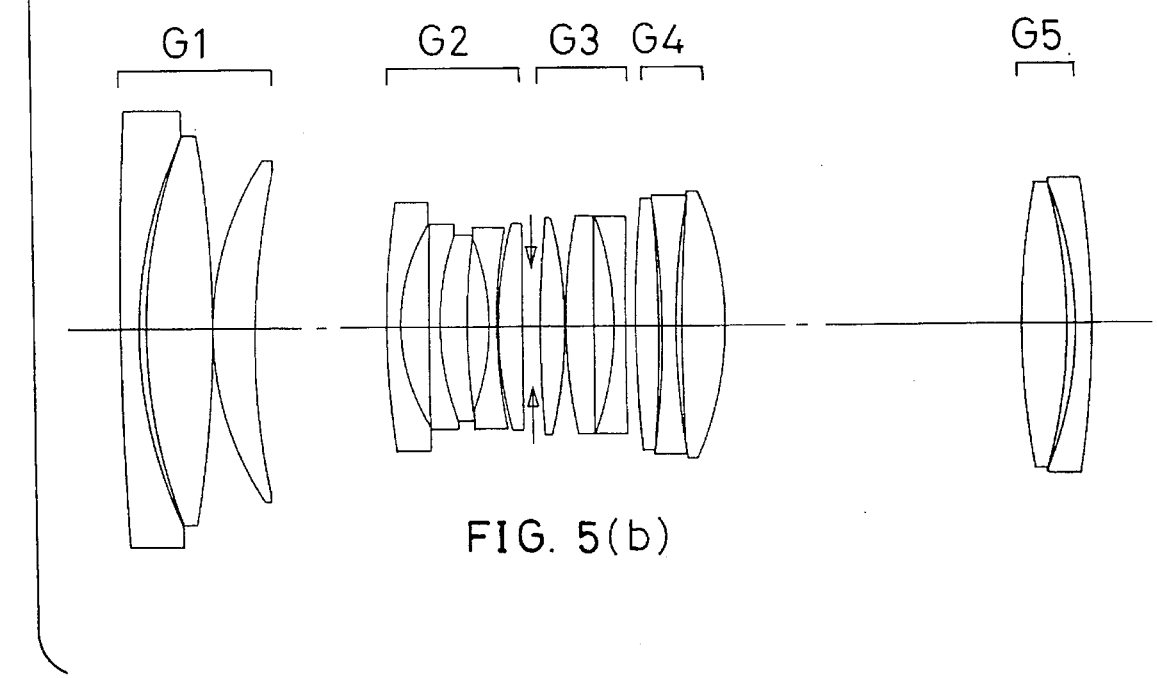

Examples 6 and 7 are zoom lens systems having a raised zoom ratio despite their high aperture ratio. Example 6 has a focal length ranging from 36 mm to 102 mm and an aperture ratio of 1:2.85. FIG. 5 is a sectional view showing the lens arrangement of Example 6 in a similar manner to FIG. 1. In this Example, aspherical surfaces are used for lens elements in the 2-nd and 4-th lens units G2 and G4. FIGS. 24A to 26H graphically show various aberrations in this Example in a similar manner to Example 1. In this Example, focusing is realized by using the 1-st and 2-nd lens units G1 and G2 in a floating manner wherein the spacing between these lens units is varied when focusing is effected on an object at a finite distance.

Figure 6A:
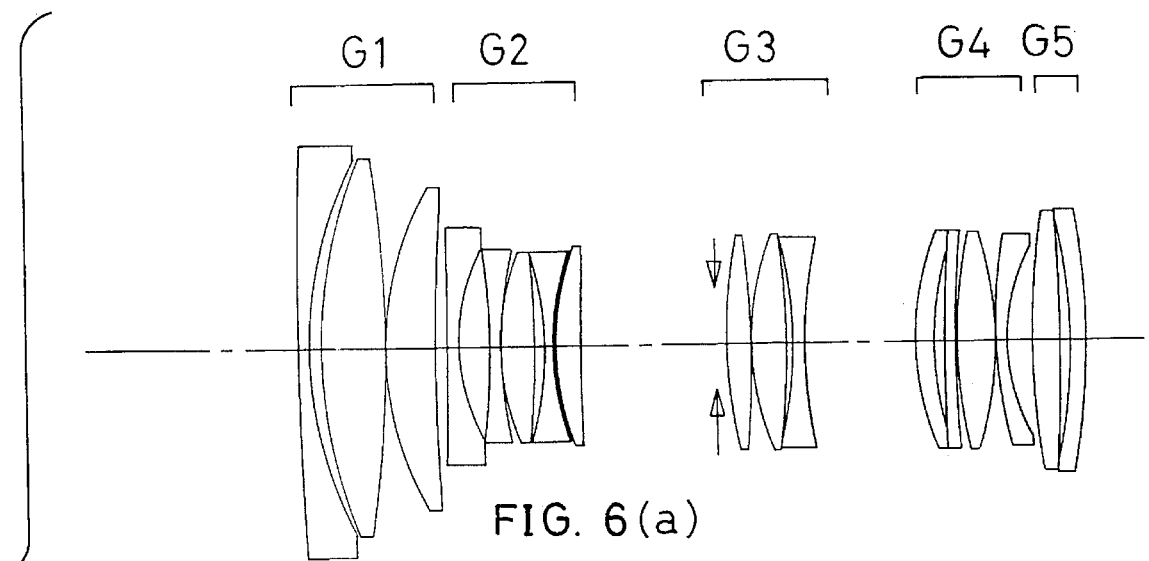
FIG. 6(a) & 6(b) is a sectional view showing a zoom lens system of Example 7 in a similar manner to FIG. 1.
Figure 6B:
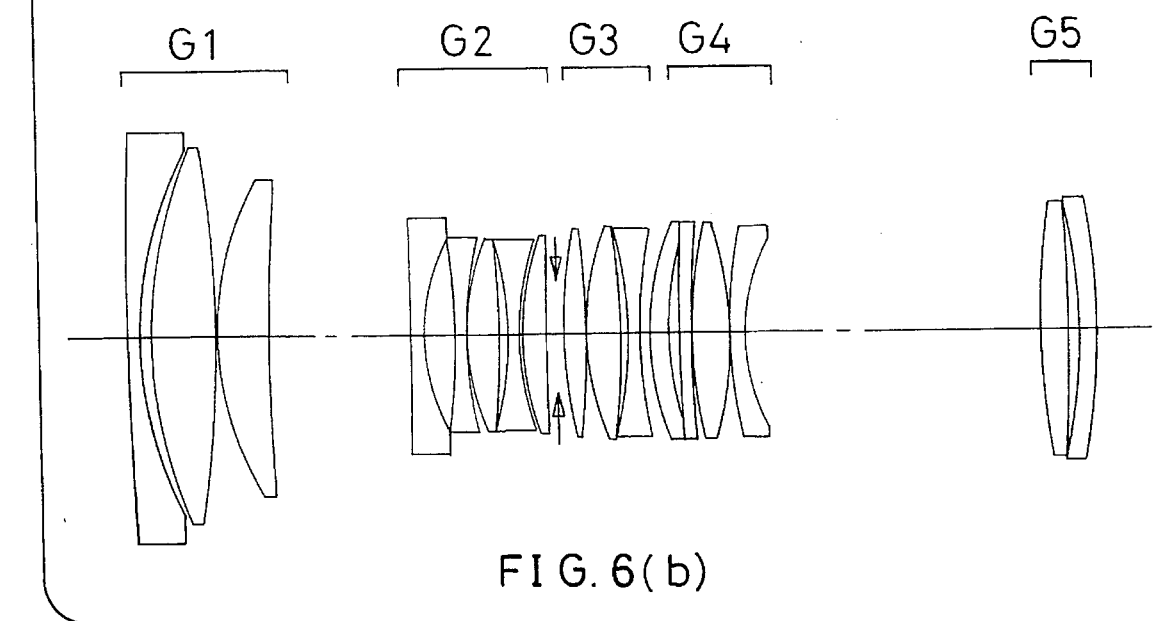

Example 7 is a zoom lens system having a focal length ranging from 35.8 mm to 131.5 mm and an aperture ratio of 1:2.85 to 3.65. This is a first attempt for this class of zoom lens system. Aspherical surfaces are used for lens elements in the 2-nd and 4-th lens units G2 and G4. FIG. 6 is a sectional view showing the lens arrangement of Example 7 in a similar manner to FIG. 1. FIGS. 27A to 29H graphically show various aberrations in this Example in a similar manner to Example 1.

Figure 7A:
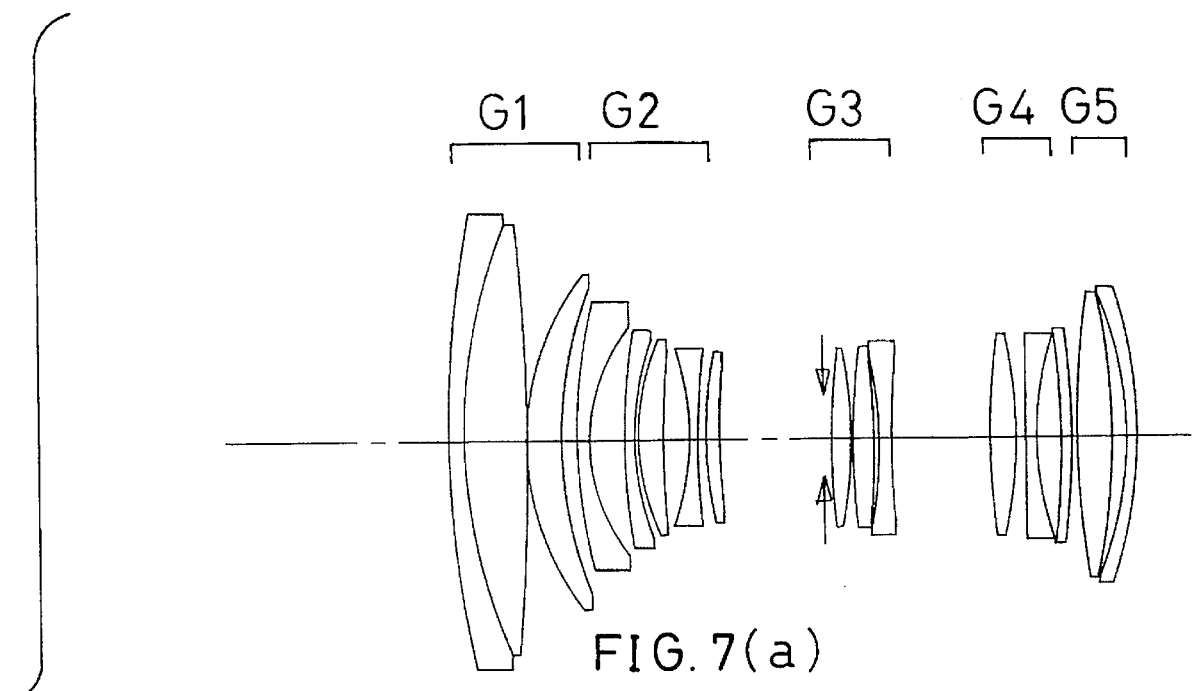
FIG. 7(a) & 7(b) a sectional view showing a zoom lens system of Example 8 in a similar manner to FIG. 1.
Figure 7B:
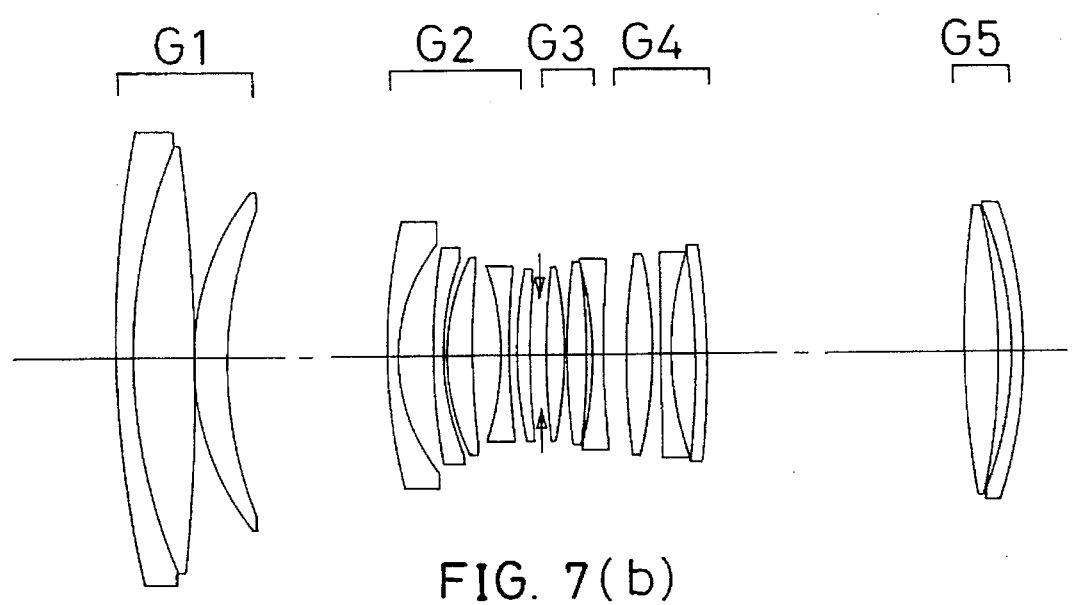

Examples 8 and 9 intend to reduce the overall size of a zoom lens system. Example 8 is a zoom lens system having a focal length ranging from 35.86 mm to 83.95 mm and an aperture ratio of 1:3.6. FIG. 7 is a sectional view showing the lens arrangement of Example 8 in a similar manner to FIG. 1. FIGS. 30A to 32H graphically show various aberrations in this Example in a similar manner to Example 2.

Figure 8A:
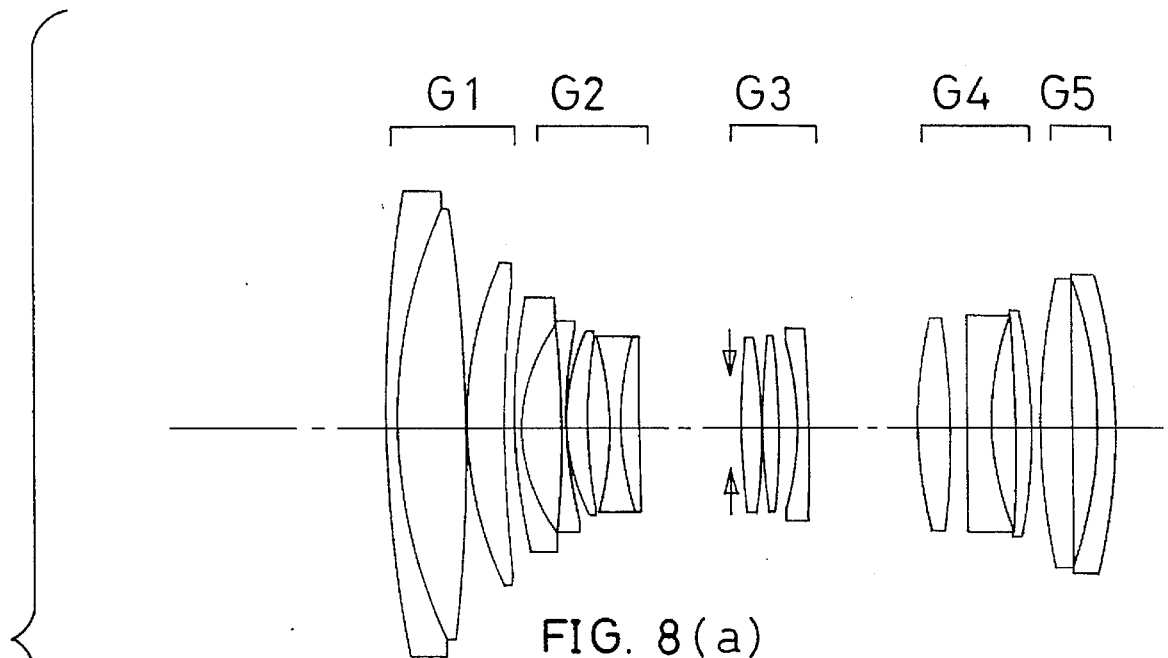
FIG. 8(a) & 8(b) is a sectional view showing a zoom lens system of Example 9 in a similar manner to FIG. 1.
Figure 8B:
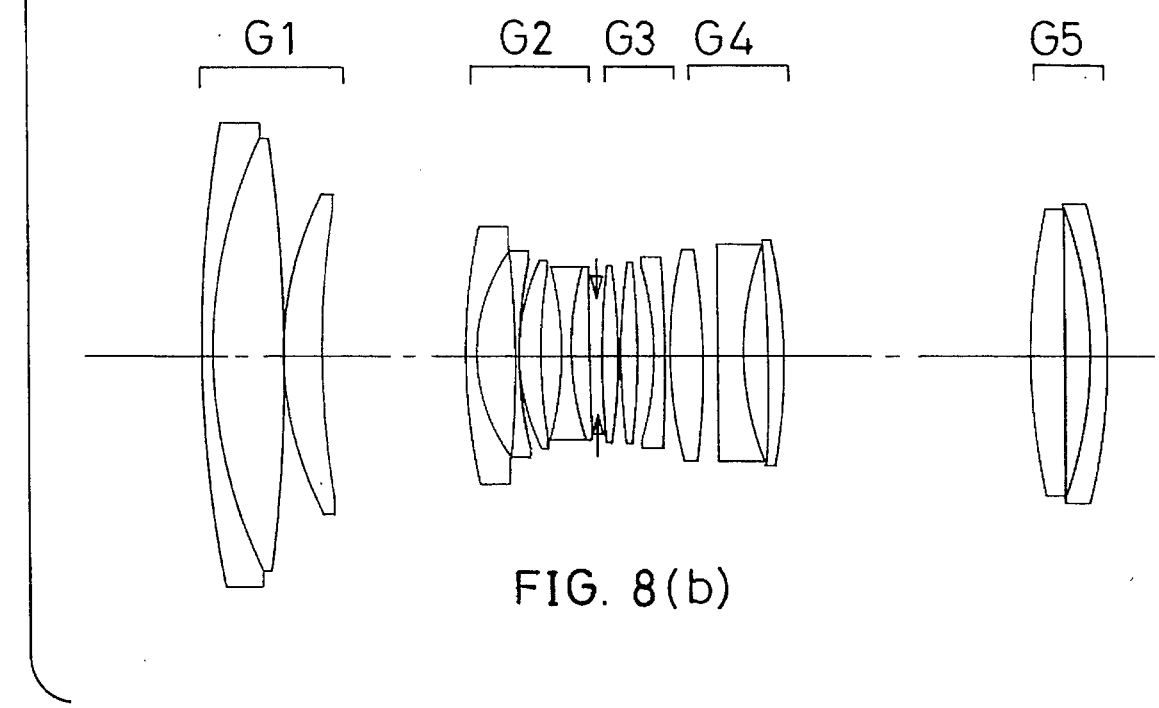
Figure 10A:
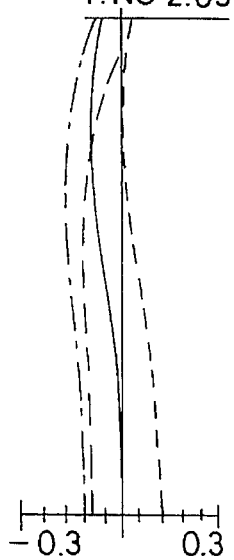
FIG. 10(a)–10(h) graphically show various aberrations at the middle focal length position in Example 1 in a similar manner to FIG. 9.
Figure 10B:
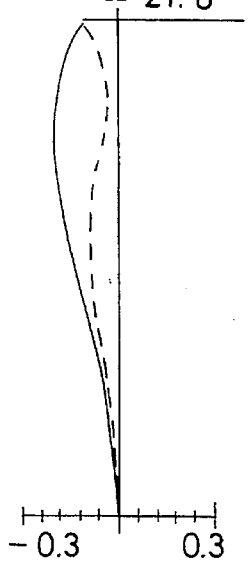
Figure 10C:
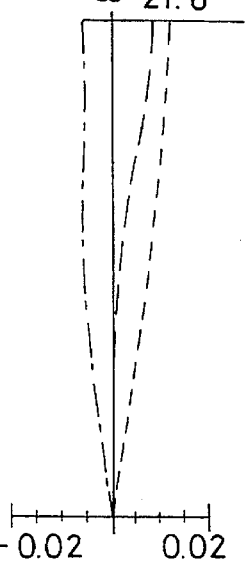
Figure 10D:
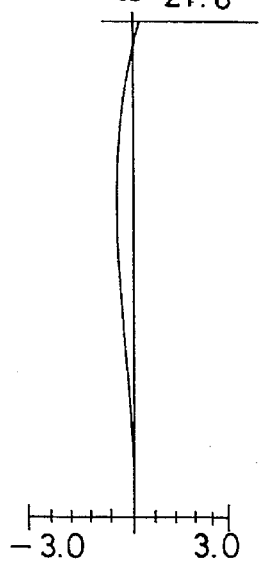
Figure 10E:
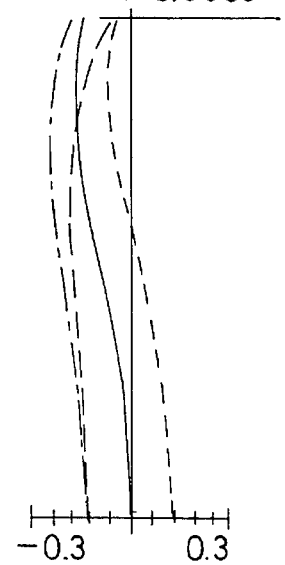
Figure 10F:
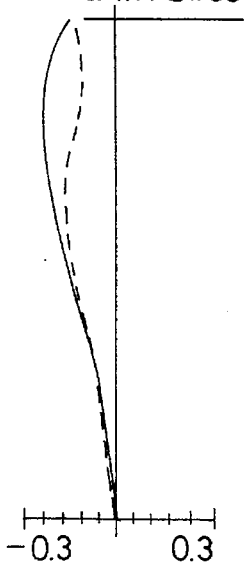
Figure 10G:
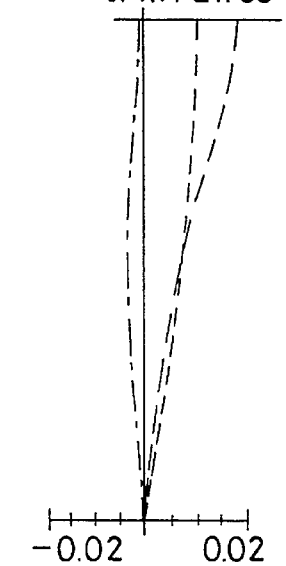
Figure 10H:
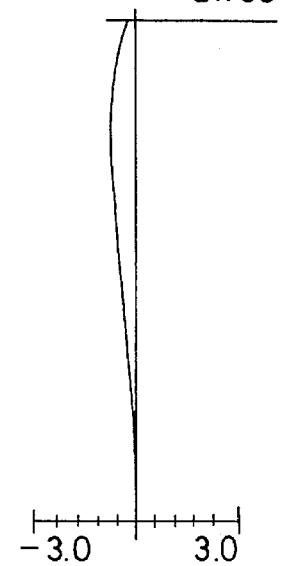
Figure 14A:
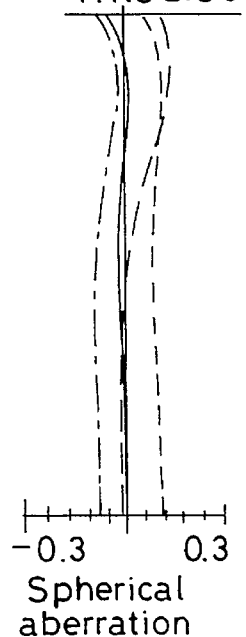
FIG. 14(a)–(h) graphically show various aberrations at the tele end in Example 2 in a similar manner to FIG. 12.
Figure 14B:
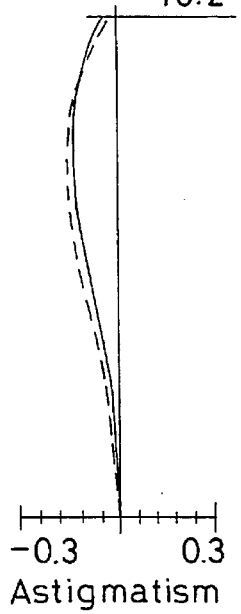
Figure 14C:
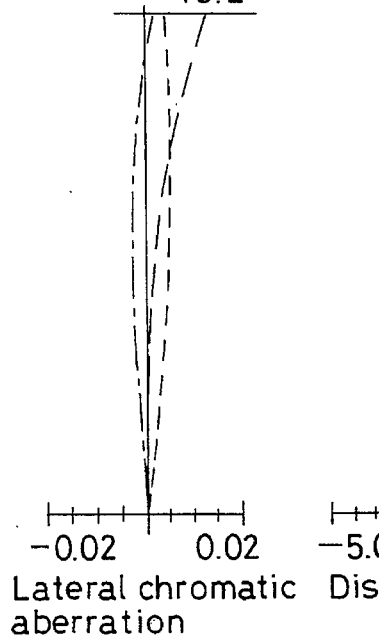
Figure 14D:
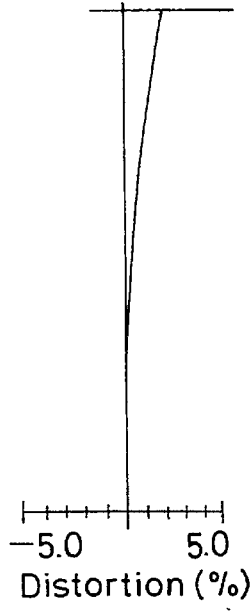
Figure 14E:
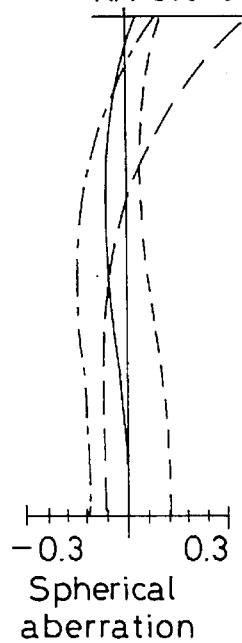
Figure 14F:
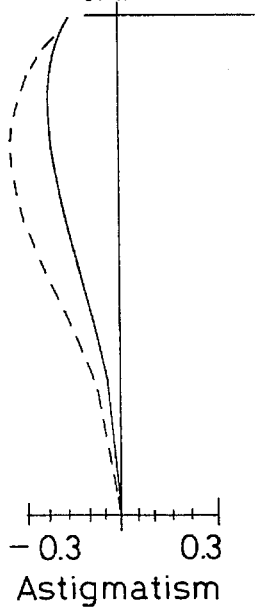
Figure 14G:
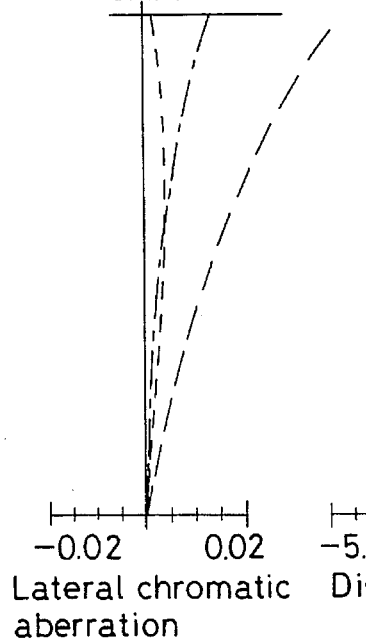
Figure 14H:
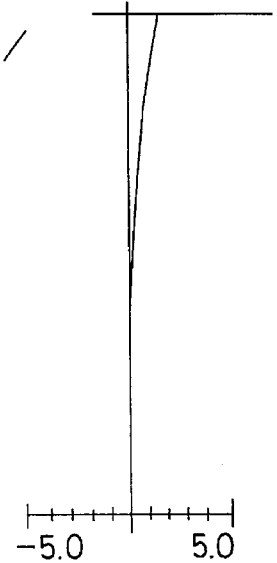
Figure 15A:
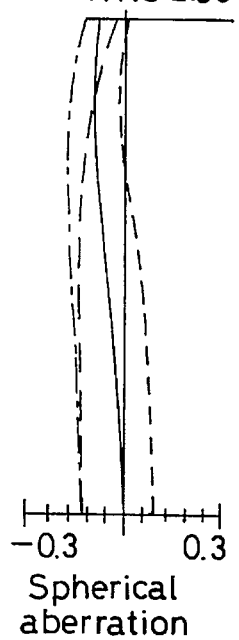
FIG. 15(a)–(h) graphically show various aberrations at the wide end in Example 3 in a similar manner to FIG. 12.
Figure 15B:
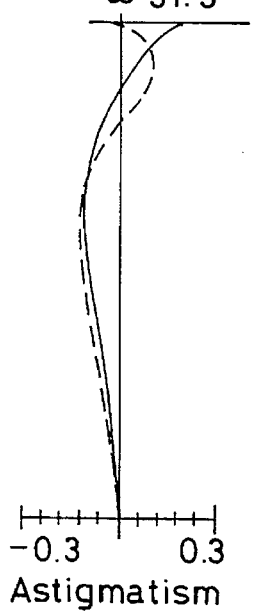
Figure 15C:
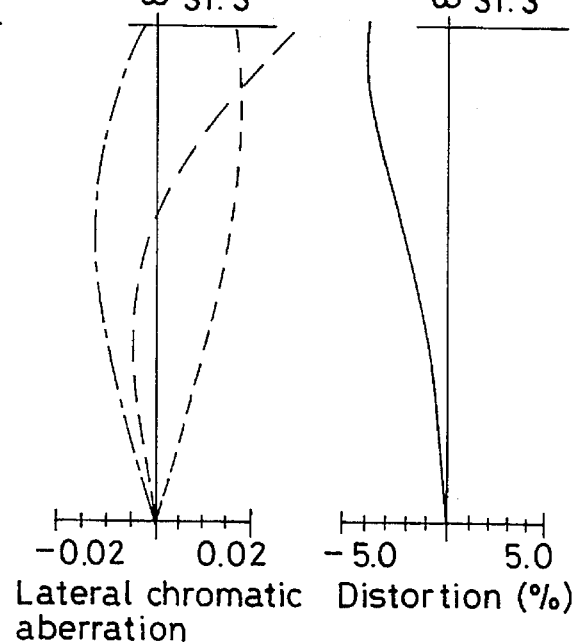
Figure 15D:
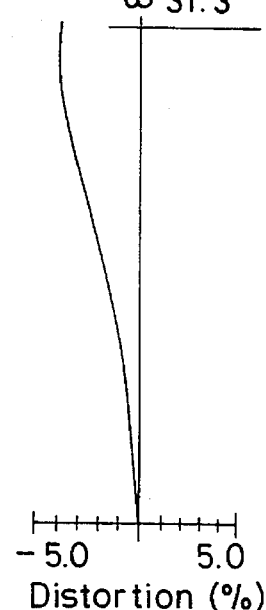
Figure 15E:
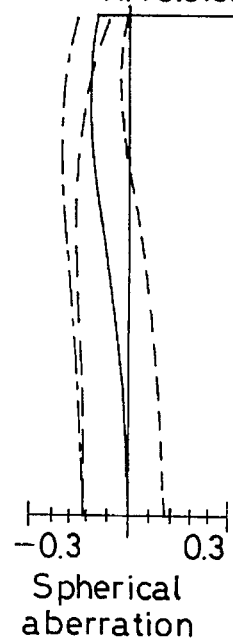
Figure 15F:
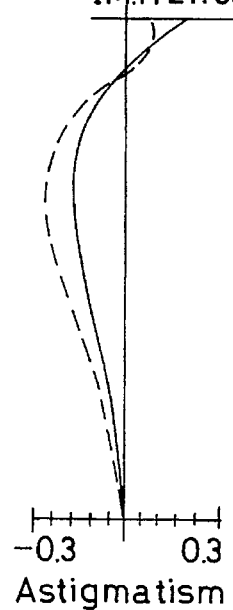
Figure 15G:
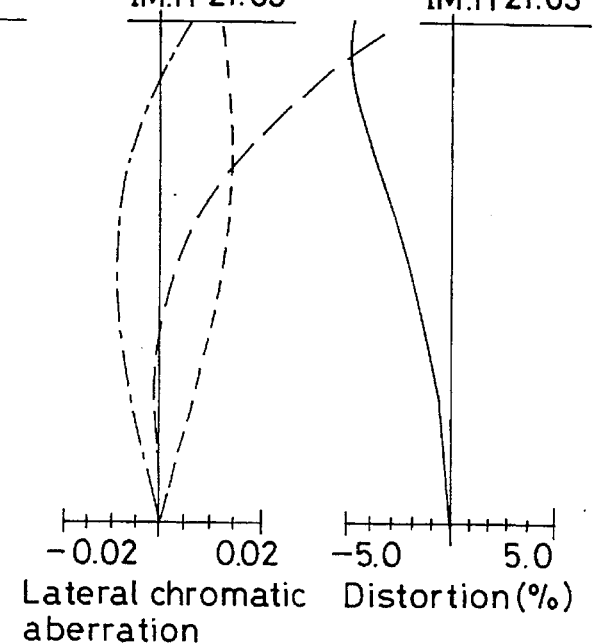
Figure 15H:
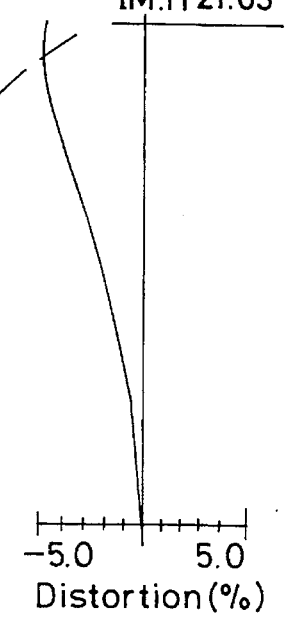
Figure 19A:
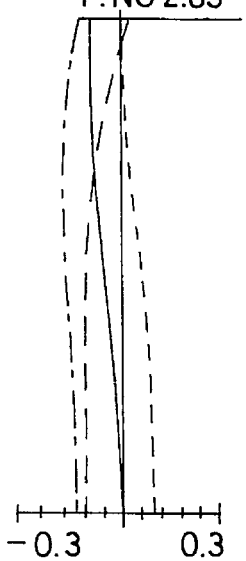
FIG. 19(a)–(h) graphically show various aberrations at the middle focal length position in Example 4 in a similar manner to FIG. 12.
Figure 19B:
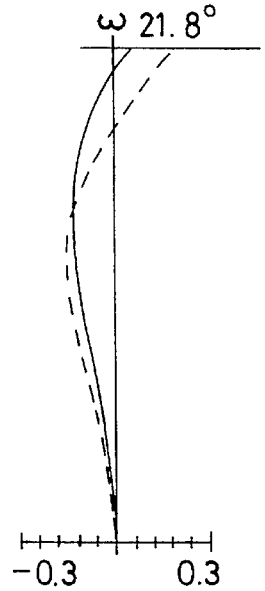
Figure 19C:
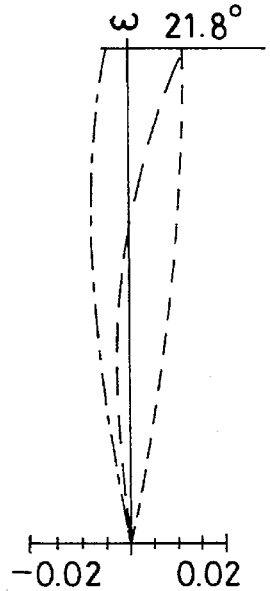
Figure 19D:
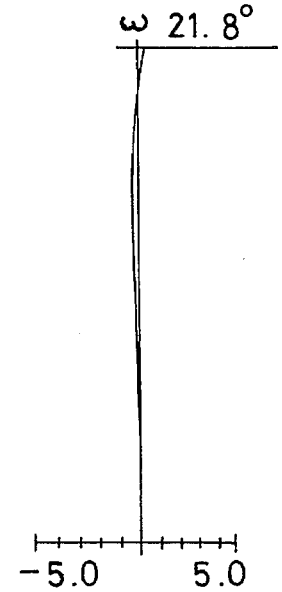
Figure 19E:
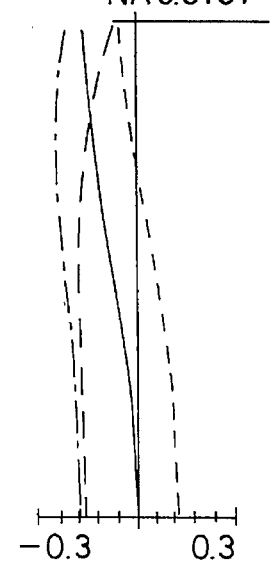
Figure 19F:
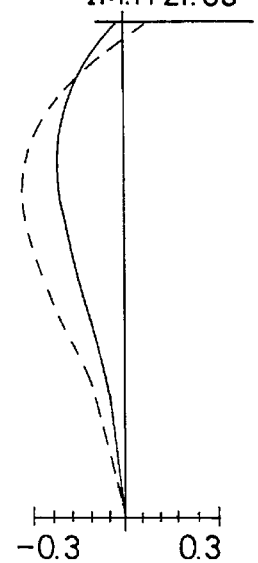
Figure 19G:
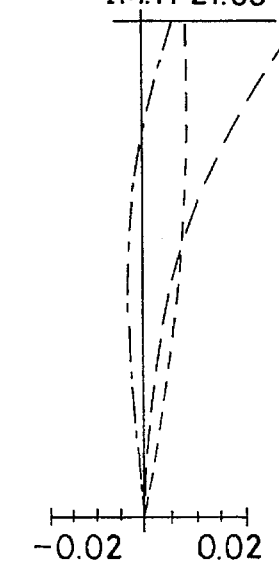
Figure 19H:
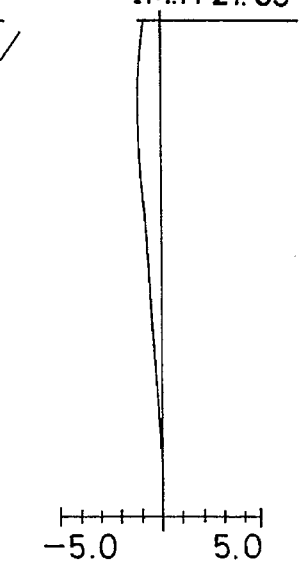
Figure 22A:
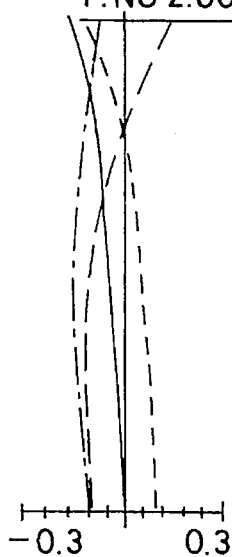
FIG. 22(a)–22(h) graphically show various aberrations at the middle focal length position in Example 5 in a similar manner to FIG. 21.
Figure 22B:
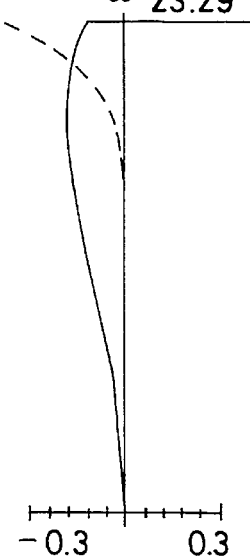
Figure 22C:
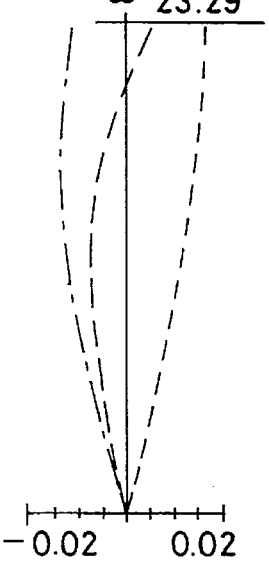
Figure 22D:
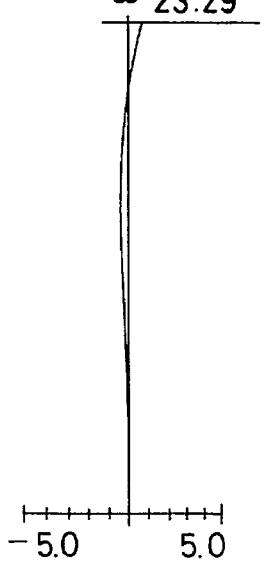
Figure 22E:
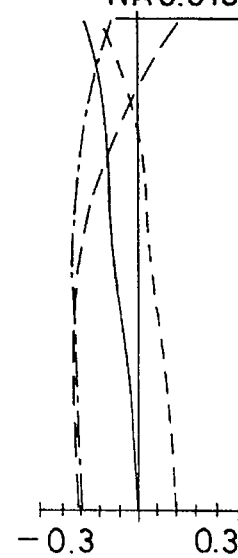
Figure 22F:
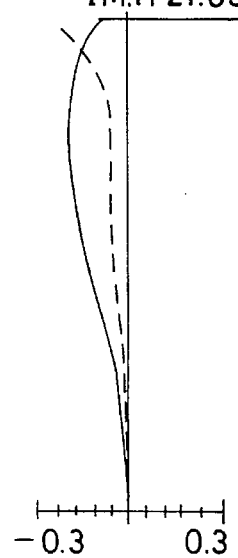
Figure 22G:
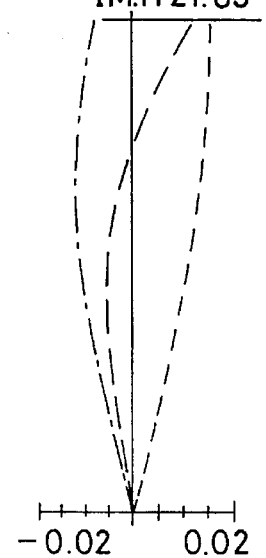
Figure 22H:
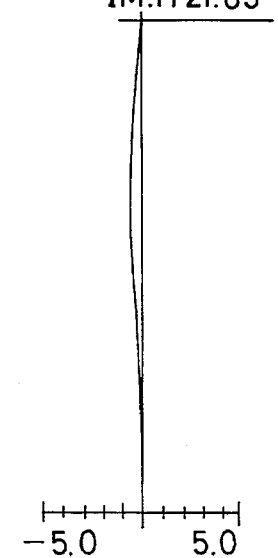
Figure 25A:
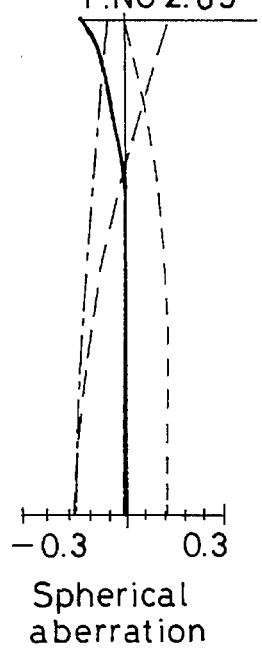
FIG. 25(a)–(h) graphically show various aberrations at the middle focal length position in Example 6 in a similar manner to FIG. 9.
Figure 25B:
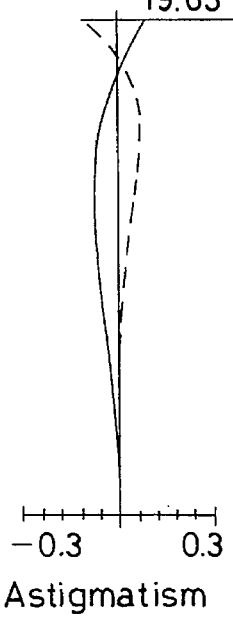
Figure 25C:
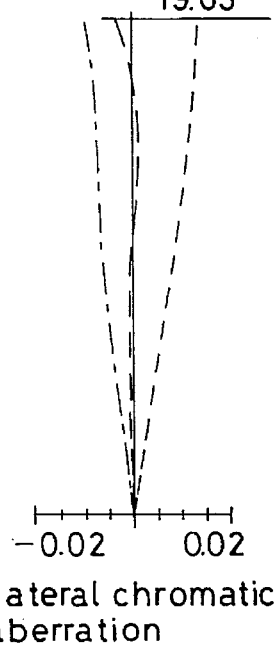
Figure 25D:
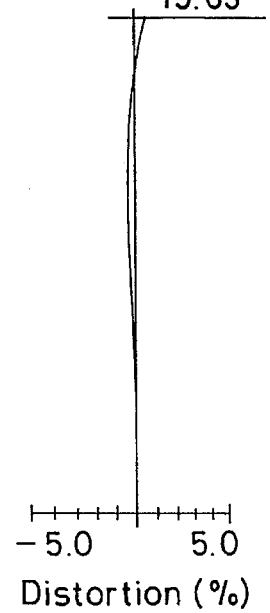
Figure 25E:
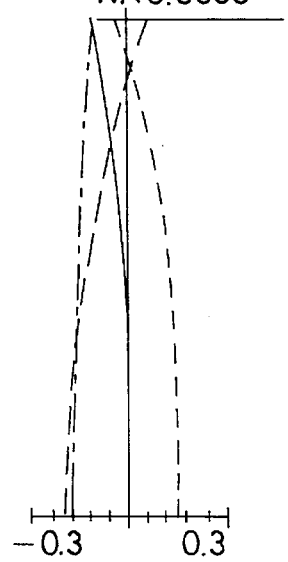
Figure 25F:
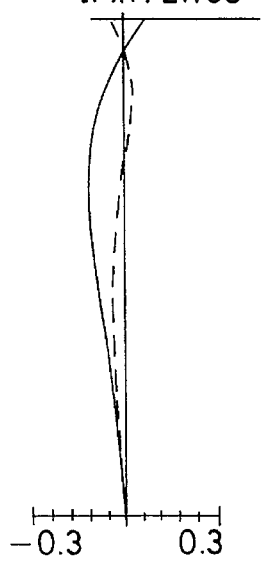
Figure 25G:
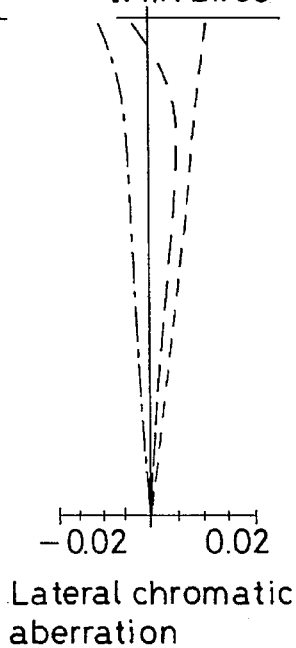
Figure 25H:
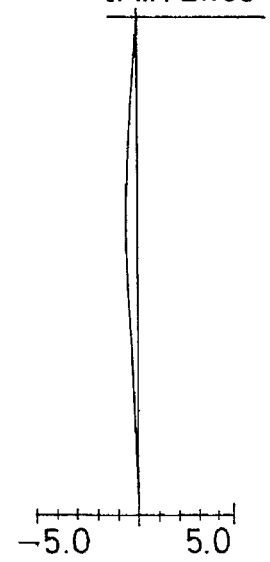
Figure 28A:
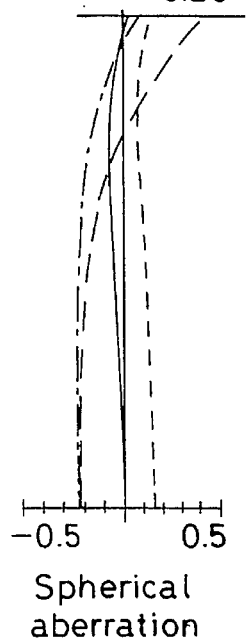
FIG. 28(a)–28(h) graphically show various aberrations at the middle focal length position in Example 7 in a similar manner to FIG. 9.
Figure 28B:
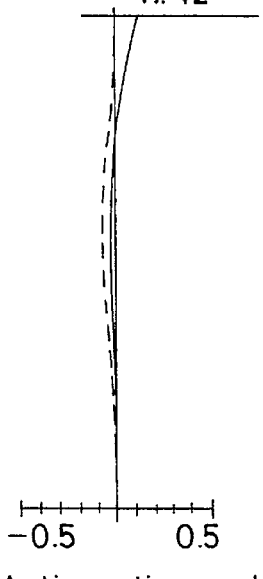
Figure 28C:
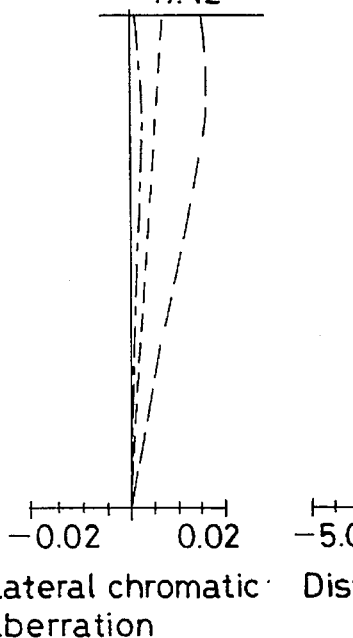
Figure 28D:
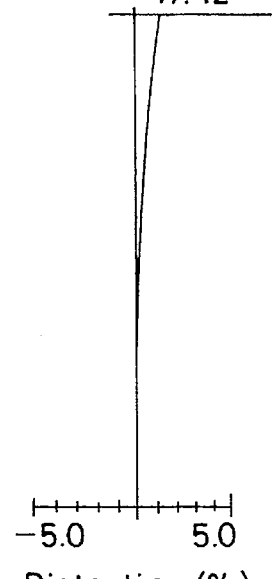
Figure 28E:
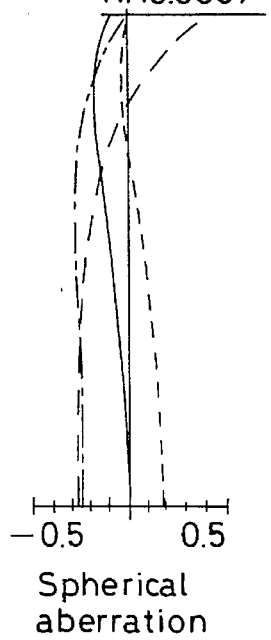
Figure 28F:
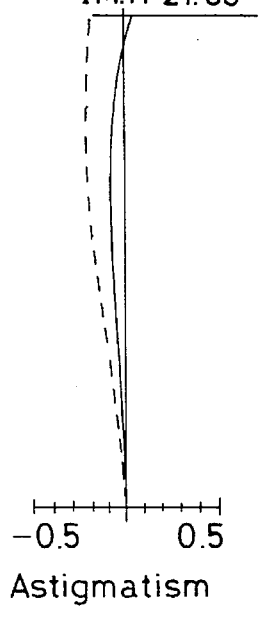
Figure 28G:
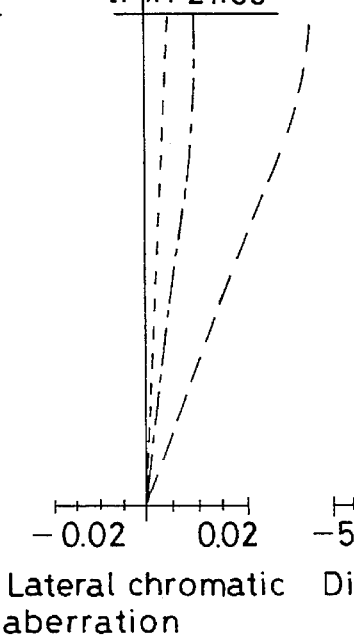
Figure 28H:
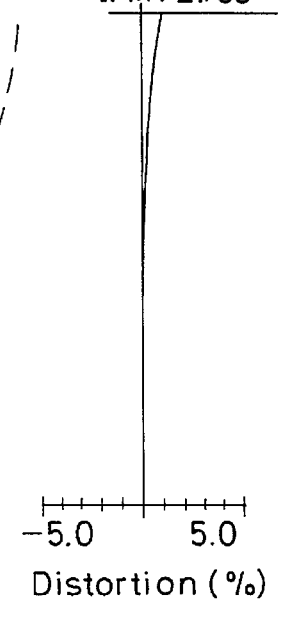
Figure 30A:
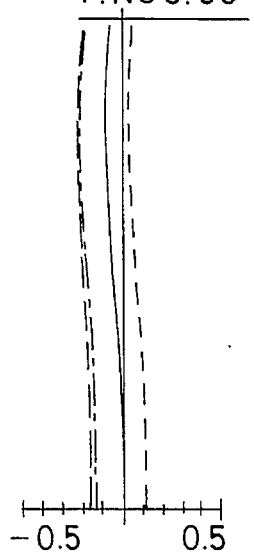
FIG. 30(a)–30(h) graphically show various aberrations at the wide end in Example 8 in a similar manner to FIG. 12.
Figure 30B:
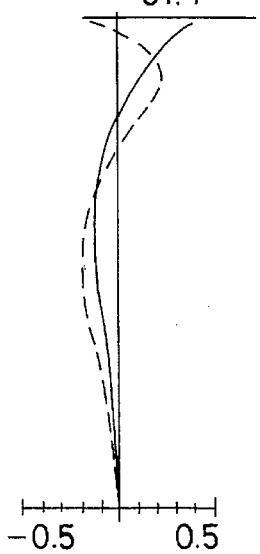
Figure 30C:
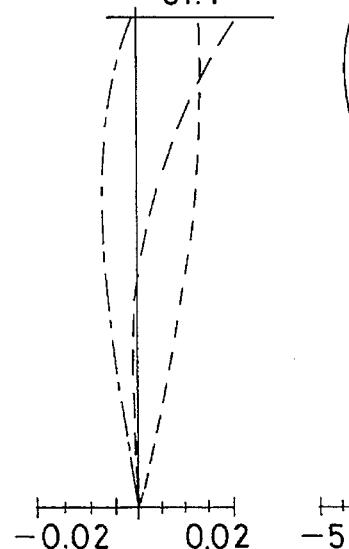
Figure 30D:
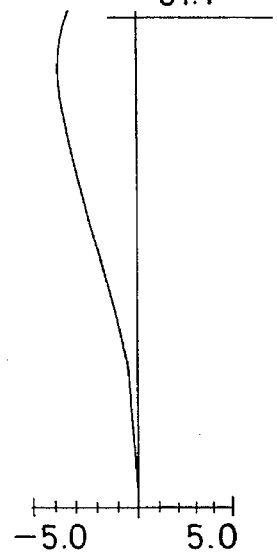
Figure 30E:
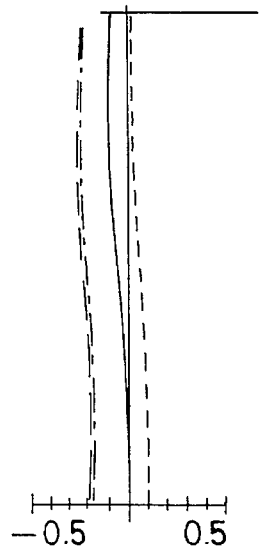
Figure 30F:
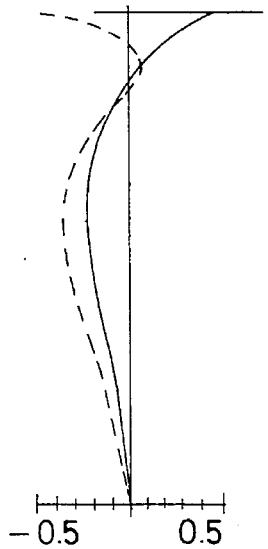
Figure 30G:
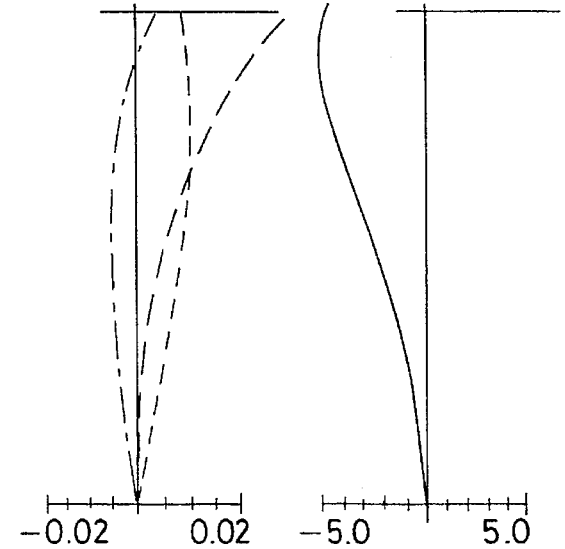
Figure 30H:
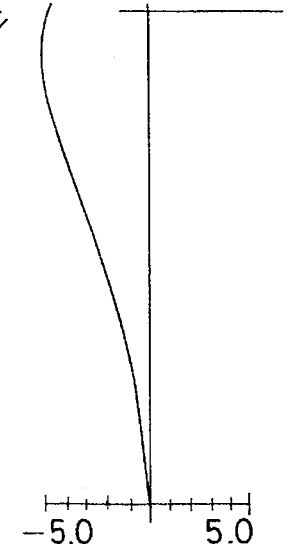
Figure 31A:
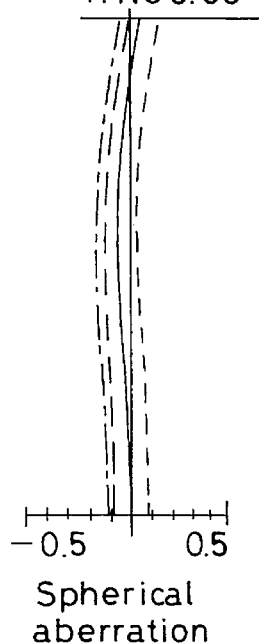
FIG. 31(a)–31(h) graphically show various aberrations at the middle focal length position in Example 8 in a similar manner to FIG. 12.
Figure 31B:
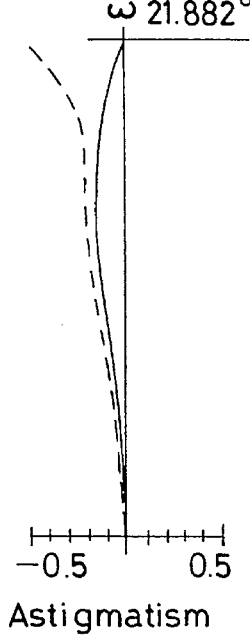
Figure 31C:
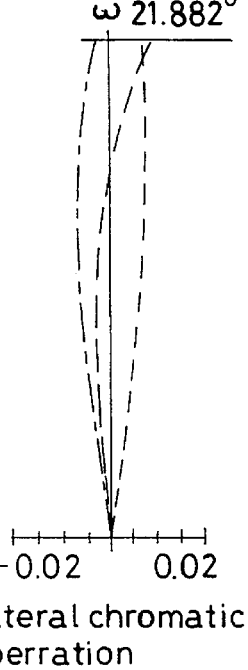
Figure 31D:
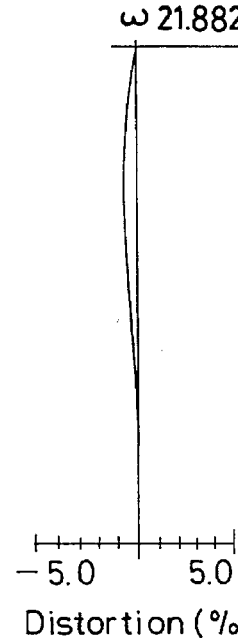
Figure 31E:
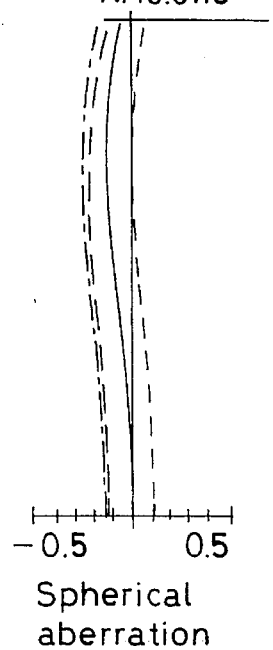
Figure 31F:
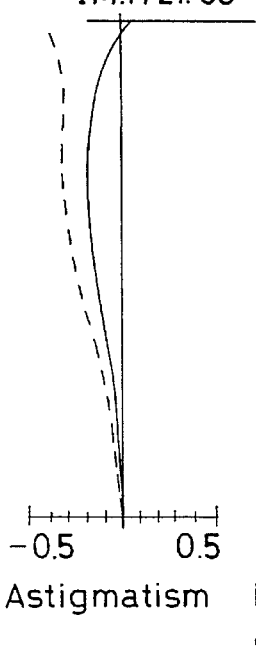
Figure 31G:
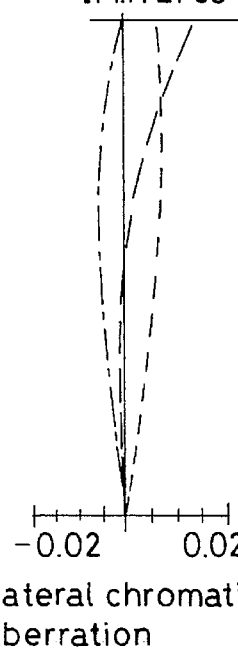
Figure 31H:
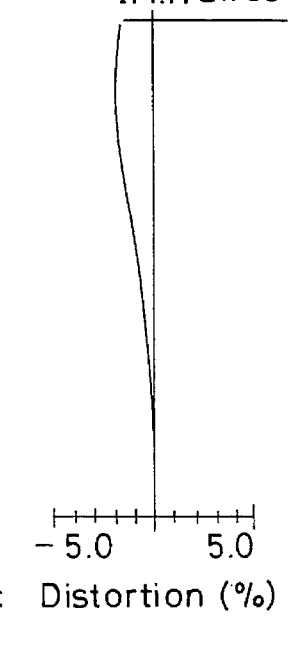
Figure 32A:
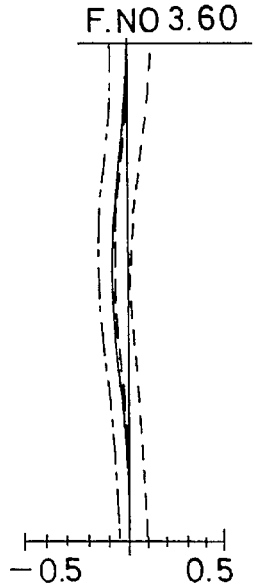
FIG. 32(a)–32(h) graphically show various aberrations at the tele end in Example 8 in a similar manner to FIG. 12.
Figure 32B:
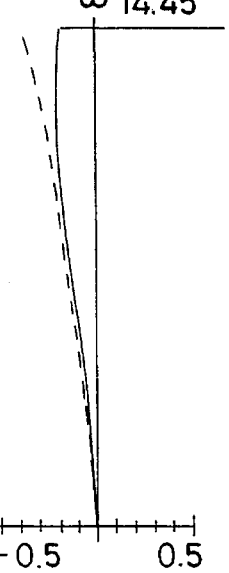
Figure 32C:
Figure 32D:
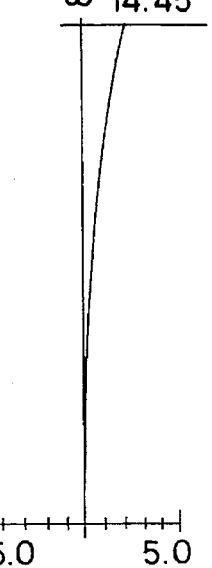
Figure 32E:
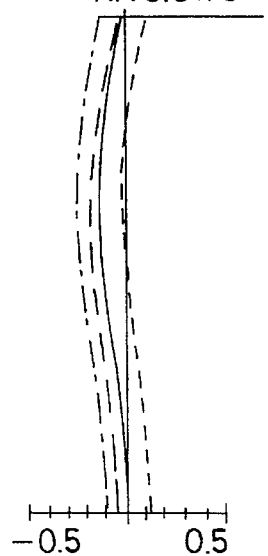
Figure 32F:
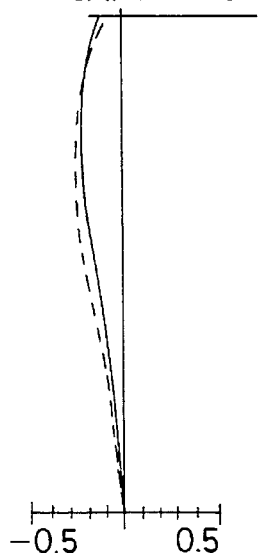
Figure 32G:
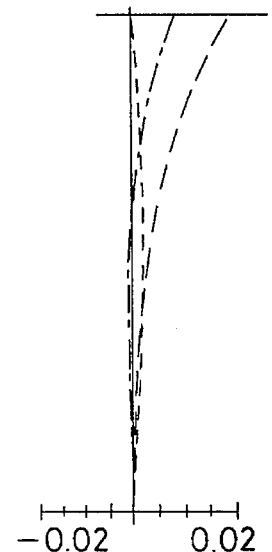
Figure 32H:
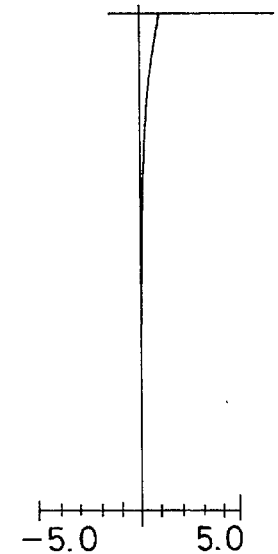
Figure 35A:
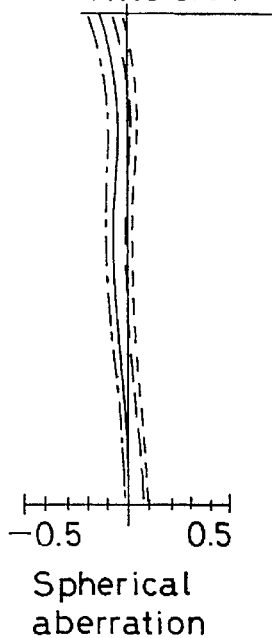
FIG. 35(a)–35(h) graphically show various aberrations at the tele end in Example 9 in a similar manner to FIG. 12.
Figure 35B:
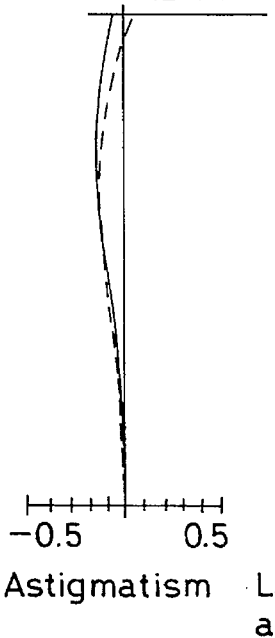
Figure 35C:
Figure 35D:
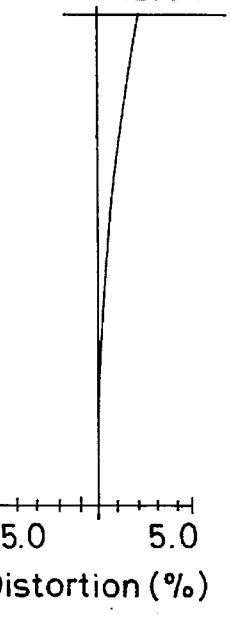
Figure 35E:
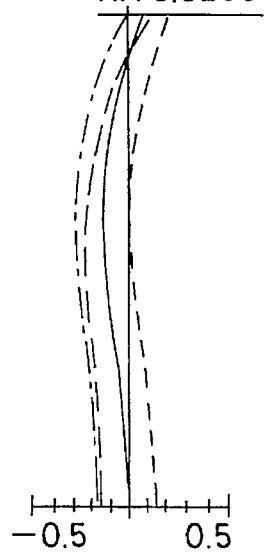
Figure 35F:
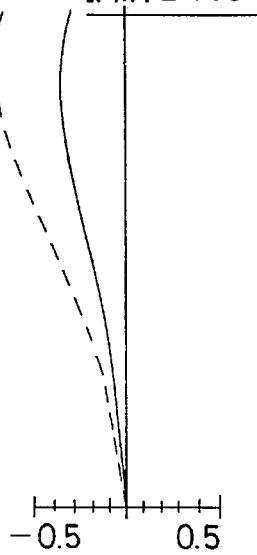
Figure 35G:
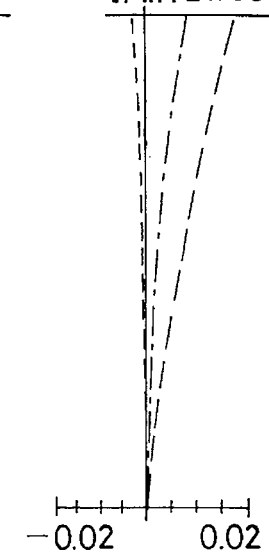
Figure 35H:
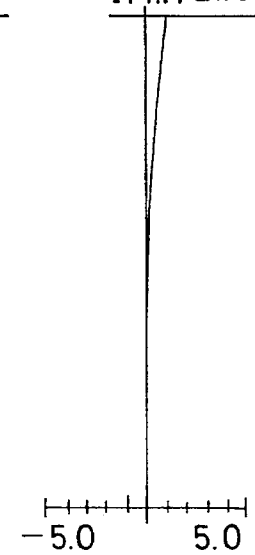

Example 9 is a zoom lens system having a focal length ranging from 35.75 mm to 101.45 mm and an aperture ratio of 1:3.6. FIG. 8 is a sectional view showing the lens arrangement of Example 9 in a similar manner to FIG. 1. FIGS. 33A to 35H graphically show various aberrations in this Example in a similar manner to Example 2.

Lens data in Examples will be shown below. In the following, reference symbol f denotes the focal length, $F_{NO}$ is F-number, $\omega$ is the half view angle, $r_1, r_2 \ldots$ are the curvature radii of lens surfaces, $d_1, d_2 \ldots$ are the spacings between adjacent lens surfaces, $n_{d1}, n_{d2} \ldots$ are the refractive indices of the lenses for the spectral d-line, and $\gamma_{d1}, \gamma_{d2} \ldots$ are the Abbe's numbers of the lenses. Assuming that the direction of the optical axis is x and a direction perpendicular to the optical axis is y, the aspherical configuration is expressed by $$x=(y^2/r)/[1+\{1-P(y^2/r^2)\}^{1/2}]+A_4y^4+A_6y^6+A_8y^8+A_{10}y^{10}$$

where r is the paraxial curvature radius; P is a conical coefficient; and $A_4$, $A_6$, $A_8$, and $A_{10}$ are aspherical coefficients. It should be noted that the values in the parentheses in tables showing zooming spacings in Examples are air spacings when the system is focused on an object at a finite distance to which each aberration graph (b) corresponds.

Example 1 f = 36.150 ~ 53.999 ~ 76.398
$F_{NO}$ = 2.85 ~ 2.85 ~ 2.85
$\omega$ = 30.9 ~ 21.8 ~ 15.8°

| | | | |
|---|---|---|---|
| $r_1$ = 238.1975 | $d_1$ = 2.0000 | $n_{d1}$ = 1.80518 | $v_{d1}$ = 25.43 |
| $r_2$ = 66.0466 | $d_2$ = 8.2467 | $n_{d2}$ = 1.69100 | $v_{d2}$ = 54.84 |
| $r_3$ = −185.9223 | $d_3$ = 0.1500 | | |
| $r_4$ = 33.9942 | $d_4$ = 5.7230 | $n_{d3}$ = 1.49700 | $v_{d3}$ = 81.61 |
| $r_5$ = 77.0448 | $d_5$ = (Variable) | | |
| $r_6$ = 68.9446 | $d_6$ = 1.6000 | $n_{d4}$ = 1.83481 | $v_{d4}$ = 42.72 |
| $r_7$ = 19.8819 | $d_7$ = 5.1446 | | |
| $r_8$ = −64.8939 | $d_8$ = 1.5000 | $n_{d5}$ = 1.81554 | $v_{d5}$ = 44.36 |
| $r_9$ = 31.0382 | $d_9$ = 0.1500 | | |
| $r_{10}$ = 30.7390 | $d_{10}$ = 4.2500 | $n_{d6}$ = 1.84666 | $v_{d6}$ = 23.88 |
| $r_{11}$ = −94.1455 | $d_{11}$ = 1.6051 | | |
| $r_{12}$ = −29.7254 | $d_{12}$ = 1.5000 | $n_{d7}$ = 1.78590 | $v_{d7}$ = 44.18 |
| $r_{13}$ = −4728.2119 | $d_{13}$ = 0.1500 | | |
| $r_{14}$ = 106.6638 | $d_{14}$ = 2.1500 | $n_{d8}$ = 1.80518 | $v_{d8}$ = 25.43 |
| $r_{15}$ = −510.2180 | $d_{15}$ = (Variable) | | |
| $r_{16}$ = ∞ (Stop) | $d_{16}$ = 1.2850 | | |
| $r_{17}$ = 153.1380 | $d_{17}$ = 3.4000 | $n_{d9}$ = 1.83481 | $v_{d9}$ = 42.72 |
| $r_{18}$ = −61.6556 | $d_{18}$ = 0.1500 | | |
| $r_{19}$ = 71.8428 | $d_{19}$ = 3.6000 | $n_{d10}$ = 1.69680 | $v_{d10}$ = 55.52 |
| $r_{20}$ = −119.9730 | $d_{20}$ = 2.5624 | | |
| $r_{21}$ = −36.5138 | $d_{21}$ = 1.7000 | $n_{d11}$ = 1.75520 | $v_{d11}$ = 27.51 |
| $r_{22}$ = −480.4445 | $d_{22}$ = (Variable) | | |
| $r_{23}$ = 52.9777 | $d_{23}$ = 4.5500 | $n_{d12}$ = 1.83400 | $v_{d12}$ = 37.16 |
| $r_{24}$ = −103.6222 | $d_{24}$ = 0.1500 | | |
| $r_{25}$ = −255.4441 | $d_{25}$ = 2.8583 | $n_{d13}$ = 1.78470 | $v_{d13}$ = 26.22 |
| $r_{26}$ = 37.8814 | $d_{26}$ = 2.7179 | | |
| $r_{27}$ = 816.2273 | $d_{27}$ = 3.5500 | $n_{d14}$ = 1.77250 | $v_{d14}$ = 49.66 |
| $r_{28}$ = −54.2540 | $d_{28}$ = (Variable) | | |
| $r_{29}$ = 141.8157 | $d_{29}$ = 5.3066 | $n_{d15}$ = 1.69680 | $v_{d15}$ = 55.52 |
| $r_{30}$ = −55.5986 | $d_{30}$ = 1.8985 | | |
| $r_{31}$ = −39.4601 | $d_{31}$ = 2.5000 | $n_{d16}$ = 1.80518 | $v_{d16}$ = 25.43 |
| $r_{32}$ = −79.2834 | | | |

Zooming Spaces

| f | 36.150 | 53.999 | 76.398 |
|---|---|---|---|
| $d_5$ | 1.747 | 8.448 | 14.911 |
| $d_{15}$ | 10.299 | 5.154 | 1.250 |
| | (11.272) | (6.529) | (3.386) |
| $d_{22}$ | 12.254 | 5.737 | 1.500 |
| $d_{28}$ | 1.850 | 16.227 | 26.105 |

Example 2 f = 35.717 ~ 53.398 ~ 74.475
$F_{NO}$ = 2.85 ~ 2.85 ~ 2.85
$\omega$ = 31.2 ~ 22.1 ~ 16.2°

| | | | |
|---|---|---|---|
| $r_1$ = 176.7668 | $d_1$ = 2.0549 | $n_{d1}$ = 1.84666 | $v_{d1}$ = 23.88 |
| $r_2$ = 77.2900 | $d_2$ = 6.8326 | $n_{d2}$ = 1.69680 | $v_{d2}$ = 55.52 |
| $r_3$ = −293.4620 | $d_3$ = 0.0843 | | |
| $r_4$ = 38.0726 | $d_4$ = 5.1178 | $n_{d3}$ = 1.49700 | $v_{d3}$ = 81.61 |
| $r_5$ = 74.4884 | $d_5$ = (Variable) | | |

15
-continued

| | | | |
|---|---|---|---|
| $r_6 = 61.5341$ | $d_6 = 1.7053$ | $n_{d4} = 1.83481$ | $v_{d4} = 42.72$ |
| $r_7 = 19.6471$ | $d_7 = 4.5023$ | | |
| $r_8 = 188.3594$ | $d_8 = 1.8519$ | $n_{d5} = 1.74320$ | $v_{d5} = 49.31$ |
| $r_9 = 32.0414$ | $d_9 = 0.3775$ | | |
| $r_{10} = 27.1881$ | $d_{10} = 3.0843$ | $n_{d6} = 1.84666$ | $v_{d6} = 23.88$ |
| $r_{11} = 41.2804$ | $d_{11} = 3.6191$ | | |
| $r_{12} = -28.2995$ | $d_{12} = 1.7337$ | $n_{d7} = 1.67790$ | $v_{d7} = 55.33$ |
| $r_{13} = -387.5111$ | $d_{13} = 0.1002$ | | |
| $r_{14} = 124.3376$ | $d_{14} = 2.6702$ | $n_{d8} = 1.80518$ | $v_{d8} = 25.43$ |
| $r_{15} = -68.3354$ | $d_{15} =$ (Variable) | | |
| $r_{16} = \infty$ (Stop) | $d_{16} = 0.9616$ | | |
| $r_{17} = 143.0486$ | $d_{17} = 2.4698$ | $n_{d9} = 1.83481$ | $v_{d9} = 42.72$ |
| $r_{18} = -126.3356$ | $d_{18} = 0.0877$ | | |
| $r_{19} = 80.9273$ | $d_{19} = 2.7730$ | $n_{d10} = 1.86300$ | $v_{d10} = 41.53$ |
| $r_{20} = -1849.3583$ | $d_{20} = 3.1786$ | | |
| $r_{21} = -33.5197$ | $d_{21} = 1.7435$ | $n_{d11} = 1.80518$ | $v_{d11} = 25.43$ |
| $r_{22} = -96.8402$ | $d_{22} =$ (Variable) | | |
| $r_{23} = 55.6734$ | $d_{23} = 4.5137$ | $n_{d12} = 1.83481$ | $v_{d12} = 42.72$ |
| $r_{24} = -143.5572$ | $d_{24} = 2.9238$ | | |
| $r_{25} = 2041.7490$ | $d_{25} = 2.0717$ | $n_{d13} = 1.80518$ | $v_{d13} = 25.43$ |
| $r_{26} = 38.2991$ (Aspheric) | $d_{26} = 2.6238$ | | |
| $r_{27} = 635.9022$ | $d_{27} = 3.7802$ | $n_{d14} = 1.74320$ | $v_{d14} = 49.31$ |
| $r_{28} = -47.7137$ | $d_{28} =$ (Variable) | | |
| $r_{29} = 113.3607$ | $d_{29} = 5.1207$ | $n_{d15} = 1.71300$ | $v_{d15} = 53.84$ |
| $r_{30} = -68.8494$ | $d_{30} = 1.8242$ | | |
| $r_{31} = -43.8093$ | $d_{31} = 1.8209$ | $n_{d16} = 1.80518$ | $v_{d16} = 25.43$ |
| $r_{32} = -88.4059$ | | | |

Zooming Spaces

| f | 35.717 | 53.398 | 74.475 |
|---|---|---|---|
| $d_5$ | 1.326 | 9.257 | 16.471 |
| $d_{15}$ | 12.243 | 5.914 | 1.352 |
| | (15.085) | (9.504) | (6.370) |
| $d_{22}$ | 11.588 | 5.643 | 1.463 |
| $d_{28}$ | 1.443 | 15.772 | 25.721 |

Aspherical Coefficients

26th surface $P = 1$
$A_4 = 0.18137 \times 10^{-8}$
$A_6 = 0.14884 \times 10^{-10}$
$A_8 = -0.48490 \times 10^{-13}$
$A_{10} = -0.74448 \times 10^{-15}$ Example 3

$f = 35.601 \sim 54.070 \sim 79.050$
$F_{NO} = 2.83 \sim 2.83 \sim 2.83$
$\omega = 31.3 \sim 21.8 \sim 15.3°$

| | | | |
|---|---|---|---|
| $r_1 = 218.5570$ | $d_1 = 2.5422$ | $n_{d1} = 1.80518$ | $v_{d1} = 25.43$ |
| $r_2 = 84.1572$ | $d_2 = 6.7382$ | $n_{d2} = 1.69680$ | $v_{d2} = 55.52$ |
| $r_3 = -230.5255$ | $d_3 = 0.0918$ | | |
| $r_4 = 37.3048$ | $d_4 = 4.9232$ | $n_{d3} = 1.49700$ | $v_{d3} = 81.61$ |
| $r_5 = 82.9354$ | $d_5 =$ (Variable) | | |
| $r_6 = 62.9200$ | $d_6 = 1.4993$ | $n_{d4} = 1.83500$ | $v_{d4} = 42.70$ |
| $r_7 = 20.0449$ | $d_7 = 4.2085$ | | |
| $r_8 = 225.7844$ | $d_8 = 1.7232$ | $n_{d5} = 1.69350$ | $v_{d5} = 53.23$ |
| $r_9 = 31.4396$ | $d_9 = 2.6638$ | $n_{d6} = 1.84666$ | $v_{d6} = 23.78$ |
| $r_{10} = 74.5326$ | $d_{10} = 3.4200$ | | |
| $r_{11} = -27.1285$ | $d_{11} = 1.6891$ | $n_{d7} = 1.71300$ | $v_{d7} = 53.84$ |
| $r_{12} = 353.8630$ | $d_{12} = 0.1089$ | | |
| $r_{13} = 76.6478$ | $d_{13} = 2.5639$ | $n_{d8} = 1.80518$ | $v_{d8} = 25.43$ |
| $r_{14} = -173.3464$ | $d_{14} =$ (Variable) | | |
| $r_{15} = \infty$ (Stop) | $d_{15} = 1.2772$ | | |
| $r_{16} = 433.6572$ | $d_{16} = 2.3890$ | $n_{d9} = 1.83500$ | $v_{d9} = 42.70$ |
| $r_{17} = -71.0382$ | $d_{17} = 0.1086$ | | |
| $r_{18} = 116.1507$ | $d_{18} = 2.6843$ | $n_{d10} = 1.81600$ | $v_{d10} = 46.62$ |
| $r_{19} = -170.0833$ | $d_{19} = 3.0544$ | | |
| $r_{20} = -30.9104$ | $d_{20} = 1.7750$ | $n_{d11} = 1.75520$ | $v_{d11} = 27.51$ |
| $r_{21} = -95.5078$ | $d_{21} = 0.1162$ | | |
| $r_{22} = -112.6316$ | $d_{22} = 1.9464$ | $n_{d12} = 1.72916$ | $v_{d12} = 54.68$ |

16
-continued

| | | | |
|---|---|---|---|
| $r_{23} = -61.4769$ | $d_{23} =$ (Variable) | | |
| $r_{24} = 73.1082$ | $d_{24} = 3.9188$ | $n_{d13} = 1.81554$ | $v_{d13} = 44.36$ |
| $r_{25} = -84.3937$ | $d_{25} = 1.7591$ | | |
| $r_{26} = -207.4139$ | $d_{26} = 2.7455$ | $n_{d14} = 1.80518$ | $v_{d14} = 25.43$ |
| $r_{27} = 44.7671$ | $d_{27} = 2.4011$ | | |
| $r_{28} = 399.8591$ | $d_{28} = 3.8987$ | $n_{d15} = 1.72000$ | $v_{d15} = 50.25$ |
| $r_{29} = -57.7058$ | $d_{29} =$ (Variable) | | |
| $r_{30} = 233.4767$ | $d_{30} = 4.6768$ | $n_{d16} = 1.74400$ | $v_{d16} = 44.73$ |
| $r_{31} = -65.6745$ | $d_{31} = 1.9648$ | | |
| $r_{32} = -41.3567$ | $d_{32} = 1.9029$ | $n_{d17} = 1.80518$ | $v_{d17} = 25.43$ |
| $r_{33} = -64.0681$ | | | |

Zooming Spaces

| f | 35.601 | 54.070 | 79.050 |
|---|---|---|---|
| $d_5$ | 1.279 | 9.058 | 16.445 |
| $d_{14}$ | 12.538 | 6.229 | 1.136 |
| | (14.674) | (9.273) | (5.673) |
| $d_{23}$ | 12.471 | 5.628 | 1.109 |
| $d_{29}$ | 0.917 | 16.510 | 28.783 |

Example 4

$f = 35.301 \sim 54.063 \sim 79.949$
$F_{NO} = 2.83 \sim 2.83 \sim 2.83$
$\omega = 31.5 \sim 21.8 \sim 15.14°$

| | | | |
|---|---|---|---|
| $r_1 = 199.9427$ | $d_1 = 2.5113$ | $n_{d1} = 1.80518$ | $v_{d1} = 25.43$ |
| $r_2 = 74.6133$ | $d_2 = 7.0204$ | $n_{d2} = 1.69680$ | $v_{d2} = 56.49$ |
| $r_3 = -236.6553$ | $d_3 = 0.0858$ | | |
| $r_4 = 36.9653$ | $d_4 = 5.1241$ | $n_{d3} = 1.49700$ | $v_{d3} = 81.61$ |
| $r_5 = 77.7651$ | $d_5 =$ (Variable) | | |
| $r_6 = 83.1832$ | $d_6 = 1.7538$ | $n_{d4} = 1.83500$ | $v_{d4} = 42.70$ |
| $r_7 = 21.4614$ | $d_7 = 4.3122$ | | |
| $r_8 = 302.9515$ | $d_8 = 1.8175$ | $n_{d5} = 1.73400$ | $v_{d5} = 51.49$ |
| $r_9 = 36.0850$ | $d_9 = 2.8470$ | $n_{d6} = 1.84666$ | $v_{d6} = 23.88$ |
| $r_{10} = 70.9384$ | $d_{10} = 3.5658$ | | |
| $r_{11} = -27.7646$ | $d_{11} = 1.6712$ | $n_{d7} = 1.67790$ | $v_{d7} = 55.33$ |
| $r_{12} = 263.6521$ | $d_{12} = 0.0928$ | | |
| $r_{13} = 85.7595$ | $d_{13} = 2.6072$ | $n_{d8} = 1.80518$ | $v_{d8} = 25.43$ |
| $r_{14} = -93.3607$ | $d_{14} =$ (Variable) | | |
| $r_{15} = \infty$ (Stop) | $d_{15} = 0.9990$ | | |
| $r_{16} = 200.6828$ | $d_{16} = 2.5817$ | $n_{d9} = 1.83500$ | $v_{d9} = 42.70$ |
| $r_{17} = -79.8061$ | $d_{17} = 0.0971$ | | |
| $r_{18} = 70.9512$ | $d_{18} = 2.7429$ | $n_{d10} = 1.83500$ | $v_{d10} = 42.70$ |
| $r_{19} = -208.6636$ | $d_{19} = 3.0497$ | | |
| $r_{20} = -37.0252$ | $d_{20} = 1.8928$ | $n_{d11} = 1.76180$ | $v_{d11} = 27.11$ |
| $r_{21} = -342.4607$ | $d_{21} =$ (Variable) | | |
| $r_{22} = 86.4438$ | $d_{22} = 4.5619$ | $n_{d12} = 1.83500$ | $v_{d12} = 42.70$ |
| $r_{23} = -78.0725$ | $d_{23} = 1.7420$ | | |
| $r_{24} = -2498.2162$ | $d_{24} = 2.8438$ | $n_{d13} = 1.80518$ | $v_{d13} = 25.43$ |
| $r_{25} = 42.6368$ | $d_{25} = 2.1854$ | | |
| $r_{26} = 146.0420$ | $d_{26} = 4.6011$ | $n_{d14} = 1.81554$ | $v_{d14} = 44.36$ |
| $r_{27} = -37.2472$ | $d_{27} = 0.3298$ | | |
| $r_{28} = -39.0081$ | $d_{28} = 1.5500$ | $n_{d15} = 1.87400$ | $v_{d15} = 35.26$ |
| $r_{29} = -98.1210$ | $d_{29} =$ (Variable) | | |
| $r_{30} = 121.6350$ | $d_{30} = 4.9551$ | $n_{d16} = 1.74320$ | $v_{d16} = 49.31$ |
| $r_{31} = -64.4333$ | $d_{31} = 2.0409$ | | |
| $r_{32} = -40.8893$ | $d_{32} = 2.0542$ | $n_{d17} = 1.80518$ | $v_{d17} = 25.43$ |
| $r_{33} = -78.4896$ | | | |

Zooming Spaces

| f | 35.301 | 54.063 | 79.949 |
|---|---|---|---|
| $d_5$ | 1.300 | 8.938 | 17.213 |
| $d_{14}$ | 12.456 | 6.165 | 1.032 |
| | (14.759) | (9.419) | (6.113) |
| $d_{21}$ | 13.021 | 5.906 | 1.097 |
| $d_{29}$ | 2.382 | 18.109 | 28.263 |

Example 5

$f = 35.800 \sim 50.250 \sim 67.801$
$F_{NO} = 2.00 \sim 2.00 \sim 2.00$
$\omega = 31.14 \sim 23.29 \sim 17.7°$ -continued

| | | | |
|---|---|---|---|
| $r_1 = 425.1976$ | $d_1 = 2.0000$ | $n_{d1} = 1.80518$ | $v_{d1} = 25.43$ |
| $r_2 = 128.8064$ | $d_2 = 0.5000$ | | |
| $r_3 = 144.4125$ | $d_3 = 6.7500$ | $n_{d2} = 1.49700$ | $v_{d2} = 81.61$ |
| $r_4 = -142.2381$ | $d_4 = 0.1500$ | | |
| $r_5 = 48.9791$ | $d_5 = 5.5000$ | $n_{d3} = 1.61700$ | $v_{d3} = 62.79$ |
| $r_6 = 131.6653$ | $d_6 =$ (Variable) | | |
| $r_7 = 57.2880$ | $d_7 = 1.6000$ | $n_{d4} = 1.80610$ | $v_{d4} = 33.27$ |
| $r_8 = 21.3406$ | $d_8 = 4.6377$ | | |
| $r_9 = -139.3862$ | $d_9 = 1.6000$ | $n_{d5} = 1.66755$ | $v_{d5} = 41.93$ |
| $r_{10} = 40.7687$ | $d_{10} = 0.1000$ | | |
| $r_{11} = 35.6379$ | $d_{11} = 4.0000$ | $n_{d6} = 1.84666$ | $v_{d6} = 23.88$ |
| $r_{12} = 683.3775$ | $d_{12} =$ (Variable) | | |
| $r_{13} = -30.8798$ | $d_{13} = 1.4000$ | $n_{d7} = 1.61700$ | $v_{d7} = 62.79$ |
| $r_{14} = 265.6447$ | $d_{14} = 0.1000$ | | |
| $r_{15} = 126.3759$ | $d_{15} = 2.6700$ | $n_{d8} = 1.84666$ | $v_{d8} = 23.88$ |
| $r_{16} = 1981.0403$ (Aspheric) | $d_{16} =$ (Variable) | | |
| $r_{17} = \infty$ (Stop) | $d_{17} = 1.1777$ | | |
| $r_{18} = 83.8656$ | $d_{18} = 4.2000$ | $n_{d9} = 1.83481$ | $v_{d9} = 42.72$ |
| $r_{19} = -105.9649$ | $d_{19} = 0.1500$ | | |
| $r_{20} = 76.8254$ | $d_{20} = 3.8500$ | $n_{d10} = 1.83481$ | $v_{d10} = 42.72$ |
| $r_{21} = -209.8216$ | $d_{21} = 4.9586$ | | |
| $r_{22} = -40.4720$ | $d_{22} = 1.5000$ | $n_{d11} = 1.68893$ | $v_{d11} = 31.08$ |
| $r_{23} = 425.6300$ | $d_{23} =$ (Variable) | | |
| $r_{24} = 372.7067$ (Aspheric) | $d_{24} = 4.3600$ | $n_{d12} = 1.83481$ | $v_{d12} = 42.72$ |
| $r_{25} = -47.1283$ | $d_{25} = 0.1000$ | | |
| $r_{26} = -48.2821$ | $d_{26} = 2.6700$ | $n_{d13} = 1.80518$ | $v_{d13} = 25.43$ |
| $r_{27} = 107.0013$ | $d_{27} = 5.1205$ | | |
| $r_{28} = -244.7702$ | $d_{28} = 5.3600$ | $n_{d14} = 1.80440$ | $v_{d14} = 39.58$ |
| $r_{29} = -40.9956$ | $d_{29} =$ (Variable) | | |
| $r_{30} = 87.2427$ | $d_{30} = 8.0000$ | $n_{d15} = 1.60300$ | $v_{d15} = 65.48$ |
| $r_{31} = -51.1440$ | $d_{31} = 0.4464$ | | |
| $r_{32} = -46.3868$ | $d_{32} = 1.7500$ | $n_{d16} = 1.84666$ | $v_{d16} = 23.88$ |
| $r_{33} = -88.2916$ | | | |

Zooming Spaces

| f | 35.800 | 50.250 | 67.801 |
|---|---|---|---|
| $d_6$ | 0.950 | 9.287 | 16.954 |
| $d_{12}$ | 4.133 | 4.399 | 3.557 |
| $d_{16}$ | 10.486 | 5.089 | 1.050 |
| | (12.115) | (7.284) | (4.088) |
| $d_{23}$ | 8.080 | 4.035 | 1.199 |
| $d_{29}$ | 0.700 | 15.993 | 27.591 |

Aspherical Coefficients

16th surface $P = 1$
$A_4 = -0.18233 \times 10^{-5}$
$A_6 = 0.36133 \times 10^{-8}$
$A_8 = -0.26224 \times 10^{-10}$
$A_{10} = 0.59354 \times 10^{-13}$ 24th surface $P = 1$
$A_4 = -0.29609 \times 10^{-5}$
$A_6 = 0.27835 \times 10^{-8}$
$A_8 = -0.98200 \times 10^{-12}$
$A_{10} = 0.42203 \times 10^{-14}$ Example 6

$f = 35.800 \sim 60.650 \sim 101.999$
$F_{NO} = 2.85 \sim 2.85 \sim 2.85$
$\omega = 31.14 \sim 11.97 \sim 19.63°$

| | | | |
|---|---|---|---|
| $r_1 = 407.4968$ | $d_1 = 1.7000$ | $n_{d1} = 1.84666$ | $v_{d1} = 23.88$ |
| $r_2 = 54.0904$ | $d_2 = 0.5737$ | | |
| $r_3 = 54.8839$ | $d_3 = 9.4000$ | $n_{d2} = 1.73520$ | $v_{d2} = 41.08$ |
| $r_4 = -153.0809$ | $d_4 = 0.1100$ | | |
| $r_5 = 37.2885$ | $d_5 = 5.6000$ | $n_{d3} = 1.60300$ | $v_{d3} = 65.48$ |
| $r_6 = 95.9759$ | $d_6 =$ (Variable) | | |
| $r_7 = 108.8229$ | $d_7 = 1.5000$ | $n_{d4} = 1.73500$ | $v_{d4} = 49.82$ |
| $r_8 = 21.6404$ (Aspheric) | $d_8 = 3.9844$ | | |
| $r_9 = 174.6614$ | $d_9 = 1.5000$ | $n_{d5} = 1.73500$ | $v_{d5} = 49.82$ |
| $r_{10} = 29.6712$ | $d_{10} = 0.1019$ | | |
| $r_{11} = 30.7657$ | $d_{11} = 3.4000$ | $n_{d6} = 1.84666$ | $v_{d6} = 23.88$ |
| $r_{12} = 79.6799$ | $d_{12} = 2.8727$ | | |
| $r_{13} = -33.3100$ | $d_{13} = 1.5000$ | $n_{d7} = 1.67790$ | $v_{d7} = 55.33$ |
| $r_{14} = 105.2171$ | $d_{14} = 0.1000$ | | |
| $r_{15} = 57.8340$ | $d_{15} = 2.6000$ | $n_{d8} = 1.84666$ | $v_{d8} = 23.88$ |
| $r_{16} = 326.6097$ | $d_{16} =$ (Variable) | | |
| $r_{17} = \infty$ (Stop) | $d_{17} = 1.0000$ | | |
| $r_{18} = 112.7208$ | $d_{18} = 3.4000$ | $n_{d9} = 1.74320$ | $v_{d9} = 49.31$ |
| $r_{19} = -62.9846$ | $d_{19} = 0.1500$ | | |
| $r_{20} = 54.2677$ | $d_{20} = 3.6000$ | $n_{d10} = 1.74320$ | $v_{d10} = 49.31$ |
| $r_{21} = 1278.5561$ | $d_{21} = 3.0497$ | | |
| $r_{22} = -42.3324$ | $d_{22} = 1.6000$ | $n_{d11} = 1.83400$ | $v_{d11} = 37.16$ |
| $r_{23} = 348.1419$ | $d_{23} =$ (Variable) | | |
| $r_{24} = 119.3804$ | $d_{24} = 3.4000$ | $n_{d12} = 1.74320$ | $v_{d12} = 49.31$ |
| $r_{25} = -208.1547$ | $d_{25} = 0.3878$ | | |
| $r_{26} = -179.2366$ | $d_{26} = 2.0000$ | $n_{d13} = 1.84666$ | $v_{d13} = 23.88$ |
| $r_{27} = 107.8521$ (Aspheric) | $d_{27} = 0.8866$ | | |
| $r_{28} = 407.6045$ | $d_{28} = 5.3000$ | $n_{d14} = 1.73500$ | $v_{d14} = 49.82$ |
| $r_{29} = -45.5738$ | $d_{29} =$ (Variable) | | |
| $r_{30} = 100.3358$ | $d_{30} = 6.3000$ | $n_{d15} = 1.65830$ | $v_{d15} = 57.33$ |
| $r_{31} = -60.2755$ | $d_{31} = 1.4097$ | | |
| $r_{32} = -45.0761$ | $d_{32} = 1.8000$ | $n_{d16} = 1.80518$ | $v_{d16} = 25.43$ |
| $r_{33} = -92.0081$ | | | |

Zooming Spaces

| f | 35.800 | 60.650 | 101.999 |
|---|---|---|---|
| $d_6$ | 0.800 | 9.659 | 16.997 |
| | (0.250) | (10.659) | (18.455) |
| $d_{16}$ | 12.739 | 6.912 | 1.050 |
| | (14.103) | (8.630) | (3.805) |
| $d_{23}$ | 20.496 | 10.541 | 0.850 |
| $d_{29}$ | 0.800 | 20.736 | 38.648 |

Aspherical Coefficients

8th surface $P = 1$
$A_4 = -0.61063 \times 10^{-6}$
$A_6 = -0.98958 \times 10^{-10}$
$A_8 = -0.40601 \times 10^{-10}$
$A_{10} = 0.18101 \times 10^{-12}$ 27th surface $P = 1$
$A_4 = 0.51348 \times 10^{-6}$
$A_6 = -0.12726 \times 10^{-8}$
$A_8 = 0.46168 \times 10^{-12}$
$A_{10} = 0.22092 \times 10^{-14}$ Example 7

$f = 35.800 \sim 68.926 \sim 131.502$
$F_{NO} = 2.85 \sim 3.20 \sim 3.65$
$\omega = 31.14 \sim 17.42 \sim 9.34°$

| | | | |
|---|---|---|---|
| $r_1 = 426.2965$ | $d_1 = 1.7000$ | $n_{d1} = 1.84666$ | $v_{d1} = 23.88$ |
| $r_2 = 57.4115$ | $d_2 = 1.1687$ | | |
| $r_3 = 60.0578$ | $d_3 = 9.8500$ | $n_{d2} = 1.73520$ | $v_{d2} = 41.08$ |
| $r_4 = -154.5275$ | $d_4 = 0.1100$ | | |
| $r_5 = 42.0612$ | $d_5 = 6.9500$ | $n_{d3} = 1.49700$ | $v_{d3} = 81.61$ |
| $r_6 = 288.4817$ | $d_6 =$ (Variable) | | |
| $r_7 = -5606.3662$ | $d_7 = 1.5000$ | $n_{d4} = 1.78590$ | $v_{d4} = 44.18$ |
| $r_8 = 24.7855$ (Aspheric) | $d_8 = 5.0593$ | | |
| $r_9 = -85.1616$ | $d_9 = 1.4000$ | $n_{d5} = 1.77250$ | $v_{d5} = 49.66$ |
| $r_{10} = 47.6182$ | $d_{10} = 0.1000$ | | |
| $r_{11} = 36.6708$ | $d_{11} = 4.3500$ | $n_{d6} = 1.84666$ | $v_{d6} = 23.88$ |
| $r_{12} = -191.0949$ | $d_{12} = 1.7520$ | | |
| $r_{13} = -44.1290$ | $d_{13} = 1.3000$ | $n_{d7} = 1.71300$ | $v_{d7} = 53.84$ |
| $r_{14} = 39.9894$ | $d_{14} = 0.4500$ | | |

-continued

| | | | |
|---|---|---|---|
| $r_{15} = 43.1775$ | $d_{15} = 3.4500$ | $n_{d8} = 1.75520$ | $v_{d8} = 27.51$ |
| $r_{16} = 412.8559$ | $d_{16} =$ (Variable) | | |
| $r_{17} = \infty$ (Stop) | $d_{17} = 1.0000$ | | |
| $r_{18} = 66.7200$ | $d_{18} = 3.5000$ | $n_{d9} = 1.74100$ | $v_{d9} = 52.68$ |
| $r_{19} = -152.9371$ | $d_{19} = 0.1000$ | | |
| $r_{20} = 43.8331$ | $d_{20} = 4.6500$ | $n_{d10} = 1.69100$ | $v_{d10} = 54.84$ |
| $r_{21} = -146.7940$ | $d_{21} = 1.3230$ | | |
| $r_{22} = -56.9974$ | $d_{22} = 1.6000$ | $n_{d11} = 1.80610$ | $v_{d11} = 33.27$ |
| $r_{23} = 62.6732$ | $d_{23} =$ (Variable) | | |
| $r_{24} = 33.4907$ | $d_{24} = 3.3500$ | $n_{d12} = 1.74100$ | $v_{d12} = 52.68$ |
| $r_{25} = 79.1650$ | $d_{25} = 1.0500$ | | |
| $r_{26} = 588.8622$ | $d_{26} = 1.6000$ | $n_{d13} = 1.84666$ | $v_{d13} = 23.88$ |
| $r_{27} = 257.3659$ (Aspheric) | $d_{27} = 0.1000$ | | |
| $r_{28} = 63.1372$ | $d_{28} = 5.5000$ | $n_{d14} = 1.74400$ | $v_{d14} = 44.73$ |
| $r_{29} = -52.6101$ | $d_{29} = 0.1000$ | | |
| $r_{30} = 107.3266$ | $d_{30} = 1.5500$ | $n_{d15} = 1.75520$ | $v_{d15} = 27.51$ |
| $r_{31} = 28.9435$ (Aspheric) | $d_{31} =$ (Variable) | | |
| $r_{32} = 114.1833$ | $d_{32} = 4.0000$ | $n_{d16} = 1.48749$ | $v_{d16} = 70.20$ |
| $r_{33} = -233.9656$ | $d_{33} = 1.6674$ | | |
| $r_{34} = -68.8618$ | $d_{34} = 2.1500$ | $n_{d17} = 1.84666$ | $v_{d17} = 23.88$ |
| $r_{35} = -97.8540$ | | | |

Zooming Spaces

| f | 35.800 | 68.926 | 131.502 |
|---|---|---|---|
| $d_6$ | 1.350 | 8.845 | 20.031 |
| $d_{16}$ | 19.100 | 9.002 | 0.950 |
| | (20.080) | (10.484) | (4.287) |
| $d_{23}$ | 14.840 | 6.159 | 1.200 |
| $d_{31}$ | 3.516 | 27.507 | 41.517 |

Aspherical Coefficients

8th surface $P = 1$
$A_4 = -0.26690 \times 10^{-6}$
$A_6 = 0.11314 \times 10^{-8}$
$A_8 = -0.22699 \times 10^{-10}$
$A_{10} = 0.30831 \times 10^{-13}$ 27th surface $P = 1$
$A_4 = 0.44044 \times 10^{-5}$
$A_6 = 0.67265 \times 10^{-8}$
$A_8 = 0.12711 \times 10^{-11}$
$A_{10} = -0.60840 \times 10^{-14}$ 31th surface $P = 1$
$A_4 = 0.84675 \times 10^{-5}$
$A_6 = 0.11036 \times 10^{-7}$
$A_8 = -0.78747 \times 10^{-11}$
$A_{10} = 0.11181 \times 10^{-12}$ Example 8

$f = 35.855 \sim 53.864 \sim 83.950$
$F_{NO} = 3.60 \sim 3.60 \sim 3.60$
$\omega = 31.1 \sim 21.88 \sim 14.45°$

| | | | |
|---|---|---|---|
| $r_1 = 125.0406$ | $d_1 = 1.2265$ | $n_{d1} = 1.80518$ | $v_{d1} = 25.43$ |
| $r_2 = 59.0212$ | $d_2 = 7.0158$ | $n_{d2} = 1.71300$ | $v_{d2} = 53.84$ |
| $r_3 = -257.6238$ | $d_3 = 0.1100$ | | |
| $r_4 = 30.1869$ | $d_4 = 3.6292$ | $n_{d3} = 1.49700$ | $v_{d3} = 81.61$ |
| $r_5 = 46.1920$ | $d_5 =$ (Variable) | | |
| $r_6 = 62.1117$ | $d_6 = 1.6175$ | $n_{d4} = 1.81554$ | $v_{d4} = 44.36$ |
| $r_7 = 19.0951$ | $d_7 = 3.6053$ | | |
| $r_8 = 74.6325$ | $d_8 = 0.9916$ | $n_{d5} = 1.74100$ | $v_{d5} = 52.68$ |
| $r_9 = 28.6808$ | $d_9 = 0.6949$ | | |
| $r_{10} = 27.4443$ | $d_{10} = 2.3220$ | $n_{d6} = 1.84666$ | $v_{d6} = 23.78$ |
| $r_{11} = 61.6827$ | $d_{11} = 3.3669$ | | |
| $r_{12} = -26.9520$ | $d_{12} = 0.9622$ | $n_{d7} = 1.69100$ | $v_{d7} = 54.84$ |
| $r_{13} = 151.8739$ | $d_{13} = 0.6509$ | | |
| $r_{14} = 57.0254$ | $d_{14} = 1.5672$ | $n_{d8} = 1.84666$ | $v_{d8} = 23.78$ |
| $r_{15} = 200.4309$ | $d_{15} =$ | | |

-continued

| | | | |
|---|---|---|---|
| | (Variable) | | |
| $r_{16} = \infty$ (Stop) | $d_{16} = 0.5714$ | | |
| $r_{17} = 84.8622$ | $d_{17} = 2.2256$ | $n_{d9} = 1.83500$ | $v_{d9} = 42.70$ |
| $r_{18} = -70.3361$ | $d_{18} = 0.0713$ | | |
| $r_{19} = 69.1753$ | $d_{19} = 2.2973$ | $n_{d10} = 1.83500$ | $v_{d10} = 42.70$ |
| $r_{20} = -86.2306$ | $d_{20} = 0.8876$ | | |
| $r_{21} = -34.7427$ | $d_{21} = 1.2000$ | $n_{d11} = 1.75520$ | $v_{d11} = 27.51$ |
| $r_{22} = 230.5060$ | $d_{22} =$ (Variable) | | |
| $r_{23} = 50.8005$ | $d_{23} = 3.5048$ | $n_{d12} = 1.83500$ | $v_{d12} = 42.70$ |
| $r_{24} = -48.2129$ | $d_{24} = 0.8647$ | | |
| $r_{25} = -69351.8197$ (Aspheric) | $d_{25} = 0.9788$ | $n_{d13} = 1.80518$ | $v_{d13} = 25.43$ |
| $r_{26} = 30.8993$ | $d_{26} = 2.6091$ | | |
| $r_{27} = -175.3266$ | $d_{27} = 1.3348$ | $n_{d14} = 1.74100$ | $v_{d14} = 52.68$ |
| $r_{28} = -94.4305$ | $d_{28} =$ (Variable) | | |
| $r_{29} = 105.8868$ | $d_{29} = 3.6774$ | $n_{d15} = 1.74100$ | $v_{d15} = 52.68$ |
| $r_{30} = -83.7517$ | $d_{30} = 1.8553$ | | |
| $r_{31} = -38.8672$ | $d_{31} = 1.0643$ | $n_{d16} = 1.80518$ | $v_{d16} = 25.43$ |
| $r_{32} = -51.4329$ | | | |

Zooming Spaces

| f | 35.855 | 53.864 | 83.950 |
|---|---|---|---|
| $d_5$ | 1.656 | 8.999 | 17.215 |
| $d_{15}$ | 11.361 | 6.326 | 0.868 |
| | (13.324) | (9.165) | (5.550) |
| $d_{22}$ | 10.590 | 5.370 | 1.668 |
| $d_{28}$ | 0.750 | 15.396 | 28.392 |

Aspherical Coefficients

25th surface $P = 1$
$A_4 = -0.61061 \times 10^{-5}$
$A_6 = -0.20895 \times 10^{-7}$
$A_8 = 0.12709 \times 10^{-9}$
$A_{10} = -0.41619 \times 10^{-12}$ Example 9

$f = 35.752 \sim 58.575 \sim 101.449$
$F_{NO} = 3.60 \sim 3.60 \sim 3.60$
$\omega = 31.18 \sim 20.27 \sim 12.04°$

| | | | |
|---|---|---|---|
| $r_1 = 147.7548$ | $d_1 = 1.3767$ | $n_{d1} = 1.80518$ | $v_{d1} = 25.43$ |
| $r_2 = 59.0165$ | $d_2 = 8.0630$ | $n_{d2} = 1.69680$ | $v_{d2} = 56.49$ |
| $r_3 = -275.5833$ | $d_3 = 0.1000$ | | |
| $r_4 = 40.1633$ | $d_4 = 4.8802$ | $n_{d3} = 1.49700$ | $v_{d3} = 81.61$ |
| $r_5 = 152.4280$ | $d_5 =$ (Variable) | | |
| $r_6 = 70.6387$ | $d_6 = 1.0420$ | $n_{d4} = 1.86300$ | $v_{d4} = 41.53$ |
| $r_7 = 21.1892$ | $d_7 = 4.0220$ | | |
| $r_8 = -1550.4041$ | $d_8 = 1.0408$ | $n_{d5} = 1.75500$ | $v_{d5} = 52.33$ |
| $r_9 = 41.1748$ | $d_9 = 0.0714$ | | |
| $r_{10} = 25.4275$ (Aspheric) | $d_{10} = 2.4934$ | $n_{d6} = 1.84666$ | $v_{d6} = 23.78$ |
| $r_{11} = 59.4228$ | $d_{11} = 2.8518$ | | |
| $r_{12} = -33.4219$ | $d_{12} = 0.9500$ | $n_{d7} = 1.69100$ | $v_{d7} = 54.84$ |
| $r_{13} = 40.9927$ | $d_{13} = 0.1000$ | | |
| $r_{14} = 43.1288$ | $d_{14} = 1.9230$ | $n_{d8} = 1.84666$ | $v_{d8} = 23.78$ |
| $r_{15} = 213.8119$ | $d_{15} =$ (Variable) | | |
| $r_{16} = \infty$ (Stop) | $d_{16} = 0.3550$ | | |
| $r_{17} = 85.9562$ | $d_{17} = 2.2153$ | $n_{d9} = 1.83500$ | $v_{d9} = 42.70$ |
| $r_{18} = -90.9969$ | $d_{18} = 0.0583$ | | |
| $r_{19} = 73.2393$ | $d_{19} = 1.9717$ | $n_{d10} = 1.83500$ | $v_{d10} = 42.70$ |
| $r_{20} = -261.3200$ | $d_{20} = 2.5097$ | | |
| $r_{21} = -33.3229$ | $d_{21} = 0.9624$ | $n_{d11} = 1.75520$ | $v_{d11} = 27.51$ |
| $r_{22} = -332.3292$ | $d_{22} =$ (Variable) | | |
| $r_{23} = 43.0189$ | $d_{23} = 4.1327$ | $n_{d12} = 1.81554$ | $v_{d12} = 44.36$ |
| $r_{24} = -72.9896$ | $d_{24} = 1.8213$ | | |
| $r_{25} = -7770.1032$ (Aspheric) | $d_{25} = 2.4724$ | $n_{d13} = 1.80518$ | $v_{d13} = 25.43$ |
| $r_{26} = 31.5163$ | $d_{26} = 2.6010$ | | |
| $r_{27} = 520.4069$ | $d_{27} = 2.6576$ | $n_{d14} = 1.74100$ | $v_{d14} = 52.68$ |
| $r_{28} = -60.4719$ | $d_{28} =$ | | |

-continued

|  |  | (Variable) |  |  |
|---|---|---|---|---|
| $r_{29} = 66.1954$ | $d_{29} = 4.2625$ | $n_{d15} = 1.74100$ | $v_{d15} = 52.68$ |
| $r_{30} = -761.1899$ | $d_{30} = 3.0164$ |  |  |
| $r_{31} = -46.5444$ | $d_{31} = 1.7591$ | $n_{d16} = 1.84666$ | $v_{d16} = 23.88$ |
| $r_{32} = -62.7331$ |  |  |  |

Zooming Spaces

| f | 35.752 | 58.575 | 101.449 |
|---|---|---|---|
| $d_5$ | 1.238 | 8.371 | 17.599 |
| $d_{15}$ | 12.007 | 6.705 | 0.755 |
|  | (13.772) | (9.356) | (5.934) |
| $d_{22}$ | 12.741 | 6.219 | 0.650 |
| $d_{28}$ | 0.550 | 17.320 | 28.607 |

Aspherical Coefficients

10th surface $P = 1$
$A_4 = -0.28346 \times 10^{-5}$
$A_6 = -0.74005 \times 10^{-8}$
$A_8 = 0.64497 \times 10^{-10}$
$A_{10} = -0.78353 \times 10^{-13}$ 25th surface $P = 1$
$A_4 = -0.30209 \times 10^{-5}$
$A_6 = -0.82884 \times 10^{-8}$
$A_8 = 0.31131 \times 10^{-10}$
$A_{10} = -0.68975 \times 10^{-13}$ Table below show the values for the above-described conditions (1) to (5) in the above Examples.

| Conditions | (1) | (2) | (3) | (4) | (5) |
|---|---|---|---|---|---|
| Example 1 | 1.277 | 0.589 | 0.863 | 0.7106 | 3.780 |
| Example 2 | 0.802 | 0.398 | 1.780 | 0.481 | 3.577 |
| Example 3 | 1.178 | 0.552 | 0.882 | 0.686 | 3.749 |
| Example 4 | 1.109 | 0.534 | 1.066 | 0.411 | 4.200 |
| Example 5 | 1.649 | 0.687 | 0.718 | 0.946 | 2.545 |
| Example 6 | 0.858 | 0.479 | 1.156 | 1.019 | 5.925 |
| Example 7 | 0.869 | 0.424 | 1.486 | 0.937 | 5.730 |
| Example 8 | 1.453 | 0.693 | 0.620 | 1.029 | 3.457 |
| Example 9 | 1.006 | 0.502 | 1.235 | 0.838 | 4.986 |

Figure 36:
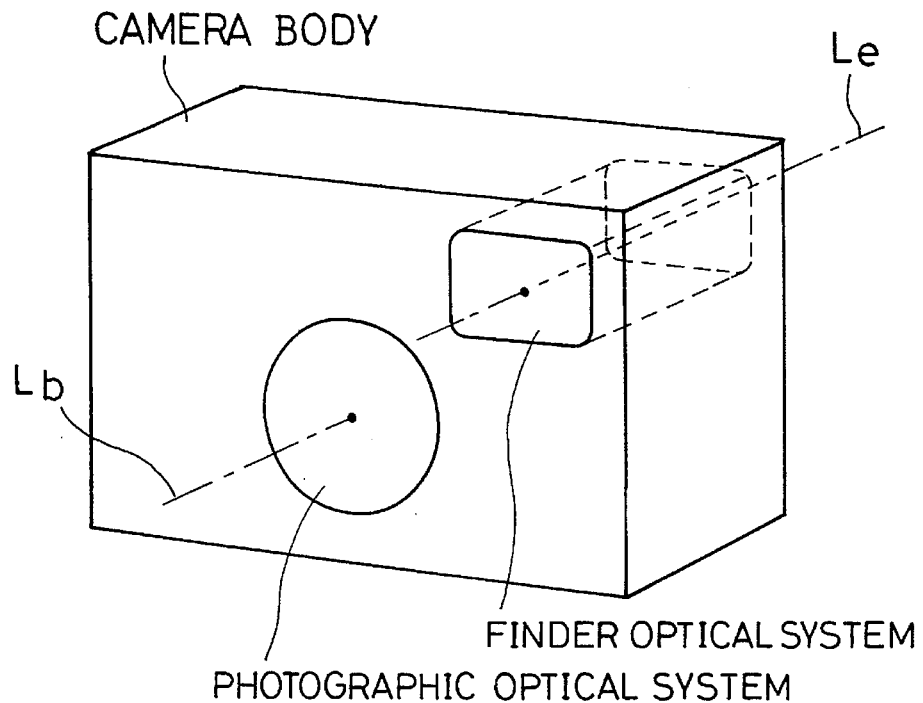
FIG. 36 is a perspective view showing the arrangement of a compact camera.
Figure 37:
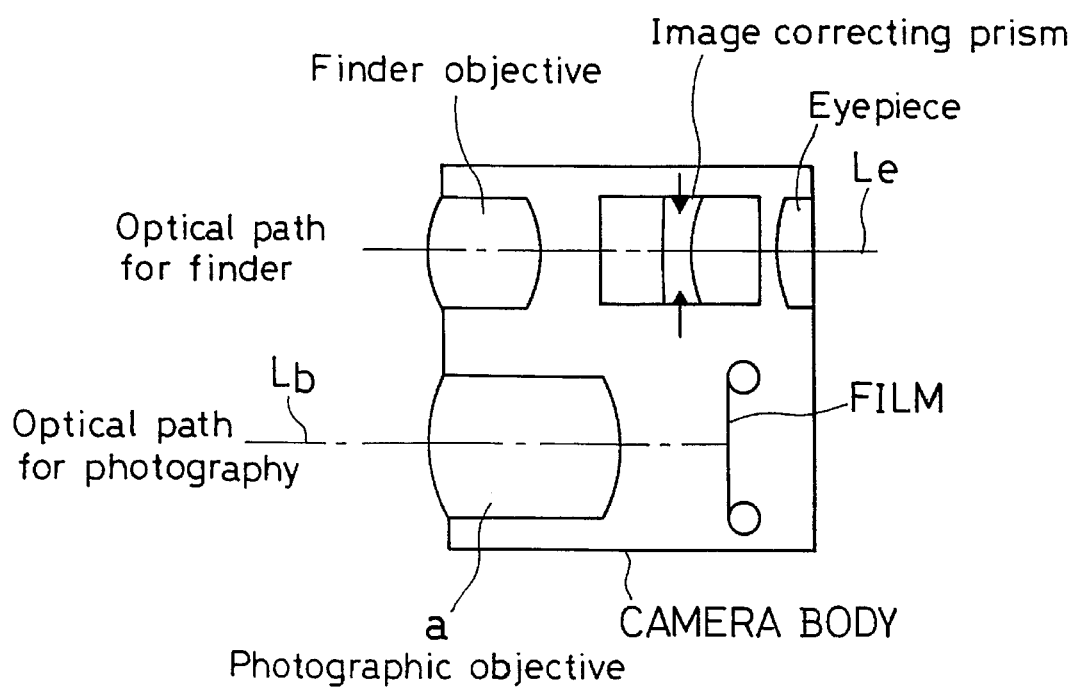
FIG. 37 is a sectional view showing the arrangement of the compact camera.

The zoom lens system of the present invention as described in the foregoing Examples may be employed, for example, as a photographic objective a of a compact camera arranged as shown in the perspective view of FIG. 36 and also in the sectional view of FIG. 37. In these figures, $L_b$ denotes an optical path for photography, and $L_e$ an optical path for finder. The two optical paths $L_b$ and $L_e$ lie parallel to each other. An image of an object is observed through a finder that is composed of a finder objective, an image correcting prism, and an eyepiece, and formed on a film by the objective a.

As will be clear from the foregoing description, the present invention provides a zoom lens system having a large aperture and enabling photography in the range of from the wide-angle region to the telephoto region. It is possible according to the present invention to realize an optical system which has high optical performance despite its larger aperture and in which the change in the overall length is relatively small during zooming from the wide end to the tele end.

What we claim is:

1. A zoom lens system comprising, in order from an object side, a 1-st lens unit of positive power, a 2-nd lens unit of negative power, a 3-rd lens unit of positive power, a 4-th lens unit of positive power, and a 5-th lens unit of positive power, wherein when zooming from a wide end toward a tele end is effected, said 1-st, 2-nd, 3-rd and 4-th lens units are moved toward the object side independently of each other such that the spacing between said 1-st and 2-nd lens units increases, while the spacing between said 2-nd and 3-rd lens units decreases, and the spacing between said 3-rd and 4-th lens units decreases, while said 5-th lens unit is fixed during the zooming.

2. A zoom lens system comprising, in order from an object side, a 1-st lens unit of positive power, a 2-nd lens unit of negative power, a 3-rd lens unit of positive power, a 4-th lens unit of positive power, and a 5-th lens unit of positive power, wherein when zooming from a wide end toward a tele end is effected, said 1-st, 2-nd, 3-rd and 4-th lens units move along an optical axis, while said 5-th lens unit is fixed, and wherein said 1-st lens unit has at least a doublet of one negative lens component and one positive lens component, and said 2-nd lens unit includes, in order from the object side, a negative meniscus lens having a convex surface directed toward the object side, a doublet of a negative lens component and a positive lens component, a negative lens whose object-side surface has stronger power than that of an image-side surface thereof, and a positive lens whose object-side surface has stronger power than that of an image-side surface thereof.

3. A zoom lens system comprising, in order from an object side, a 1-st lens unit of positive power, a 2-nd lens unit of negative power, a 3-rd lens unit of positive power, a 4-th lens unit of positive power, and a 5-th lens unit of positive power, wherein when zooming from a wide end toward a tele end is effected, said 1-st, 2-nd, 3-rd and 4-th lens units move along an optical axis, while said 5-th lens unit is fixed, and wherein said 3-rd lens unit has at least a doublet of one positive lens component and one negative lens component, and said 4-th lens unit has at least a doublet of one negative lens component and one positive lens component and further has an aspherical surface.

4. A zoom lens system comprising, in order from an object side, a 1-st lens unit of positive power, a 2-nd lens unit of negative power, a 3-rd lens unit of positive power, a 4-th lens unit of positive power, and a 5-th lens unit of positive power, wherein when zooming from a wide end toward a tele end is effected, said 1-st, 2-nd, 3-rd and 4-th lens units move along an optical axis, while said 5-th lens unit is fixed, and wherein said 5-th lens unit has one positive lens and one negative lens.

5. A zoom lens system comprising, in order from an object side, a 1-st lens unit of positive refractive power, a 2-nd lens unit of negative refractive power, a 3-rd lens unit of positive refractive power, a 4-th lens unit of positive refractive power, and a 5-th lens unit of positive refractive power, wherein when zooming from a wide end toward a tele end is effected, said 1-st, 2-nd, 3-rd and 4-th lens units are movable, while said 5-th lens unit is fixed, and the following conditions (1) to (5) are satisfied:

$$0.6 < f_1/f_3 < 2.0 \qquad (1)$$

$$0.25 < -f_{12W}/f_3 < 0.9 \qquad (2)$$

$$0.4 < f_3/f_4 < 2.5 \qquad (3)$$

$$0.2 < \gamma \cdot X_2/X_3 < 1.8 \qquad (4)$$

$$0.5 < \gamma \cdot X_4/X_3 < 7.0 \tag{5}$$

where $f_1$: the focal length of the 1-st lens unit;

$f_{12W}$: the composite focal length of the 1-st and 2-nd lens units at the wide end;

$f_3$ the focal length of the 3-rd lens unit;

$f_4$ the focal length of the 4-th lens unit;

$\gamma$: the zoom ratio (=the focal length at the tele end divided by the focal length at the wide end)

$X_2$: the amount of movement of the 2-nd lens unit when zooming is effected from the wide end (taken here as a standard position) to the tele end;

$X_3$: the amount of movement of the 3-rd lens unit when zooming is effected from the wide end (taken here as a standard position) to the tele end; and $X_4$: the amount of movement of the 4-th lens unit when zooming is effected from the wide end (taken here as a standard position) to the tele end.

6. A zoom lens system according to any one of claims 1 to 5, which satisfies the following condition:

$$|\beta_{2T}| < 1$$

where $\beta_{2T}$: the lateral magnification of the 2-nd lens unit at the tele end.

7. A zoom lens system according to any one of claims 1 to 5, which satisfies the following condition:

$$\beta_5 < 1$$

where $\beta_5$: the lateral magnification of the 5-th lens unit.

8. A zoom lens system according to any one of claims 1 to 4, which satisfies the following condition (1):

$$0.6 < f_1/f_3 < 2.0 \tag{1}$$

where $f_1$: the focal length of the 1-st lens unit; and $f_3$: the focal length of the 3-rd lens unit.

9. A zoom lens system according to any one of claims 1 to 4, which satisfies the following condition (2):

$$0.25 < -f_{12W}/f_3 < 0.9 \tag{2}$$

where $f_{12W}$: the composite focal length of the 1-st and 2-nd lens units at the wide end; and $f_3$: the focal length of the 3-rd lens unit.

10. A zoom lens system according to any one of claims 1 to 4, which satisfies the following condition (3):

$$0.4 < f_3/f_4 < 2.5 \tag{3}$$

where $f_3$: the focal length of the 3-rd lens unit; and $f_4$: the focal length of the 4-th lens unit.

11. A zoom lens system according to any of claims 1 to 4, which satisfies the following condition (4):

$$0.2 < \gamma \cdot X_2/X_3 < 1.8 \tag{4}$$

where $\gamma$: the zoom ratio (=the focal length at the tele end divided by the focal length at the wide end);

$X_2$: the amount of movement of the 2-nd lens unit when zooming is effected from the wide end (taken here as a standard position) to the tele end; and $X_3$: the amount of movement of the 3-rd lens unit when zooming is effected from the wide end (taken here as a standard position) to the tele end.

12. A zoom lens system according to any one of claims 1 to 4, which satisfies the following condition (5):

$$0.5 < \gamma X_4/X_3 < 7.0 \tag{5}$$

where $\gamma$: the zoom ratio (=the focal length at the tele end divided by the focal length at the wide end );

$X_3$: the amount of movement of the 3-rd lens unit when zooming is effected from the wide end (taken here as a standard position) to the tele end; and $X_4$: the amount of movement of the 4-th lens unit when zooming is effected from the wide end (taken here as a standard position) to the tele end.

* * * * *